(12) United States Patent
Yamaguchi

(10) Patent No.: US 7,346,547 B2
(45) Date of Patent: Mar. 18, 2008

(54) METHOD, DEVICE, SYSTEM, AND PROGRAM FOR TRANSACTION OF CONTENTS THROUGH NETWORK

(75) Inventor: Seiji Yamaguchi, Tokyo (JP)

(73) Assignee: NEC Biglobe, Ltd., Tokyo (JP)

( * ) Notice: Subject to any disclaimer, the term of this patent is extended or adjusted under 35 U.S.C. 154(b) by 995 days.

(21) Appl. No.: 09/947,706

(22) Filed: Sep. 7, 2001

(65) Prior Publication Data
US 2002/0035540 A1    Mar. 21, 2002

(30) Foreign Application Priority Data
Sep. 8, 2000  (JP) .............. 2000-272695
Apr. 27, 2001 (JP) .............. 2001-132693

(51) Int. Cl.
*G06Q 30/00*    (2006.01)

(52) U.S. Cl. .......................... 705/26; 705/37

(58) Field of Classification Search ............. 705/26
See application file for complete search history.

(56) References Cited

U.S. PATENT DOCUMENTS 5,892,900 A *  4/1999  Ginter et al. ................ 726/26
6,490,567 B1  12/2002  Gregory

FOREIGN PATENT DOCUMENTS

| JP | 358033713 | * | 2/1993 |
| JP | 10-207945 |   | 8/1998 |

OTHER PUBLICATIONS

"Providing resources for researchers on the World Wide Web—some perspectives", Robert H Diehl, Ronald P Larkin .Bioscience.Washington: Apr. 1998.vol. 48,Iss.4;p. 313,4pages, downloaded from ProQuest on the Internet on Apr. 16, 20007.*

* cited by examiner

*Primary Examiner*—James Zurita
(74) *Attorney, Agent, or Firm*—Foley & Lardner LLP

(57) ABSTRACT

A method, device, system, and program for transaction of contents through a network are provided. In this transaction system, user terminals are configured to allow users to conduct transactions. A user sends a notification that the user hopes to register contents and prescribed items thereof in a data base in a center through the Internet. A Web server in the center registers the contents and the prescribed items thereof sent from the user in the data base. When use or transfer of the contents sent from the user occurs, a token according to the occurrence is sent to a user who hopes to use or transfer of the contents. In the case of accidents concerning contents and tokens, appropriation/compensation is implemented from funds for handling trouble to a user who suffers a loss of benefit. Thereby, it becomes possible to conduct transaction of contents easily and securely, spread around detail of contents extensively, and receive contents promptly which a user hopes to use.

9 Claims, 46 Drawing Sheets

FIG. 10A

| Identification /Specification No.: ① (a record of derivation to user ②) Sign by : Center4 Confidential for : User ② | (*) |
|---|---|
| Contents : A<br>Party Of Consent Of Use/Delivery User ① → User ②<br>Period Of Presentation : XXX<br>Time Of Delivery : Just after the period of presentation expires when presentation is implemented<br>Condition Of Delivery : Standard/Secret Code/Digital Watermark etc.<br>Period Of Consent Of Use : By XXX after delivery<br>Condition Of Consent Of Use : Adaptation and necessary action accompanied by the adaptation etc. | |

FIG. 10B

| Identification /Specification No.: ② (a record of derivation to user ①) Sign by : Center4 Confidential for : User ① | (*) |
|---|---|
| Cost : X<br>Party of Collection Of Cost : User ② → User ①<br>Period Of Presentation : XXX<br>Time Of Collection Of Cost : When XXX pass over after the period of presentation expires in the case where presentation is implemented | |

FIG. 11A

Identification
/Specification No.: ③ (a record of derivation to user ⑤)
Sign by : Center4
Confidential for : User ⑤

(*)

Contents : A+A'
Party Of Consent Of Use/Delivery : User ①/② → User ⑤
Period Of Presentation : XXX
Time Of Delivery : Just after the period of presentation expires
                  when presentation is implemented
Condition Of delivery : Standard/Secret Code/Digital Watermark etc.
Period Of Consent Of Use : By XXX after delivery
Condition Of Consent Of Use : Adaptation and necessary action
                             accompanied by the adaptation etc.

FIG. 11B

Identification
/Specification No.: ④ (a record of derivation to user ①)
Sign by : Center4
Confidential for : User ①

(*)

Cost : X
Party of Collection Of Cost : User ⑤ → User ①
Period Of Presentation : XXX
Time Of Collection Of Cost : When XXX pass over after the
                            period of presentation expires
                            in the case where presentation
                            is implemented

F I G. 11C

```
Identification
/Specification No.: ⑤ (a record of derivation to user ②)
Sign by : Center4
Confidential for : User ②
```

| |
|---|
| Cost : Y |
| Party of Collection Of Cost : User ⑤ → User ② |
| Period Of Presentation : XXX |
| Time Of Collection Of Cost : When XXX pass over after the period of presentation expires in the case where presentation is implemented |

| Identification /Specification No.: ③-1 (a record of derivation to user ⑤ - transfer to user ④) Sign by : Center4 Confidential for : User ④ | (*) |
|---|---|
| Contents : A+A' Party Of Consent Of Use/Delivery :User ① / ② → User ④ Period Of Presentation : XXX Time Of Delivery : Just after the period of presentation expires when presentation is implemented Condition Of Delivery : Standard/Secret Code/Digital Watermark etc. Period Of Consent Of Use : By XXX after delivery Condition Of Consent Of Use : Adaptation and necessary action accompanied by the adaptation etc. | |

FIG. 12B

| Identification /Specification No.: ⑥ (a record of derivation to user ⑤) Sign by : Center4 Confidential for : User ⑤ | (*) |
|---|---|
| Cost : X+Y Party of Collection Of Cost :User ④ → User ⑤ Period Of Presentation : XXX Time Of Collection Of Cost : When XXX pass over after the period of presentation expires in the case where presentation is implemented | |

FIG. 13A

| Identification<br>/Specification No.: ⑦ (a record of derivation to user ④)<br>Sign by : Center4<br>Confidential for : User ④ | (*) |
|---|---|
| Contents : B<br>Party Of Consent Of Use/Delivery :User ③ → User ④<br>Period Of Presentation : XXX<br>Time Of Delivery : Just after the period of presentation expires when presentation is implemented<br>Condition Of Delivery : Standard/Secret Code/Digital Watermark etc.<br>Period Of Consent Of Use : By XXX after delivery<br>Condition Of Consent Of Use : Adaptation and necessary action accompanied by the adaptation etc. | |

FIG. 13B

| Identification<br>/Specification No.: ⑧ (a record of derivation to user ③)<br>Sign by : Center4<br>Confidential for : User ③ | (*) |
|---|---|
| Cost : Z<br>Party of Collection Of Cost :User ④ → User ③<br>Period Of Presentation : XXX<br>Time Of Collection Of Cost : When XXX pass over after the period of presentation expires in the case where presentation is implemented | |

FIG. 14A

Identification
/Specification No.: ⑤-1 (a record of derivation to user②— transfer to user④)
Sign by : Center4
Confidential for : User ④

Cost : Y
Party of Collection Of Cost : User ⑤ → User ④
Period Of Presentation : XXX
Time Of Collection Of Cost : When XXX pass over after the period of presentation expires in the case where presentation is implemented (*)

FIG. 14B

Identification
/Specification No.: ⑨ (a record of derivation to user ②) )
Sign by : Center4
Confidential for : User ②

Cost : Y (discount)
Party of Collection Of Cost : User ④ → User ②
Period Of Presentation : XXX
Time Of Collection Of Cost : When XXX pass over after the period of presentation expires in the case where presentation is implemented (*)

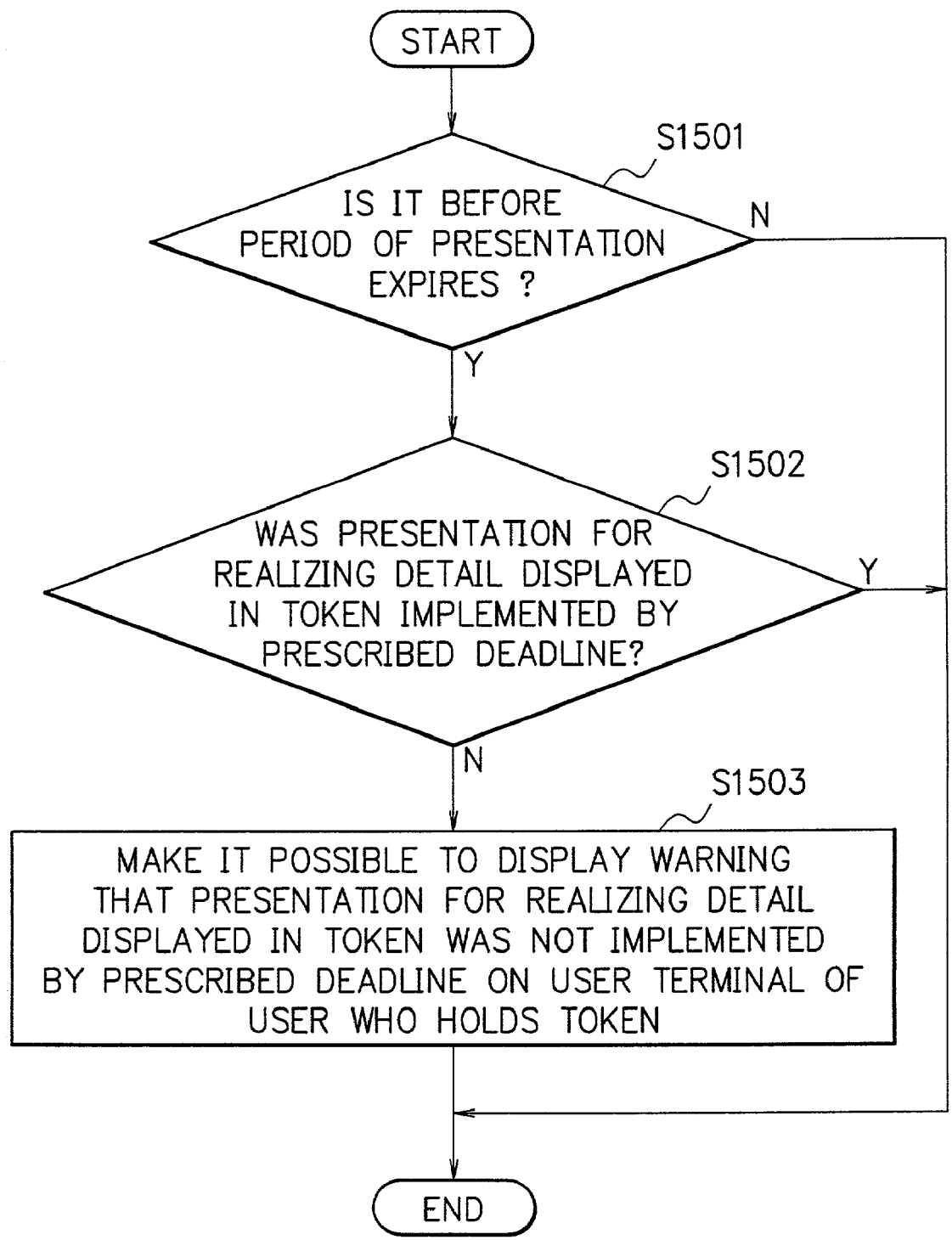

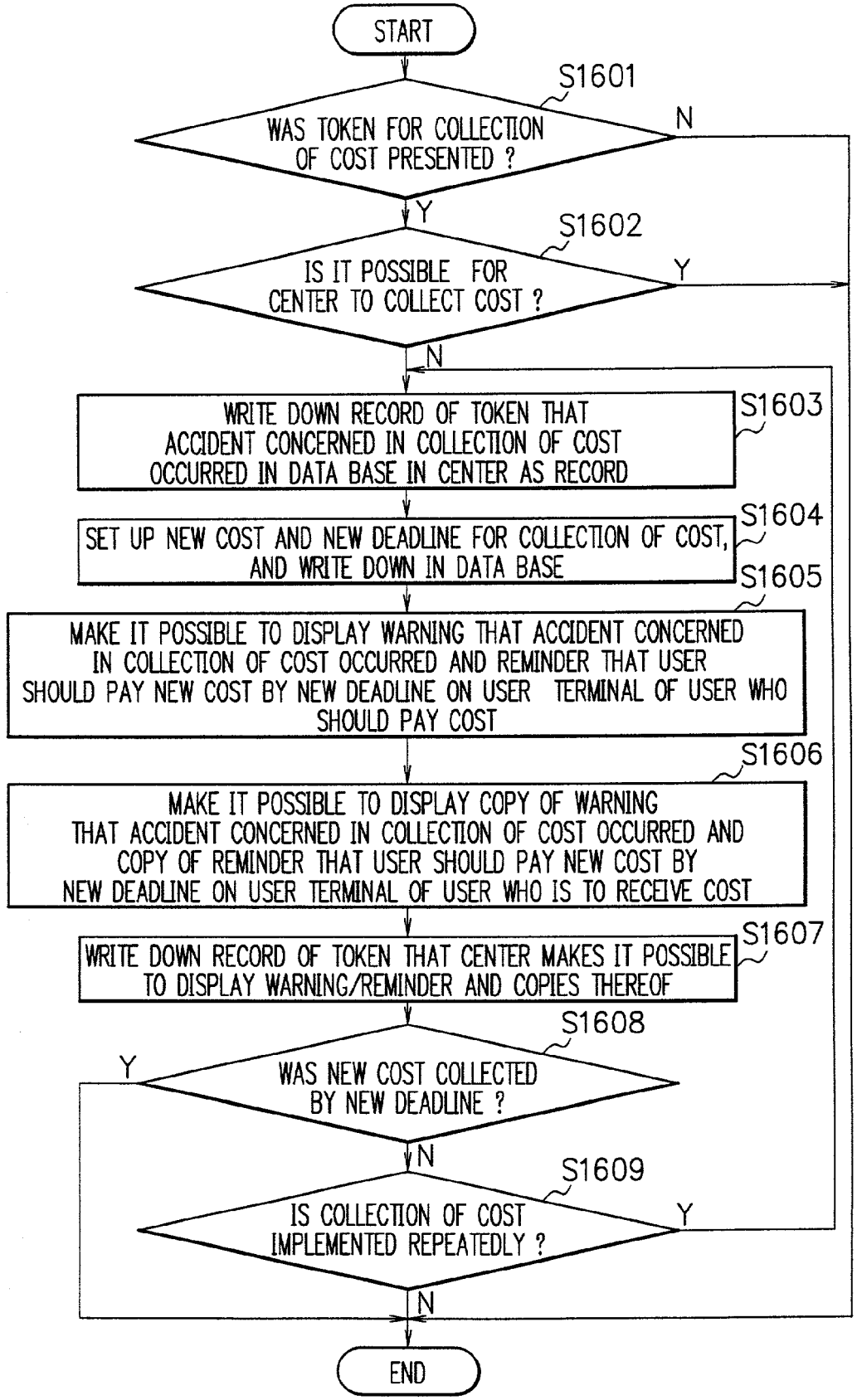

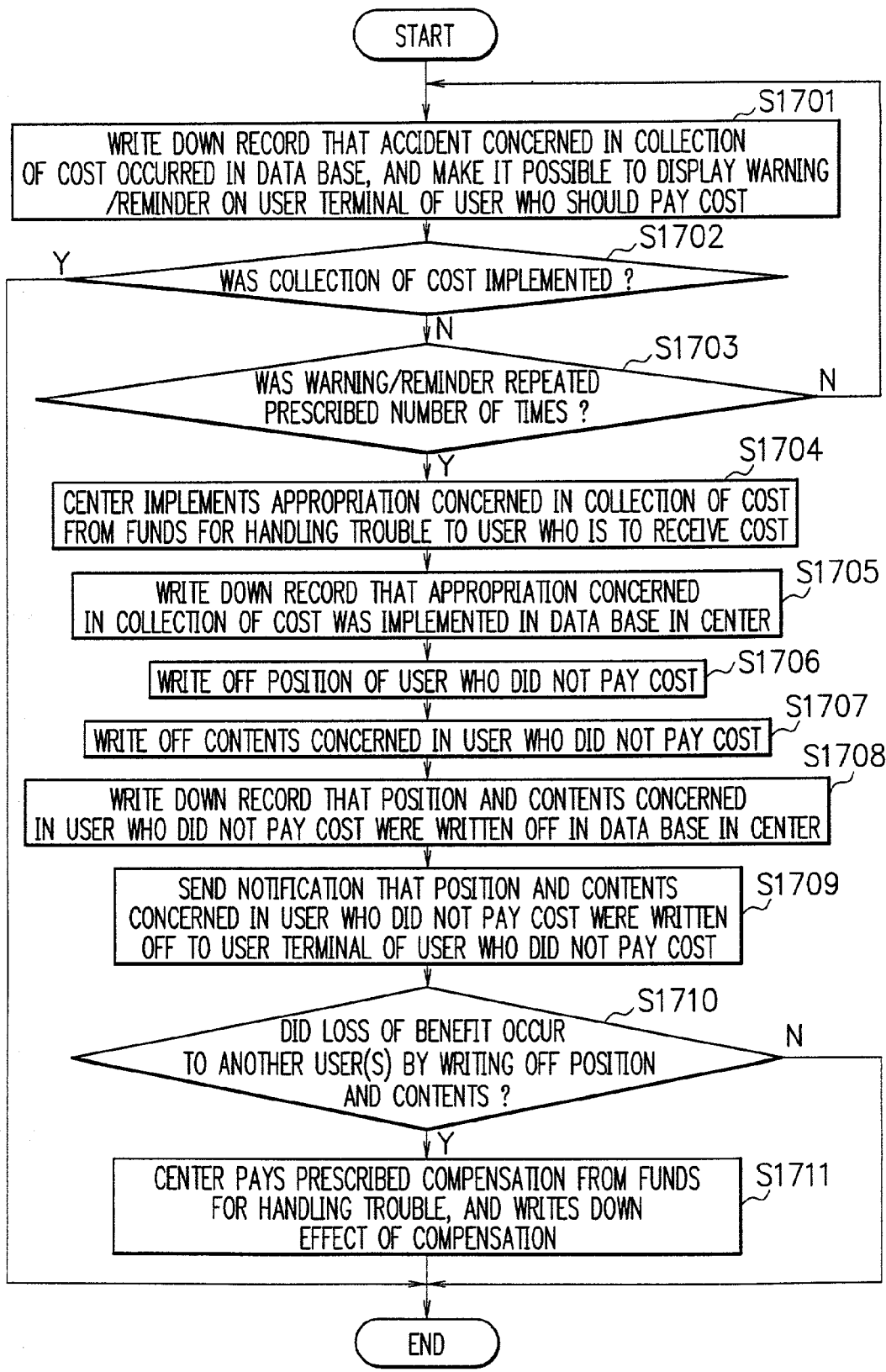

F I G. 26A

Identification/Specification No. : ⑦
P : Derivation to user ④
Period Of Presentation : XXX
Warning : Presentation has not been implemented by you (user ④).

F I G. 26B

Identification/Specification No. : ⑨
P : Derivation to user ②
Period Of Presentation : XXX
Warning : Presentation has not been implemented by you (user ②).

FIG. 27A

Identification/Specification No. : ⑤-3
P : Accident = Collection Delay etc.(Warning and Reminder/Number of Times for Repetition =0)

Warning : Cost was not collected from you (user ⑤).
Reminder : You should pay new cost (Y + Interest Arrears YY1 ) by new deadline (XXX).

FIG. 27B

Identification/Specification No. : ⑤-3 (a record of derivation to user ② -transfer to user ④- Presentation from user ④ - accident = collection delay etc.(Warning and Reminder/Number of Times for Repetition = 0))

Cost : Y + Interest Arrears YY1
Party Of Collection Of Cost : user ⑤ → user ④
Time Of Collection Of Cost: Deadline (XXX)

F I G. 28A

Identification/Specification No.: ⑤-3
P: Accident = Collection Delay etc.(Warning and Reminder /Number of Times for Repetition =1)
Warning: Cost was not collected from you (user ⑤).
Reminder: You should pay new cost (Y + Interest Arrears YY1 + Interest Arrears YY2 ) by new deadline (XXX').

F I G. 28B

Identification/Specification No.: ⑤-3 (a record of derivation to user ② -transfer to user ④- Presentation from user ④ - accident = collection delay etc.(Warning and Reminder/Number of Times for Repetition = 1))

Cost: Y + Interest Arrears YY1 + Interest Arrears YY2
Party Of Collection Of Cost: user ⑤ → user ④
Time Of Collection Of Cost: Deadline (XXX')

FIG. 29A

Identification/Specification No. : ①-3
P : Accident = Infringement of Right etc. (Warning and Reminder
/Number of Times for Repetition =0)
Warning : Infringement of right etc. occurred to your(user①) contents(A).
Reminder : You should avoid infringement of right etc. by deadline (XXX).

FIG. 29B

Identification/Specification No. : ③-4
P : Accident = Infringement of Right etc. (Warning and Reminder
/Number of Times for Repetition =0)
Warning : Infringement of right etc. occurred to your(user①) contents(A).
Reminder : You should avoid infringement of right etc. by deadline (XXX).

FIG. 29C

Identification/Specification No. : ①−3(a record of derivation to user ②
 −Presentation from user ②− realization of displayed
  detail on the basis of presentation from user ②
 − accident = infringement of right etc.(Warning and
  Reminder/Number of Times for Repetition =0))

Contents : A
Party Of Consent Of Use/Delivery : User① → User ②
Period Of Consent Of Use : By XXX after delivery
Condition Of Consent Of Use : Adaptation and necessary action accompanied
 by the adaptation etc.

FIG. 29D

Identification/Specification No. : ③−4(a record of derivation to user ⑤ − transfer to
 user④− presentation from user④− realization of displayed
  detail on the basis of presentation from user ④−
 − accident = infringement of right etc.(Warning and
  Reminder/Number of Times for Repetition =0))

Contents : A +A'
Party Of Consent Of Use/Delivery : User①/② → User ④
Period Of Consent Of Use : By XXX after delivery
Condition Of Consent Of Use : Adaptation and necessary action accompanied
 by the adaptation etc.

FIG. 30A

Identification/Specification No. : ①-4

P : Realized Displayed Detail

Notification : Infringement of right etc. was avoided.

FIG. 30B

Identification/Specification No. : ③-5

P : Realized Displayed Detail

Notification : Infringement of right etc. was avoided.

FIG. 30C

Identification/Specification No. : ①-4(a record of derivation to user ② - presentation from user ② - realization of displayed detail on the basis of presentation from user ② - accident = infringement of right etc.(Warning and Reminder/Number of Times for Repetition =0)- realization of displayed detail)

Contents : A
Party Of Consent Of Use/Delivery : User ① → User ②
Period Of Consent Of Use : By XXX after delivery
Condition Of Consent Of Use : Adaptation and necessary action accompanied by the adaptation etc.

FIG. 30D

Identification/Specification No. : ③-5(a record of derivation to user ⑤ - transfer to user ④ - presentation from user ④ - realization of displayed detail on the basis of presentation from user ④ - accident = infringement of right etc.(Warning and Reminder/Number of Times for Repetition =0)- realization of displayed detail)

Contents : A +A'
Party Of Consent Of Use/Delivery : User ①/② → User ④
Period Of Consent Of Use : By XXX after delivery
Condition Of Consent Of Use : Adaptation and necessary action accompanied by the adaptation etc.

FIG. 31A

Identification/Specification No. : ①-3
P : Accident = Infringement of Right etc. (Warning and Reminder
/Number of Times for Repetition =1)

Warning : You (user①) failed to avoid infringement of right etc. occurred to contents(A).

Reminder : You should avoid infringement of right etc. by new deadline (XXX').

FIG. 31B

Identification/Specification No. : ③-4
P : Accident = Infringement of Right etc. (Warning and Reminder
/Number of Times for Repetition =1)

Warning : You (user①) failed to avoid infringement of right etc. occurred to contents(A).

Reminder : You should avoid infringement of right etc. by new deadline (XXX').

FIG. 31C

Identification/Specification No. : ①-3(a record of derivation to user ②-Presentation from user ②- realization of displayed detail on the basis of presentation from user ②- accident = infringement of right etc.(Warning and Reminder/Number of Times for Repetition =1))

Contents : A
Party Of Consent Of Use/Delivery : User ① → User ②
Period Of Consent Of Use : By XXX after delivery
Condition Of Consent Of Use : Adaptation and necessary action accompanied by the adaptation etc.

FIG. 31D

Identification/Specification No. : ③-4(a record of derivation to user ⑤ - transfer to user ④- presentation from user ④- realization of displayed detail on the basis of presentation from user ④- accident = infringement of right etc.(Warning and Reminder/Number of Times for Repetition =1))

Contents : A +A'
Party Of Consent Of Use/Delivery : User ①/② → User ④
Period Of Consent Of Use : By XXX after delivery
Condition Of Consent Of Use : Adaptation and necessary action accompanied by the adaptation etc.

F I G. 32A

Identification/Specification No. : ①-4

P :Realized Displayed Detail

Notification : Infringement of right etc. was avoided.

F I G. 32B

Identification/Specification No. : ③-5

P :Realized Displayed Detail

Notification : Infringement of right etc. was avoided.

FIG. 32C

Identification/Specification No. : ①-4(a record of derivation to user ②- presentation from user ②- realization of displayed detail on the basis of presentation from user ② - accident = infringement of right etc.(Warning and Reminder/Number of Times for Repetition = 1)-realization of displayed detail)

Contents : A
Party Of Consent Of Use/Delivery : User① → User ②
Period Of Consent Of Use : By XXX after delivery
Condition Of Consent Of Use : Adaptation and necessary action accompanied by the adaptation etc.

FIG. 32D

Identification/Specification No. : ③-5(a record of derivation to user ⑤- transfer to user ④- presentation from user ④- realization of displayed detail on the basis of presentation from user ④- accident = infringement of right etc.(Warning and Reminder/Number of Times for Repetition =1)-realization of displayed detail)

Contents : A +A'
Party Of Consent Of Use/Delivery : User①/② → User ④
Period Of Consent Of Use : By XXX after delivery
Condition Of Consent Of Use : Adaptation and necessary action accompanied by the adaptation etc.

FIG. 33A

Contents : [A+A'+B]'

Warning : Infringement of right etc. occurred to your(user ④) contents.

Reminder : You should avoid infringement of right etc. by deadline (XXX).

FIG. 33B

Contents : [A+A'+B]'

Warning : You (user ④) failed to avoid infringement of right etc.occurred to contents.

Reminder : You should avoid infringement of right etc. by new deadline (XXX').

Number of Times for Repetition of Warning/Reminder at the Present Moment=1

F I G. 34

|  | α | β | γ | θ |
|---|---|---|---|---|
| SITUATION AT THE PRESENT MOMENT ONLY IN RECORDS (P) | a | b | c | d |
| SITUATION OF ALL STAGES LEADING UP TO THE PRESENT MOMENT IN RECORDS (W) | e | f | g | h |

FIG. 35A

Identification/Specification No. : ①-2
P : Realization of displayed detail on the basis of presentation from user ②

FIG. 35B

Identification/Specification No. : ③-1
P : Transfer to user 4
Period of Presentation : XXX

FIG. 35C

Identification/Specification No. : ③-1
P : Transfer to user ④
Period of Presentation : XXX

FIG. 35D

Identification/Specification No. : ⑦
P : Derivation to user ④
Period of Presentation : XXX

FIG. 36A

Identification/Specification No. : ④
P : Derivation to user ①
Period of Presentation : XXX

FIG. 36B

Identification/Specification No. : ⑤-1
P : Transfer to user ④
Period of Presentation : XXX

FIG. 36C

Identification/Specification No. : ⑤-1
P : Transfer to user ④
Period of Presentation : XXX

FIG. 36D

Identification/Specification No. : ⑨
P : Derivation to user ②
Period of Presentation : XXX

FIG. 37A

Identification/Specification No. : ①-2
W : Derivation to user②-Presentation from user② realization of displayed detail on the basis of presentation from user ②

FIG. 37B

Identification/Specification No. : ③-1
W : Derivation to user⑤-transfer to user ④
Period of Presentation : XXX

FIG. 37C

Identification/Specification No. : ③-1
W : Derivation to user⑤-transfer to user ④
Period of Presentation : XXX

FIG. 37D

Identification/Specification No. : ⑦
W : Derivation to user ④
Period of Presentation : XXX

FIG. 38A

```
Identification/Specification No. : ④
W : Derivation to user ①
Period of Presentation : XXX
```

FIG. 38B

```
Identification/Specification No. : ⑤-1
W : Derivation to user ②-Transfer to user ④
Period of Presentation : XXX
```

FIG. 38C

```
Identification/Specification No. : ⑤-1
W : Derivation to user ②-Transfer to user ④
Period of Presentation : XXX
```

FIG. 38D

```
Identification/Specification No. : ⑨
W : Derivation to user ②
Period of Presentation : XXX
```

FIG. 39A

```
ZZZ (XX1) : Collected
ZZZ (XX2) : Uncollected(Warning/Reminder)
A Situation About Appropriation/Compensation From
Funds : Target Identification/Specification No.
        (⑧,--------)
```

FIG. 39B

```
Funds(deadline for collecting original funds) :ZZZ (XX2)
Warning : Funds were not collected from you (user③).
Reminder : You should pay new funds (ZZZ + Interest
           Arrears ZZ1) by new deadline(XX2').
```

FIG. 39C

```
Funds(deadline for collecting original funds) :ZZZ(XX2)
Warning : Funds were not collected from you (user③).
Reminder : You should pay new funds (ZZZ + Interest
           Arrears ZZ1 + Interest Arrears ZZ2)
           by new deadline(XX2").
Number of Times for Repetition of Warning/Reminder at
the Present + Moment:1
```

FIG. 39D

```
Reason : Funds(deadline for collecting original funds) :
         ZZZ (XX2) were not collected from you
         (user③).
Notification : Your (user③)position and contents (B)
               will be written off.
```

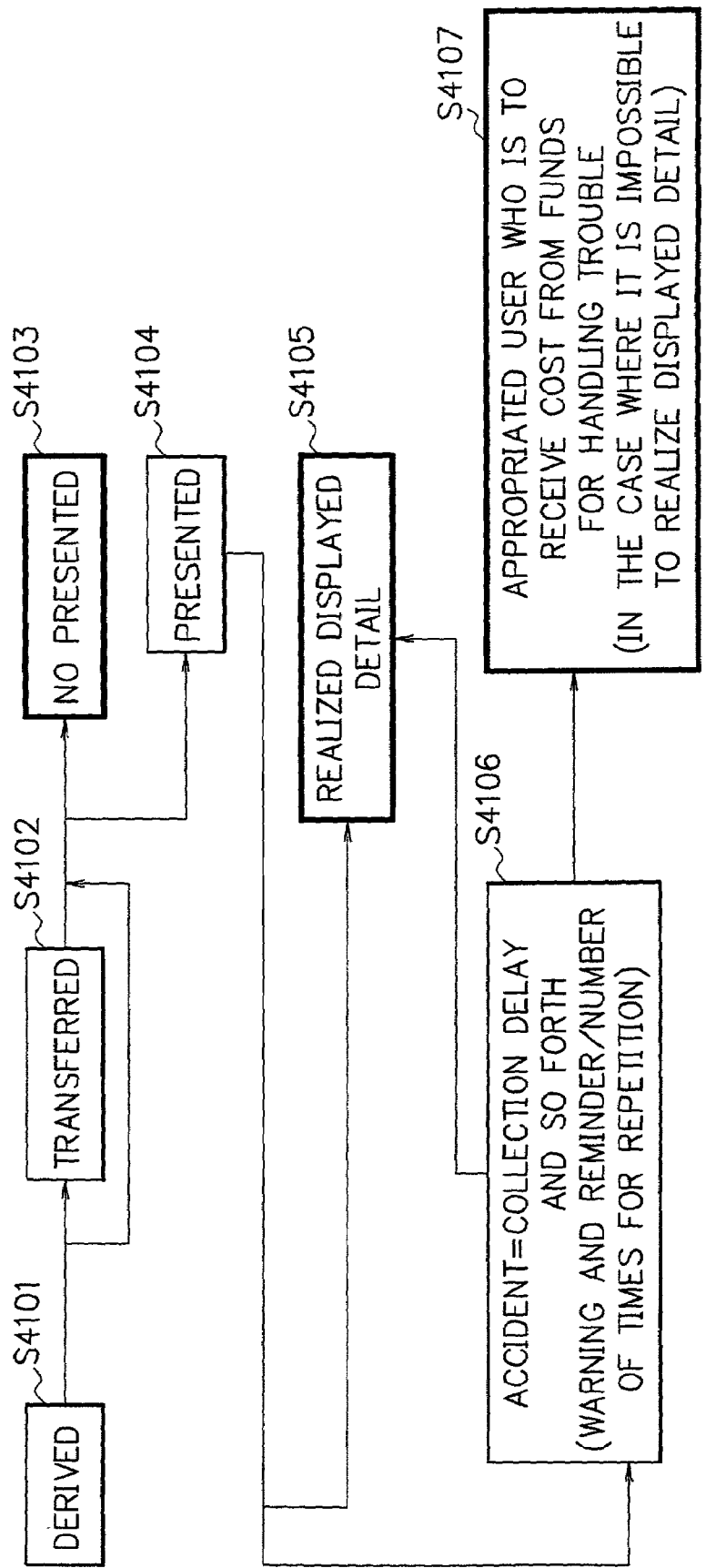

METHOD, DEVICE, SYSTEM, AND PROGRAM FOR TRANSACTION OF CONTENTS THROUGH NETWORK

BACKGROUND OF THE INVENTION

The present invention relates to a method, device, system, and program for transaction of contents through a network such as the Internet. The contents are, for example, contents such as voice, images, shapes and language, and contents concerning music, such as lyrics, music compositions, and musical performance, which are often authorized as copyright, moral right, literary neighboring rights, publicity, an industrial design, a trademark and so forth that are regarded as economically valuable.

DESCRIPTION OF THE RELATED ART

In conventional transaction of the above-described contents, a promise of consent of use or transfer is made between a person who has a right and someone who offers to use the right. They exchange a contract document in which prescribed particulars are filled up.

However, because the above-described conventional transaction of contents is made by exchanging a contract document in which prescribed particulars are filled up, it takes a long time to complete a transaction. Besides, it is difficult to make contents widely known to the public. Further, it is also difficult to get a hold of contents which someone offers to use quickly. Thereby, transparency, distributability, and cashability, which are required in transaction circumstances, are inhibited.

SUMMARY OF THE INVENTION

It is therefore an object of the present invention to provide a method, device, system and program for transaction of contents through a network such as the Internet wherein: it is possible to transact contents easily and securely with transparency, distributability and cashability according to circumstances; it is possible to spread contents widely; and further it is possible to get a hold of contents which someone offers to use quickly.

According to a first aspect of the present invention, for achieving the objects mentioned above, there is provided a method for transaction of contents through a network, when consent of use/delivery or transfer/delivery of contents concerned in a first user is requested by a second user, comprising a first process of deriving a token for the consent of use/delivery or the transfer/delivery of the contents, and sending the token to the second user through a network or using an off-network medium.

According to a second aspect of the present invention, the first process includes a second process of deriving a token for collection of cost from the second user to the first user concerned in the consent of use/delivery or the transfer/delivery of the contents, and sending the token to the first user through a network or using an off-network medium.

According to a third aspect of the present invention, the second process includes a third process of sending the token for the collection of the cost concerned in the consent of use/delivery or the transfer/delivery of the contents sent from the first user to a third user through a network or using an off-network medium when transfer of the token sent to the first user is requested by the third user.

According to a fourth aspect of the present invention, the third process includes a fourth process of deriving a new token for collection of cost from the third user to the first user concerned in the transfer of the token for the collection of the cost, and sending the new-derived token to the first user through a network or using an off-network medium.

According to a fifth aspect of the present invention, the first process includes a fifth process of sending the token for the consent of use/delivery or the transfer/delivery of the contents sent from the second user to a third user through a network or using an off-network medium when transfer of the token sent to the second user is requested by the third user.

According to a sixth aspect of the present invention, the fifth process includes a sixth process of deriving a new token for collection of cost from the third user to the second user concerned in the transfer of the token for the consent of use/delivery or the transfer/delivery of the contents, and sending the new-derived token to the second user through a network or using an off-network medium.

According to a seventh aspect of the present invention, the method for transaction of contents through a network further comprises a seventh process of implementing the consent of use or the transfer of the contents by sending (i.e., delivery of) the contents to the user who holds the token through a network or using an off-network medium when realization of detail displayed in the token for the consent of use/delivery or the transfer/delivery of the contents is requested by the user who holds the token.

According to an eighth aspect of the present invention, the method for transaction of contents through a network further comprises an eighth process of implementing the collection of the cost from the user who is to pay the cost to the user who is to receive the cost when realization of detail displayed in the token for the collection of the cost is requested by the user who holds the token.

According to a ninth aspect of the present invention, there is provided a method for transaction of contents through a network, when transfer of a token for consent of use/delivery or transfer/delivery of contents held by a first user is requested by a second user, comprising a ninth process of sending the token for the consent of use/delivery or the transfer/delivery of the contents sent from the first user to the second user through a network or using an off-network medium.

According to a tenth aspect of the present invention, the ninth process comprises a tenth process of deriving a new token for collection of cost from the second user to the first user concerned in the transfer of the token, and sending the new-derived token to the first user through a network or using an off-network medium.

According to an eleventh aspect of the present invention, there is provided a method for transaction of contents through a network, when transfer of a token for collection of cost held by a first user is requested by a second user, comprising an eleventh process of sending the token for the collection of the cost sent from the first user to the second user through a network or using an off-network medium.

According to a twelfth aspect of the present invention, the eleventh process includes a twelfth process of deriving a new token for collection of cost from the second user to the first user concerning the transfer of the token, and sending the new-derived token to the first user through a network or using an off-network medium.

According to a thirteenth aspect of the present invention, the method for transaction of contents through a network further comprises a thirteenth process of holding the sent token in a network or in an off-network medium.

According to a fourteenth aspect of the present invention, there is provided a method for transaction of contents through a network, when realization of detail displayed in a token for consent of use/delivery or transfer/delivery of contents held by a first user is requested by the first user, comprising a fourteenth process of implementing the consent of use or the transfer of the contents by sending (i.e., delivery of) the contents to the first user through a network or using an off-network medium.

According to a fifteenth aspect of the present invention, there is provided a method for transaction of contents through a network, when realization of detail displayed in a token for collection of cost from a second user to a first user held by the first user is requested by the first user, comprising a fifteenth process of implementing the collection of the cost from the second user to the first user.

According to a sixteenth aspect of the present invention, the method for transaction of contents through a network further comprises a sixteenth process of writing down a record of derivation/transfer of the token simultaneously in a data base in a center and in the token.

According to a seventeenth aspect of the present invention, the first process includes a seventeenth process of letting a user read prescribed items concerned in the contents, and letting a user decide to receive consent of use or an assign concerned in the contents.

According to an eighteenth aspect of the present invention, the seventeenth process includes an eighteenth process that the prescribed items includes rightful claimant, consent of use/delivery or transfer/delivery, and cost, letting a user read prescribed items concerned in the contents, and letting a user decide to receive consent of use or an assign concerned in the contents.

According to a nineteenth aspect of the present invention, the ninth process includes a nineteenth process of holding the token for the consent of use/delivery or the transfer/delivery of the contents, which the first user hopes to transfer, after the token is sent from the first user, and sending the token to the first user through a network or using an off-network medium when the transfer of the token did not occur.

According to a twentieth aspect of the present invention, the eleventh process includes a twentieth process of holding the token for the collection of the cost, which the first user hopes to transfer, after the token is sent from the first user, and sending the token to the first user through a network or using an off-network medium when the transfer of the token did not occur.

According to a twenty-first aspect of the present invention, the method for transaction of contents through a network further comprises a twenty-first process of writing down a record of the realization of the detail displayed in the token in a data base in a center, and writing off the token.

According to a twenty-second aspect of the present invention, when there is no presentation of the token for the realization of the detail displayed in the token, the method for transaction of contents through a network further comprises a twenty-second process of writing down a record of no presentation in a data base in a center.

According to a twenty-third aspect of the present invention, the method for transaction of contents through a network further comprises a twenty-third process of controlling by checking the record written down in the data base against the record written down in the token.

According to a twenty-fourth aspect of the present invention, there is provided a method for transaction of contents through a network, comprising a twenty-fourth process of collecting original funds forming funds for handling trouble from a user, which are used for appropriation or compensation in the case of an accident concerned in contents and a token, and holding the collected original funds.

According to a twenty-fifth aspect of the present invention, the twenty-fourth process includes a twenty-fifth process of setting up new original funds calculated by adding interest arrears to the original funds, setting up a new deadline for collecting the new original funds, and displaying a warning that the original funds are uncollected and a reminder that the user should pay the new original funds by the new deadline on a user terminal of a user who should pay the original funds when the original funds are not collected from the user who should pay the original funds by a deadline for collecting the original funds.

According to a twenty-sixth aspect of the present invention, the method for transaction of contents through a network further comprises a twenty-sixth process of banning the user who should pay the original funds from conducting transaction of contents or a token, and writing off contents and an adaptation thereof whose rightful claimant is the user and which are registered in a data base in a center, when it becomes definite that the user does not pay the original funds.

According to a twenty-seventh aspect of the present invention, the twenty-fourth process further includes a twenty-seventh process of setting up new cost calculated by adding interest arrears to the cost, setting up a new deadline for collection of the new cost, and displaying a warning that the cost is uncollected and a reminder that a user who should pay the cost should pay the new cost by the new deadline on a terminal of the user, when a token for collection of cost concerned in consent of use/delivery or transfer/delivery of contents, or a token for collection of cost concerned in transfer of a token is presented, and the cost is uncollected from the user by a deadline for collection of the cost.

According to a twenty-eighth aspect of the present invention, the twenty-seventh process further includes a twenty-eighth process of implementing appropriation from the funds for handling trouble to a user who is to receive the new cost, when it becomes definite that the new cost is uncollected from the user who should pay the cost.

According to a twenty-ninth aspect of the present invention, the method for transaction of contents through a network further comprises a twenty-ninth process of banning the user who should pay the cost from conducting transaction of contents or a token, and writing off contents and an adaptation thereof whose rightful claimant is the user and which are registered in a data base in a center, when it becomes definite that the user does not pay the new cost.

According to a thirtieth aspect of the present invention, the twenty-fourth process includes a thirtieth process of displaying a warning that an accident occurred in using contents registered in a data base in a center by a user and a reminder that the user should avoid the accident concerned in the contents on a user terminal of the user who registered the contents, in the case of the accident in using the contents.

According to a thirty-first aspect of the present invention, the thirtieth process further includes a thirty-first process of compensating a user who presented a token for consent of use/delivery or transfer/delivery of the contents to which the accident occurred during a period of presentation for the token with the funds for handling trouble, when it becomes definite that the accident concerned in the contents is not avoided.

According to a thirty-second aspect of the present invention, the method for transaction of contents through a network further comprises a thirty-second process of banning the user who should avoid the accident from conducting transaction of contents or a token, and writing off contents and an adaptation thereof, which are registered in a data base in a center and whose rightful claimant is the user, from the data base in the center, when it becomes definite that the accident concerned in the contents is not avoided.

According to a thirty-third aspect of the present invention, the method for transaction of contents through a network further comprises a thirty-third process of compensating a user, who presented a token for consent of use/delivery or transfer/delivery of the written-off contents and an adaptation thereof during a period of presentation for the token, with the funds for handling trouble.

According to a thirty-fourth aspect of the present invention, there is provided a method for transaction of contents through a network, when presentation for realization of detail displayed in a token is not implemented by a prescribed deadline during a period of presentation, comprising a thirty-fourth process of displaying a warning that the presentation is not implemented on a user terminal of a user who holds the token.

According to a thirty-fifth aspect of the present invention, there is provided a method for transaction of contents through a network, comprising a thirty-fifth process of displaying situations about consent of use/delivery or transfer/delivery of contents and collection of cost on a user terminal of a user concerned in the contents.

According to a thirty-sixth aspect of the present invention, there is provided a method for transaction of contents through a network, comprising a thirty-sixth process of displaying/informing information about a warning, reminder, and period of presentation with at least one selected from characters, color, illustration, and voice on a user terminal.

According to a thirty-seventh aspect of the present invention, the method for transaction of contents through a network further comprises a thirty-seventh process of writing down an effect that collection of the funds for handling trouble, appropriation and compensation were implemented in a data base in a center when the collection of the funds for handling trouble, appropriation and compensation were implemented.

According to a thirty-eighth aspect of the present invention, the method for transaction of contents through a network further comprises a thirty-eighth process of displaying situations about collection of the funds for handling trouble, appropriation and compensation on a user terminal of a user who is to receive collection of the funds for handling trouble, appropriation or compensation.

According to a thirty-ninth aspect of the present invention, the method for transaction of contents through a network further comprises a thirty-ninth process of displaying a notification that the user was banned from conducting transaction of contents and a token and the contents were written off on a user terminal of the user who was banned from conducting transaction of contents and a token.

According to a fortieth aspect of the present invention, the method for transaction of contents through a network further comprises a fortieth process of writing down the effect that the user was banned from conducting transaction of contents and a token and the contents were written off in a data base in a center.

According to a forty-first aspect of the present invention, the method for transaction of contents through a network further comprises a forty-first process of writing down a record of displaying the warning and/or the reminder on the user terminal in a data base in a center in the case of displaying the warning and the reminder on the user terminal.

According to a forty-second aspect of the present invention, there is provided a device for transaction of contents through a network, when consent of use/delivery or transfer/delivery of contents concerned in a first user is requests by a second user, comprising a first means of deriving a token for the consent of use/delivery or the transfer/delivery of the contents, and sending the token to the second user through a network or using an off-network medium.

According to a forty-third aspect of the present invention, there is provided a device for transaction of contents through a network, when transfer of a token for consent of use/delivery or transfer/delivery of contents held by a first user is requested by a second user, comprising a second means of sending the token for the consent of use/delivery or the transfer/delivery of the contents sent from the first user to the second user through a network or using an off-network medium.

According to a forty-fourth aspect of the present invention, there is provided a device for transaction of contents through a network, when transfer of a token for collection of cost held by a first user is requested by a second user, comprising a third means of sending the token for the collection of the cost sent from the first user to the second user through a network or using an off-network medium.

According to a forty-fifth aspect of the present invention, there is provided a device for transaction of contents through a network, when realization of detail displayed in a token for consent of use/delivery or transfer/delivery of contents held by a first user is requested by the first user, comprising a fourth means of implementing the consent of use or the transfer of the contents by sending (i.e., delivery of the contents to the first user through a network or using an off-network medium.

According to a forty-sixth aspect of the present invention, there is provided a device for transaction of contents through a network, when realization of detail displayed in a token for collection of cost from a second user to a first user held by the first user is requested by the first user, comprising a fifth means of implementing the collection of the cost from the second user to the first user.

According to a forty-seventh aspect of the present invention, there is provided a device for transaction of contents through a network, comprising a sixth means of collecting original funds from a user and holding the original funds in order to form funds for handling trouble, which are used for appropriation or compensation in the case of an accident concerned in contents and a token, and holding the collected original funds.

According to a forty-eighth aspect of the present invention, the sixth means includes steps of setting up new original funds calculated by adding interest arrears to the original funds, setting up a new deadline for collecting the new original funds, and displaying a warning that the original funds are uncollected and a reminder that the user who should pay the original funds should pay the new original funds by the new deadline on a user terminal of the user, when the original funds are not collected from the user by a deadline for collecting the original funds.

According to a forty-ninth aspect of the present invention, there is provided a device for transaction of contents through a network, comprising a seventh means of banning the user who should pay the original funds from conducting transaction of contents or a token, and writing off contents and an adaptation thereof whose rightful claimant is the user and which are registered in a data base in a center, when it becomes definite that the user does not pay the original funds.

According to a fiftieth aspect of the present invention, there is provided a device for transaction of contents through a network, comprising an eighth means of setting up new cost calculated by adding interest arrears to cost, setting up a new deadline for collection of the new cost, and displaying a warning that the cost is uncollected and a reminder that a user who should pay the cost should pay the new cost by the new deadline on a terminal of the user, when a token for collection of cost concerned in consent of use/delivery or transfer/delivery of contents or a token for collection of cost concerned in transfer of a token is presented, and the cost is uncollected from the user by a deadline for collection of the cost.

According to a fifty-first aspect of the present invention, the eighth means further includes a step of implementing appropriation from the funds for handling trouble to a user who is to receive the new cost, when it becomes definite that the new cost is not collected from the user who should pay the new cost by the new deadline.

According to a fifty-second aspect of the present invention, there is provided a device for transaction of contents through a network, comprising a ninth means of banning the user who should pay the cost from conducting transaction of contents or a token, and writing off contents and an adaptation thereof whose rightful claimant is the user and which are registered in a data base in a center, when it becomes definite that the user does not pay the new cost.

According to a fifty-third aspect of the present invention, there is provided a device for transaction of contents through a network, comprising a tenth means of displaying a warning that an accident occurred in using contents registered in a data base in a center by a user and a reminder that the user should avoid the accident concerned in the contents on a user terminal of the user who registered the contents, in the case of the accident in using the contents.

According to a fifty-fourth aspect of the present invention, the tenth means further includes a step of compensating a user who presented a token for consent of use/delivery or transfer/delivery of the contents to which the accident occurred during a period of presentation for the token with the funds for handling trouble, when it becomes definite that the accident concerned in the contents is not avoided.

According to a fifty-fifth aspect of the present invention, there is provided a device for transaction of contents through a network, comprising an eleventh means of banning the user who should avoid the accident from conducting transaction of contents or a token, and writing off contents and an adaptation thereof, which are registered in a data base in a center and whose rightful claimant is the user, from the data base in the center, when it becomes definite that the accident concerned in the contents to which the accident occurred is not avoided.

According to a fifty-sixth aspect of the present invention, there is provided a device for transaction of contents through a network, comprising a twelfth means of compensating a user, who presented a token for consent of use/delivery or transfer/delivery of the written-off contents and an adaptation of the written-off contents during a period of presentation for the token, with the funds for handling trouble.

According to a fifty-seventh aspect of the present invention, there is provided a device for transaction of contents through a network, when presentation for realization of detail displayed in a token is not implemented by a prescribed deadline during a period of presentation, comprising a thirteenth means of displaying a warning that the presentation is not implemented on a user terminal of a user who holds the token.

According to a fifty-eighth aspect of the present invention, there is provided a device for transaction of contents through a network, comprising fourteenth means of displaying situations about consent of use/delivery or transfer/delivery of contents and collection of cost on a user terminal of a user concerned in the contents.

According to a fifty-ninth aspect of the present invention, there is provided a device for transaction of contents through a network, comprising a fifteenth means of displaying/informing information about a warning, reminder, and period of presentation with at least one selected from characters, color, illustration, and voice on a user terminal.

According to a sixtieth aspect of the present invention, the first means comprises a step of deriving a token for collection of cost from the second user to the first user concerned in the consent of use/delivery or the transfer/delivery of the contents, and sending the token to the first user through a network or using an off-network medium.

According to a sixty-first aspect of the present invention, the second means comprises a step of deriving a new token for collection of cost from the second user to the first user concerned in the transfer of the token, and sending the new-derived token to the first user through a network or using an off-network medium.

According to a sixty-second aspect of the present invention, the third means comprises a step of deriving a new token for collection of cost from the second user to the first user concerning the transfer of the token, and sending the new-derived token to the first user through a network or using an off-network medium.

According to a sixty-third aspect of the present invention, there is provided a device for transaction of contents through a network, when collection of the funds for handling trouble, appropriation and compensation were implemented, further comprising a sixteenth means of writing down the effect of the implementation in a data base in a center.

According to a sixty-fourth aspect of the present invention, there is provided a device for transaction of contents through a network, further comprising a seventeenth means of displaying situations about collection of the funds for handling trouble, appropriation and compensation on a terminal of a user who is to receive collection of the funds for handling trouble, appropriation or compensation.

According to a sixty-fifth aspect of the present invention, there is provided a device for transaction of contents through a network, further comprising an eighteenth means of displaying a notification that the user was banned from conducting transaction of contents and a token and the contents were written off on a user terminal of the user who was banned from conducting transaction of contents and a token.

According to a sixty-sixth aspect of the present invention, there is provided a device for transaction of contents through a network, further comprising a nineteenth means of writing down the effect that the user was banned from conducting transaction of contents and a token and the contents were written off in a data base in a center.

According to a sixty-seventh aspect of the present invention, there is provided a device for transaction of contents through a network, in the case of displaying the warning and the reminder on the user terminal, further comprising a twentieth means of writing down a record of displaying the warning and the reminder on the user terminal in a data base in a center.

According to a sixty-eighth aspect of the present invention, there is provided a system for transaction of contents through a network, comprising:

a user terminal which is applied in requesting consent of use/delivery or transfer/delivery of contents; and a server in a center which derives a token for consent of use/delivery or transfer/delivery of contents concerned in a first user and sends the token to a second user through a network or using an off-network medium, when the consent of use/delivery or the transfer/delivery of the contents is requested by the second user applying the user terminal.

According to a sixty-ninth aspect of the present invention, there is provided a system for transaction of contents through a network, comprising:

a user terminal which is applied in requesting transfer of a token for consent of use/delivery or transfer/delivery of contents; and a server in a center which sends a token for consent of use/delivery or transfer/delivery of contents held by a first user and sent from the first user to a second user through a network or using an off-network medium, when the token for the consent of use/delivery or the transfer/delivery of the contents is requested by the second user applying the user terminal.

According to a seventieth aspect of the present invention, there is provided a system for transaction of contents through a network, comprising:

a user terminal which is applied in requesting transfer of a token for collection of cost; and a server in a center which sends a token for collection of cost held by a first user and sent from the first user to a second user through a network or using an off-network medium, when transfer of the token for the collection of the is requested by the second user applying the user terminal.

According to a seventy-first aspect of the present invention, there is provided a system for transaction of contents through a network, comprising:

a user terminal which is applied in requesting realization of detail displayed in a token for consent of use/delivery or transfer/delivery of contents; and a server in a center which implements consent of use or transfer of contents by sending (i.e., delivery of the contents to a first user through a network or using an off-network medium, when realization of detail displayed in a token for the consent of use/delivery or the transfer/delivery of the contents held by the first user is requested by the first user applying the user terminal.

According to a seventy-second aspect of the present invention, there is provided a system for transaction of contents through a network, comprising:

a user terminal which is applied in requesting realization of detail displayed in a token for collection of cost; and a server in a center which implements collection of cost from a second user to a first user, when realization of detail displayed in a token for the collection of the cost from the second user to the first user held by the first user is requested by the first user applying the user terminal.

According to a seventy-third aspect of the present invention, there is provided a system for transaction of contents through a network, comprising:

a user terminal of a user who should pay original funds, on which a situation about the original funds forming funds for handling trouble applied for appropriation or compensation in the case of an accident concerned in contents and a token is displayed; and a server in a center, when the original funds are not collected from the user who should pay the original funds by a deadline for the original funds, which sets up new original funds calculated by adding interest arrears to the original funds, sets up a new deadline for collecting the new original funds, and sends a warning that the original funds are uncollected and a reminder that the user should pay the new original funds by the new deadline to the user terminal through a network or using an off-network medium.

According to a seventy-fourth aspect of the present invention, a server in the center bans the user who should pay the original funds from conducting transaction of contents or a token, and writes off registered contents and an adaptation of contents whose rightful claimant is the user who should pay the original funds, when it becomes definite that the original funds are not paid by the user who should pay the original funds.

According to a seventy-fifth aspect of the present invention, when a token for collection of cost concerned in consent of use/delivery or transfer/delivery of contents or a token for collection of cost concerned in transfer of a token is presented for realization of detail displayed in the token, and the cost is not collected from a user who should pay the cost by a deadline, a server in the center sets up new cost calculated by adding interest arrears to the cost and a deadline for collecting the new cost, and sends a warning that the cost is uncollected and a reminder that the user who should pay the cost should pay the new cost by the new deadline to a user terminal of the user who should pay the cost through a network or using an off-network medium.

According to a seventy-sixth aspect of the present invention, when it becomes definite that the user who should pay the cost did not pay the new cost, a server in the center writes down a record that appropriation is implemented to a user who is to receive the new cost in a data base in the center.

According to a seventy-seventh aspect of the present invention, when it becomes definite that the new cost is not paid by the user who should pay the new cost, a server in the center bans the user who should pay the cost from conducting transaction of contents or a token, and writes off contents and an adaptation of contents which are registered in a data base in the center and whose rightful claimant is the user who should pay the cost from the data base in the center.

According to a seventy-eighth aspect of the present invention, a server in the center sends a warning that an accident occurred in using contents registered in a data base in the center and a reminder that a user who registered the contents in the data base in the center should avoid the accident to a user terminal of the user who registered the contents through a network or using an off-network medium.

According to a seventy-ninth aspect of the present invention, when it becomes definite that the accident concerned in the contents to which the accident occurred is not avoided, a server in the center writes down a record in a data base in the center that compensation was implemented to a user who presented a token for consent of use/delivery or transfer/delivery of the contents to which the accident occurred during a period of presentation for the token.

According to an eightieth aspect of the present invention, when it becomes definite that the accident concerned in the contents to which the accident occurred is not avoided, a server in the center bans the user who should avoid the accident from conducting transaction of contents or a token, and writes off contents and an adaptation, which are registered in a data base in a center and whose rightful claimant is the user who should avoid the accident, from the data base in the center.

According to an eighty-first aspect of the present invention, a server writes down a record in a data base in the center that compensation from the funds for handling trouble was implemented to a user who presented a token for consent of use/delivery or transfer/delivery of the written-off contents and an adaptation of the written-off contents during a period of presentation for the token.

According to an eighty-second aspect of the present invention, there is provided a system for transaction of contents through a network, comprising:

a user terminal which is applied in requesting realization of detail displayed in a token; and a server in a center which sends a warning that presentation for realizing the detail displayed in the token is not implemented to the user terminal through a network or using an off-network medium, when the presentation is not implemented by a prescribed deadline during a period of presentation for realizing the detail displayed in the token.

According to an eighty-third aspect of the present invention, there is provided a system for transaction of contents through a network, comprising:

a user terminal of a user concerned in consent of use/delivery or transfer/delivery of contents or collection of cost, on which a situation about consent of use/delivery or transfer/delivery of the contents, or collection of the cost is displayed; and a server in a center which sends a situation about the consent of use/delivery or the transfer/delivery of the contents, or the collection of the cost to the user terminal through a network or using an off-network medium.

According to an eighty-fourth aspect of the present invention, there is provided a system for transaction of contents through a network, comprising:

a user terminal on which a warning, reminder, and period of presentation sent from a server in a center are displayed; and a server in a center which displays/informs information about the warning, reminder, and period of presentation with at least one selected from characters, color, illustration, and voice on the user terminal.

According to an eighty-fifth aspect of the present invention, a server in the center derives a token for collection of cost from the second user to the first user concerned in the consent of use/delivery or the transfer/delivery of the contents, and sends the token to the first user through a network or using an off-network medium.

According to an eighty-sixth aspect of the present invention, a server in the center derives a new token for collection of cost from the second user to the first user concerned in the transfer of the token for the consent of use/delivery or the transfer/delivery of the contents, and sends the new-derived token to the first user through a network or using an off-network medium.

According to an eighty-seventh aspect of the present invention, a server in the center derives a new token for collection of cost from the second user to the first user concerned in the transfer of the token, and sends the new-derived token to the first user through a network or using an off-network medium.

According to an eighty-eighth aspect of the present invention, a server in the center writes down a record that collection of the funds for handling trouble, compensation and appropriation were implemented in the data base in the center when collection of the funds for handling trouble, compensation, and appropriation were implemented.

According to an eighty-ninth aspect of the present invention, a server in the center sends situations about collection of the funds for handling trouble, compensation and appropriation to a user terminal of a user who is to receive collection of the funds for handling trouble, compensation and appropriation through a network or using an off-network medium.

According to a ninetieth aspect of the present invention, a server in the center sends a notification that the user was banned from conducting transaction of contents and a token and the contents were written off to a user terminal of the user who was banned from conducting transaction of contents and a token through a network or using an off-network medium.

According to a ninety-first aspect of the present invention, a server writes down a record that the user was banned from conducting transaction of contents and a token and the contents of the user were written off in the data base in the center.

According to a ninety-second aspect of the present invention, a server in the center writes down a record that the server displays the warning and the reminder on the user terminal in the data base in the center, when the server displays the warning and the reminder on the user terminal.

According to a ninety-third aspect of the present invention, there is provided a program which is for implementing a method for transaction of contents through a network as claimed in claims 1 to 44.

BRIEF DESCRIPTION OF THE DRAWINGS

The objects and features of the present invention will become more apparent from the consideration of the following detailed description taken in conjunction with the accompanying drawings in which:

FIG. 10A is a diagram explaining detail of tokens which are derived from or transferred via the center shown in FIG. 1;

FIG. 10B is a diagram explaining detail of tokens which are derived from or transferred via the center shown in FIG. 1;

FIG. 11A is a diagram explaining detail of tokens which are derived from or transferred via the center shown in FIG. 1;

FIG. 11B is a diagram explaining detail of tokens which are derived from or transferred via the center shown in FIG. 1;

FIG. 11C is a diagram explaining detail of tokens which are derived from or transferred via the center shown in FIG. 1;

FIG. 12A is a diagram explaining detail of tokens which are derived from or transferred via the center shown in FIG. 1;

FIG. 12B is a diagram explaining detail of tokens which are derived from or transferred via the center shown in FIG. 1;

FIG. 13A is a diagram explaining detail of tokens which are derived from or transferred via the center shown in FIG. 1;

FIG. 13B is a diagram explaining detail of tokens which are derived from or transferred via the center shown in FIG. 1;

FIG. 14A is a diagram explaining detail of tokens which are derived from or transferred via the center shown in FIG. 1;

FIG. 14B is a diagram explaining detail of tokens which are derived from or transferred via the center shown in FIG. 1;

FIG. 15 is a flowchart explaining an example of operation with respect to each case of the method for transaction of contents through a network in the transaction system shown in FIG. 1;

FIG. 16 is a flowchart explaining an example of operation with respect to each case of the method for transaction of contents through a network in the transaction system shown in FIG. 1;

FIG. 17 is a flowchart explaining an example of operation with respect to each case of the method for transaction of contents through a network in the transaction system shown in FIG. 1;

FIG. 26A is a diagram explaining detail of a warning sent from the center shown in FIG. 1;

FIG. 26B is a diagram explaining detail of a warning sent from the center shown in FIG. 1;

FIG. 27A is a diagram explaining detail of a warning, reminder, and record sent from the center shown in FIG. 1;

FIG. 27B is a diagram explaining detail of a warning, reminder, and record sent from the center shown in FIG. 1;

FIG. 28A is a diagram explaining detail of a warning, reminder, and record sent from the center shown in FIG. 1;

FIG. 28B is a diagram explaining detail of a warning, reminder, and record sent from the center shown in FIG. 1;

FIG. 29A is a diagram explaining detail of a warning, reminder, and record sent from the center shown in FIG. 1;

FIG. 29B is a diagram explaining detail of a warning, reminder, and record sent from the center shown in FIG. 1;

FIG. 29C is a diagram explaining detail of a warning, reminder, and record sent from the center shown in FIG. 1;

FIG. 29D is a diagram explaining detail of a warning, reminder, and record sent from the center shown in FIG. 1;

FIG. 30A is a diagram explaining detail of a notification and a record sent from the center shown in FIG. 1;

FIG. 30B is a diagram explaining detail of a notification and a record sent from the center shown in FIG. 1;

FIG. 30C is a diagram explaining detail of a notification and a record sent from the center shown in FIG. 1;

FIG. 30D is a diagram explaining detail of a notification and a record sent from the center shown in FIG. 1;

FIG. 31A is a diagram explaining detail of a warning, reminder, and record sent from the center shown in FIG. 1;

FIG. 31B is a diagram explaining detail of a warning, reminder, and record sent from the center shown in FIG. 1;

FIG. 31C is a diagram explaining detail of a warning, reminder, and record sent from the center shown in FIG. 1;

FIG. 31D is a diagram explaining detail of a warning, reminder, and record sent from the center shown in FIG. 1;

FIG. 32A is a diagram explaining detail of a notification and a record sent from the center shown in FIG. 1;

FIG. 32B is a diagram explaining detail of a notification and a record sent from the center shown in FIG. 1;

FIG. 32C is a diagram explaining detail of a notification and a record sent from the center shown in FIG. 1;

FIG. 32D is a diagram explaining detail of a notification and a record sent from the center shown in FIG. 1;

FIG. 33A is a diagram explaining detail of a warning/reminder sent from the center shown in FIG. 1;

FIG. 33B is a diagram explaining detail of a warning/reminder sent from the center shown in FIG. 1;

FIG. 34 is a diagram showing a situation about consent of use/delivery or transfer/delivery, or collection of cost concerning contents in the transaction system shown in FIG. 1;

FIG. 35A is a diagram showing a situation about consent of use/delivery or transfer/delivery of contents, and collection of cost sent from the center shown in FIG. 1;

FIG. 35B is a diagram showing a situation about consent of use/delivery or transfer/delivery of contents, and collection of cost sent from the center shown in FIG. 1;

FIG. 35C is a diagram showing a situation about consent of use/delivery or transfer/delivery of contents, and collection of cost sent from the center shown in FIG. 1;

FIG. 35D is a diagram showing a situation about consent of use/delivery or transfer/delivery of contents, and collection of cost sent from the center shown in FIG. 1;

FIG. 36A is a diagram showing a situation about consent of use/delivery or transfer/delivery of contents, and collection of cost sent from the center shown in FIG. 1;

FIG. 36B is a diagram showing a situation about consent of use/delivery or transfer/delivery of contents, and collection of cost sent from the center shown in FIG. 1;

FIG. 36C is a diagram showing a situation about consent of use/delivery or transfer/delivery of contents, and collection of cost sent from the center shown in FIG. 1;

FIG. 36D is a diagram showing a situation about consent of use/delivery or transfer/delivery of contents, and collection of cost sent from the center shown in FIG. 1;

FIG. 37A is a diagram showing a situation about consent of use/delivery or transfer/delivery of contents, and collection of cost sent from the center shown in FIG. 1;

FIG. 37B is a diagram showing a situation about consent of use/delivery or transfer/delivery of contents, and collection of cost sent from the center shown in FIG. 1;

FIG. 37C is a diagram showing a situation about consent of use/delivery or transfer/delivery of contents, and collection of cost sent from the center shown in FIG. 1;

FIG. 37D is a diagram showing a situation about consent of use/delivery or transfer/delivery of contents, and collection of cost sent from the center shown in FIG. 1;

FIG. 38A is a diagram showing a situation about consent of use/delivery or transfer/delivery of contents, and collection of cost sent from the center shown in FIG. 1;

FIG. 38B is a diagram showing a situation about consent of use/delivery or transfer/delivery of contents, and collection of cost sent from the center shown in FIG. 1;

FIG. 38C is a diagram showing a situation about consent of use/delivery or transfer/delivery of contents, and collection of cost sent from the center shown in FIG. 1;

FIG. 38D is a diagram showing a situation about consent of use/delivery or transfer/delivery of contents, and collection of cost sent from the center shown in FIG. 1;

FIG. 39A is a diagram explaining a situation about funds for handling trouble sent from the center shown in FIG. 1;

FIG. 39B is a diagram explaining a situation about funds for handling trouble sent from the center shown in FIG. 1;

FIG. 39C is a diagram explaining a situation about funds for handling trouble sent from the center shown in FIG. 1;

FIG. 39D is a diagram explaining a situation about funds for handling trouble sent from the center shown in FIG. 1;

FIG. 41 is a diagram explaining a record of a token in the transaction system shown in FIG. 1.

DESCRIPTION OF THE PREFERRED EMBODIMENTS

Figure 1:
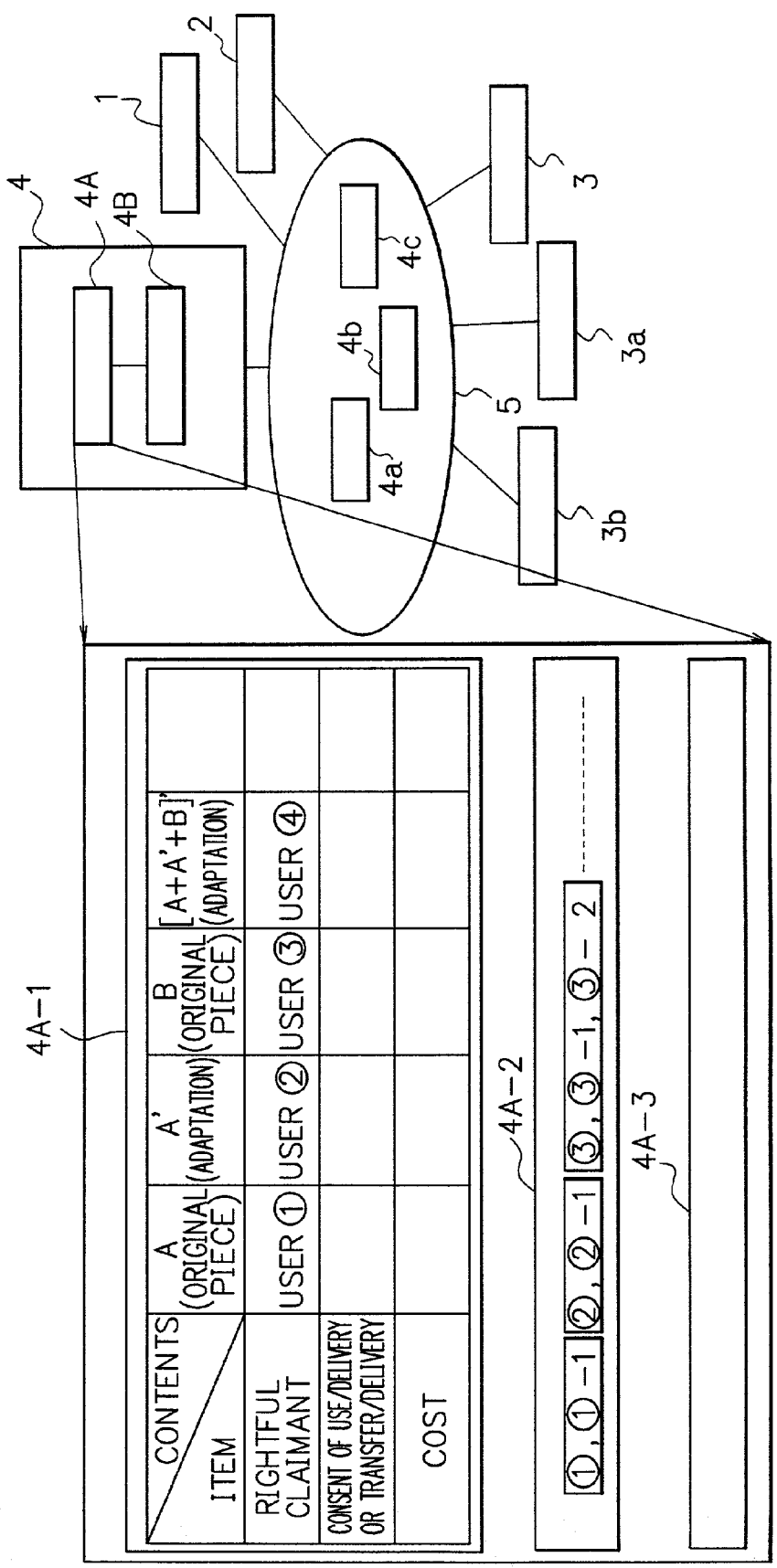
FIG. 1 is a diagram showing an outline of a method for transaction of contents through a network according to an embodiment of the present invention.

Referring now to the drawings, an embodiment of the present invention is explained in detail.

Figure 2:
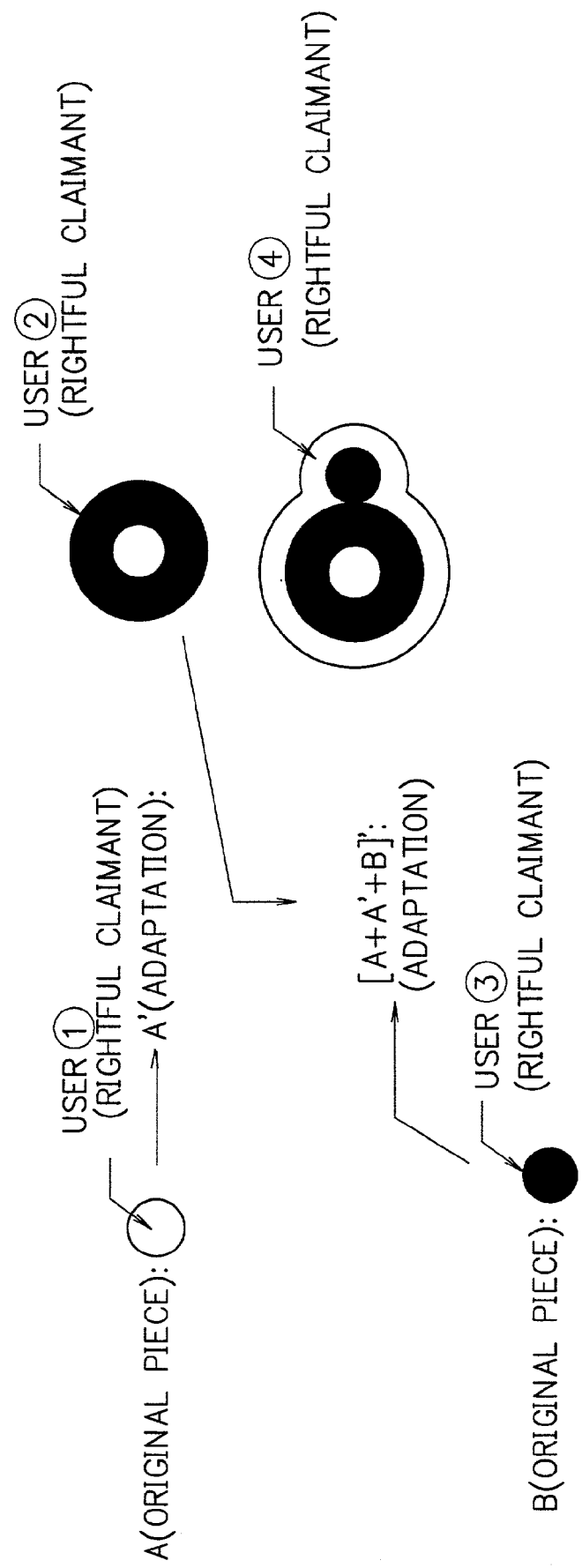
FIG. 2 is a diagram explaining a conformation of transaction of contents in the transaction system shown in FIG. 1.

FIG. 1 is a diagram showing an outline of a method for transaction of contents through a network according to an embodiment of the present invention. FIG. 2 is a diagram explaining a conformation of transaction of contents in the transaction system shown in FIG. 1. FIGS. 3 to 8 are flowcharts explaining an example of operation with respect to each case of the method for transaction of contents through a network in the transaction system shown in FIG. 1. FIG. 9 is a flowchart explaining a concrete example of the method for transaction of contents through a network in the transaction system shown in FIG. 1 by showing tokens. FIGS. 10A to 14B are diagrams explaining detail of tokens which are derived from or transferred via the center shown in FIG. 1.

In the transaction system shown in FIG. 1, a user ① (first user) terminal 1, a user ② (second user) terminal 2, a user ③ (third user) terminal 3, a user ④ (fourth user) terminal 3a and a user ⑤ (fifth user) terminal 3b, and a center 4 are connected to each other through the Internet 5.

The first user terminal 1, the second user terminal 2, the third user terminal 3, the fourth user terminal 3a and the fifth user terminal 3b are applied by the first to fifth users when each of the users registers/holds contents in the center 4 and applies contents registered/held in the center 4 by exchanging after-mentioned tokens 4a to 4c, which are derived from or transferred via the center 4, between the user terminals.

A cell phone, a notebook computer, PDA (personal digital assistance), an instrument for game having communication facility, Web TV and so forth may be applied to the first user terminal 1, the second user terminal 2, the third user terminal 3, the fourth user terminal 3a and the fifth user terminal 3b.

The center 4 implements operation with regard to intermediacy and procuration of transaction, and the accompanying operation of registering/holding contents. Besides, the center 4 can receive prescribed commission for above-described operation. Also by franchisor-franchisee type like development, it is possible to establish analogues having facility equivalent to the center 4 and increase the number of users in underlayer of the analogues at pleasure.

Further, the center 4 comprises a data base 4A and Web server 4B. In the data base 4A, the following are set up; a column 4A-1 for registration of contents and prescribed items thereof, a column 4A-2 for records of derivation and so forth of tokens; and a column 4A-3 for (public) announcement of tokens which a user hopes to transfer. The contents may be such as voice, images, figures shapes, language, and concerning music, such as lyrics, music compositions, musical performance, which are often authorized as copyright, moral right, literary neighboring rights, publicity, an industrial design, a trademark and so forth that are regarded as economically valuable.

In the column 4A-1, the following information is registered, which is about: contents A (an original piece); contents A' (an adaptation); contents B (an original piece); [A+A'+B]' (an adaptation); and items showing consent of use/delivery or transfer/delivery and cost sent from the first to fourth users who are rightful claimants. As well as registration of the above information about the contents, the contents are also held in the column 4A-1. The rightful claimants can change the information and contents registered in the column 4A-1. Besides, the first to fifth users can read the information in the column 4A-1, which is about the each contents, rightful claimants thereof, and the items showing consent of use/delivery or transfer/delivery, and cost (fee), through the Internet 5. Incidentally, it is said later about an original piece and an adaptation.

Concerning the contents registered/held in the column 4A-1, it is possible to set a standard (for example, in the case of music, the contents are limited to ones, for example MIDI specification) in order to secure the use of the contents from the technical point of view. Besides, it is possible to add digital watermarks in the contents in order to identify A (an original piece) even if A (an original piece) is adapted for A' (an adaptation).

Concerning consent of use of contents registered/held in the column 4A-1, variety of use is set for the contents. For example, a user, who hopes to give consent of use of his/her contents, may allow a receiver of the contents to use the contents for private purpose only, to duplicate the contents restrictively, to adapt the contents restrictively and so forth. Also it is possible to set how to deliver, how to collect cost and so forth according to a type of use of the contents.

Besides, data, which is derived accompanied by transaction of consent of use/delivery, transfer/delivery of contents and transfer of tokens, takes the shape of tokens 4a, 4b and 4c. The tokens are exchanged among the first user terminal 1, the second user terminal 2, the third user terminal 3, the fourth user terminal 3a and the fifth user terminal 3b. Then the record of the exchange is written down in the column 4A-2 set up in the data base 4A.

Moreover, by setting up the column 4A-3 in the data base 4A, the tokens which a user hopes to transfer are announced to all of the first to fifth users through the Internet 5.

The Web server 4B facilitates the processes of: registering/holding contents in the data base 4A; conducting transaction concerning consent of use/delivery or transfer/delivery of contents, or transfer/realization of detail displayed in tokens (the displayed detail means consent of use/delivery or transfer/delivery of contents, or collection of cost) among each first user to fifth user; and collection of cost (bill) accompanied by the above processes. In these processes of transaction and collection of cost, the Web server 4B facilitates the after-mentioned processes of deriving tokens; checking tokens against records concerned in tokens recorded in the column 4A-2 in the data base 4A; implementing collection, appropriation, and compensation concerning funds for handling trouble as described later; sending a warning/reminder/notification to each of the first to fifth users; and writing off the position and the contents concerned in the user(s). These processes are implemented by running a computer program in the Web server 4B. Also the computer program may be recorded beforehand in a recording medium, for example, a floppy (registered trademark) disk, CD-ROM and so forth that can be read by a computer, and loaded from them later.

The tokens 4a, 4b and 4c are exchanged among the first user terminal 1, the second user terminal 2, the third user terminal 3, the fourth user terminal 3a and the fifth user terminal 3b. The tokens 4a, 4b and 4c go through series of processes of derivation, holding, transfer, and presentation (at the time of realizing displayed detail). Among these processes, records about the processes of derivation and transfer are written down in the tokens one by one. By the process of the presentation, the tokens are deleted. The Web server 4B controls the detail of the tokens which is changed according to the processes. Thereby, it is made possible to identify and specify these tokens and secure the transaction.

Further, a "period of presentation" is set down in the tokens. The "period of presentation" means a prescribed period of time for presentation (for example, ten days) applied to all of the users in advance, excluding an exception concerning another "period of presentation" set up to a token for collection of cost newly derived accompanied by transfer of a token. Only during the "period of presentation", it is possible to transfer the tokens. Besides, if there is no presentation of the tokens during the "period of presentation, it is impossible to realize the displayed detail.

The tokens 4a, 4b and 4c are exchanged through the Internet 5, so that security countermeasures are needed. In this case, it is preferable that all of the tokens 4a, 4b and 4c are encrypted.

Next will be an explanation of the conformation of transaction of contents by using FIG. 2. FIG. 2 shows condition of contents and rightful claimants, both of which are registered/held in the column 4A-1 in the data base 4A.

There are shown some conformations of transaction of contents. For example, when the first user and the third user register/hold A (an original piece) and B (an original piece) in the data base 4A respectively, the following conformations may be assumed: the second user adapts A (an original piece) of the first user for A' (an adaptation: translation, transformation and/or adding to the original piece); and the fourth user adapts B (an original piece) of the third user and A' (an adaptation) of the second user for [A+A'+B]' (an adaptation). The second user has a right to only the part adapted by himself/herself, not including the part A (an original piece). The fourth user has a right to only the part adapted by himself/herself, not including the part A (an original part), the part A' (an adaptation), and the part B (an original part). Therefore, it is impossible to use only an adaptation, so that the users make use of only an original piece, or an original piece+an adaptation.

Next will be an explanation of an example of operation with respect to each case of the method for transaction of contents through a network in the transaction system.

(1) REGISTRATION FOR GIVING CONSENT OF USE/DELIVERY OR TRANSFER/DELIVERY OF CONTENTS FOR VALUE

Figure 3:
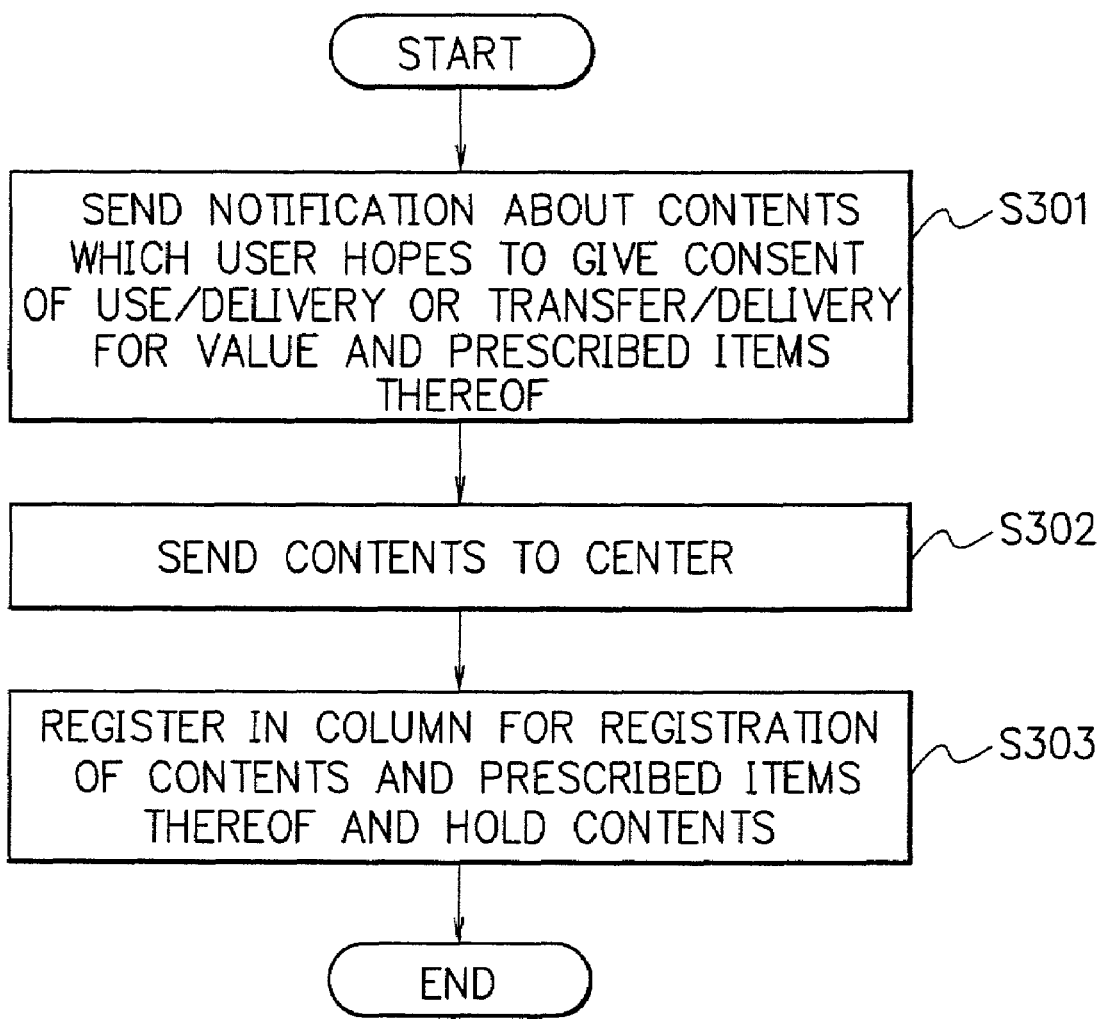
FIG. 3 is a flowchart explaining an example of operation with respect to each case of the method for transaction of contents through a network in the transaction system shown in FIG. 1.

First of all, by using FIG. 3, there is an explanation in registering contents whose rightful claimant is a user and which the user hopes to give consent of use/delivery or transfer/delivery to other users for value, and prescribed items thereof.

The user(s) sends a notification that the user registers the contents whose rightful claimant is the user and which the user hopes to give the consent of use/delivery or the transfer/delivery of the contents to other users for value, and the prescribed items thereof in the data base 4A in the center 4 from a user terminal through the Internet 5 (Step S301). Then the user sends the contents from the user terminal to the center 4 through the Internet 5 (Step S302).

The Web server 4B in the center 4 registers the contents and the prescribed items thereof sent by the user in the column 4A-1 as well as holding the contents (Step S303). Other users can read the detail registered in the column 4A-1 by using their terminals through the Internet 5.

The above description is a case where the consent of use/delivery or the transfer/delivery of the contents is executed for value. However, the transaction may be executed without charge. In this case, a token for collection of cost is not derived, which is generally derived accompanied by the process of consent of use/delivery or transfer/delivery. Also in the above, it is said that the other users can read the detail registered in the column 4A-1. However, the detail may be closed to the public with a closed transaction. Also the contents which are to be sent to the center 4 may be sent by using an off-network medium (out of network medium) such as a memory card.

(2) DECISION FOR RECEIVING CONSENT OF USE/DELIVERY OR TRANSFER/DELIVERY OF CONTENTS FOR VALUE

Figure 4:
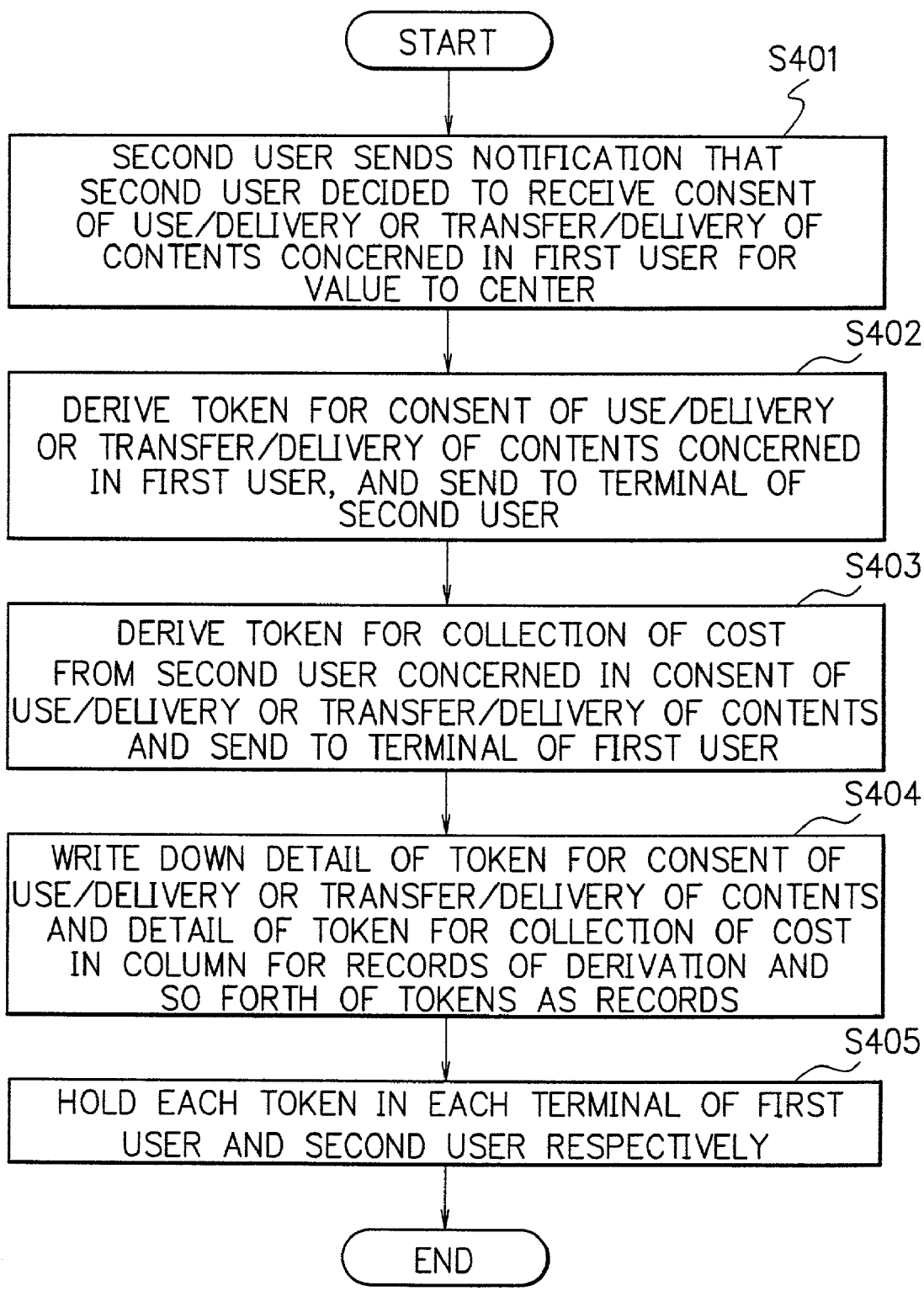
FIG. 4 is a flowchart explaining an example of operation with respect to each case of the method for transaction of contents through a network in the transaction system shown in FIG. 1.

Next is an explanation by using FIG. 4 when the second user decides to receive the consent of use/delivery or the transfer/delivery of the contents, which are concerned in the first user and registered/held in the column 4A-1 in the data base 4A.

The second user, who reads or confirms the column 4A-1, sends a notification that he/she decides to receive the consent of use/delivery or the transfer/delivery of the contents concerned in the first user from a user terminal of the second user to the center 4 through the Internet 5 (Step S401).

At the time, the Web server 4B in the center 4 derives a token for the consent of use/delivery or the transfer/delivery of the contents concerned in the first user. Then the Web server 4B sends the token to the terminal of the second user through the Internet 5 (Step S402).

Besides, at the same time, the Web server 4B derives a token for collection of cost in order to collect the cost from the second user concerning the consent of use/delivery or the transfer/delivery of the contents. Then the Web server 4B sends the token to the terminal of the first user through the Internet 5 (Step S403).

Further, at the same time, the Web server 4B writes down the detail of the newly derived tokens, one is for the consent of use/delivery or the transfer/delivery and another is for the collection of the cost, in the column 4A-2 as records (Step S404).

Then each of the first and second users hold each of the tokens for the collection of the cost and for the consent of use/delivery or the transfer/delivery in their terminals respectively (Step S405).

As with the case of (1) described above, the transaction may be executed without charge. In this case, a token for collection of cost is not derived, which is generally derived accompanied by the process of consent of use/delivery or transfer/delivery. Also, the detail may be closed to the public in order of closed transaction. Also a token which is to be sent to a user terminal may be sent by using an off-network medium such as a memory card. Besides, the sent token can be held by using the off-network medium.

(3) TRANSFER OF A TOKEN FOR VALUE

Figure 5:
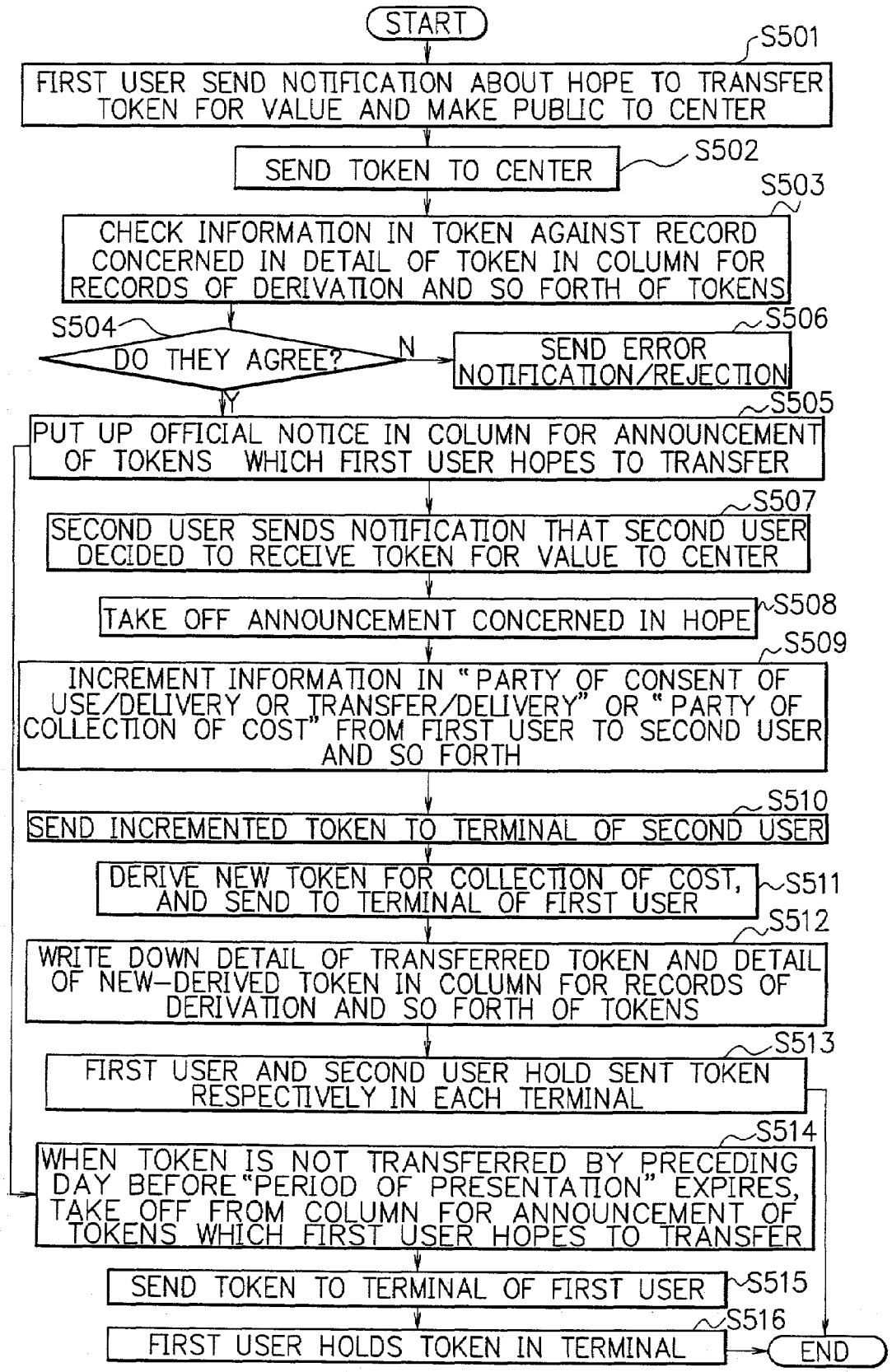
FIG. 5 is a flowchart explaining an example of operation with respect to each case of the method for transaction of contents through a network in the transaction system shown in FIG. 1.

Next is an explanation by using FIG. 5 in transferring the token held by the first user to the second user for value. The token can be transferred only during the "period of presentation" for the token.

The first user sends a notification that he/she hopes to transfer the token held by himself/herself for value and that he/she puts up an official notice about the hope in the data base 4A from the terminal of the first user to the center 4 through the Internet 5 (Step S501). Along with the notification, the first user sends the token from his/her terminal to the center 4 through the Internet 5 (Step S502).

At the same time, the Web server 4B in the center 4 checks the information in the token against the record concerned in the token written down in the column 4A-2 (Step S503). When they agree (Step S504), the Web server 4B puts up an official notice about the hope from the first user in the column 4A-3, and holds the token (Step S505). When they disagree (Step S504), the Web server 4B sends an error notification to the terminal of the first user and rejects the transfer (Step S506). Thereby, other users can read the detail of the column 4A-3 in the data base 4A by using their terminals through the Internet 5.

At this moment, the second user, who reads the column 4A-3 in the data base 4A, sends a notification that he/she decided to receive the token for value from his/her terminal to the center 4 through the Internet 5 (Step S507).

At the same time, the Web server 4B in the center 4 takes off the announcement of the hope from the column 4A-3 (Step S508). Along with the taking off, the Web server 4B increments the information in the token. For example, "a party of consent of use/delivery or transfer/delivery" or "a party of collection of cost" is incremented from the first user to the second user (Step S509). After that, the Web server 4B sends the incremented token to the terminal of the second user through the Internet 5 (Step S510).

Besides, at the same time, the Web server 4B derives a new token for collection of cost in order to collect the cost concerning the transfer of the token from the second user. Then the Web server 4B sends the token to the terminal of the first user through the Internet 5 (Step S511). At the same time, the Web server 4B in the center 4 writes down the detail of the transferred token and the detail of the newly derived token in the column 4A-2 as records (Step S512). Then the first and second users hold the received tokens in their terminal respectively (Step S513).

Incidentally, when the token is not transferred by the day before the "period of presentation" expires, the Web server 4B in the center 4 takes off the above-described announcement from the column 4A-3 (Step S514). As well as the taking off, the Web server 4B sends the token to the terminal of the first user through the Internet 5 (Step S515). Then the first user holds the sent token in his/her terminal (Step S516).

As with the case hereinbefore, the transaction may be executed without charge. In this case, a token for collection of cost is not derived, which is generally derived accompanied by the process of transfer of a token. Also, the detail may be closed to the public in order of closed transaction. Also in sending and holding tokens, it is possible to employ an off-network medium such as a memory card. Besides, the deadline is not applied only to the day before the "period of presentation" expires, but may be set up earlier than such day arbitrarily.

(4) REALIZATION OF DETAIL DISPLAYED IN A TOKEN (IMPLEMENTATION OF CONSENT OF USE/DELIVERY OR TRANSFER /DELIVERY OF CONTENTS, OR COLLECTION OF COST)

Figure 6:
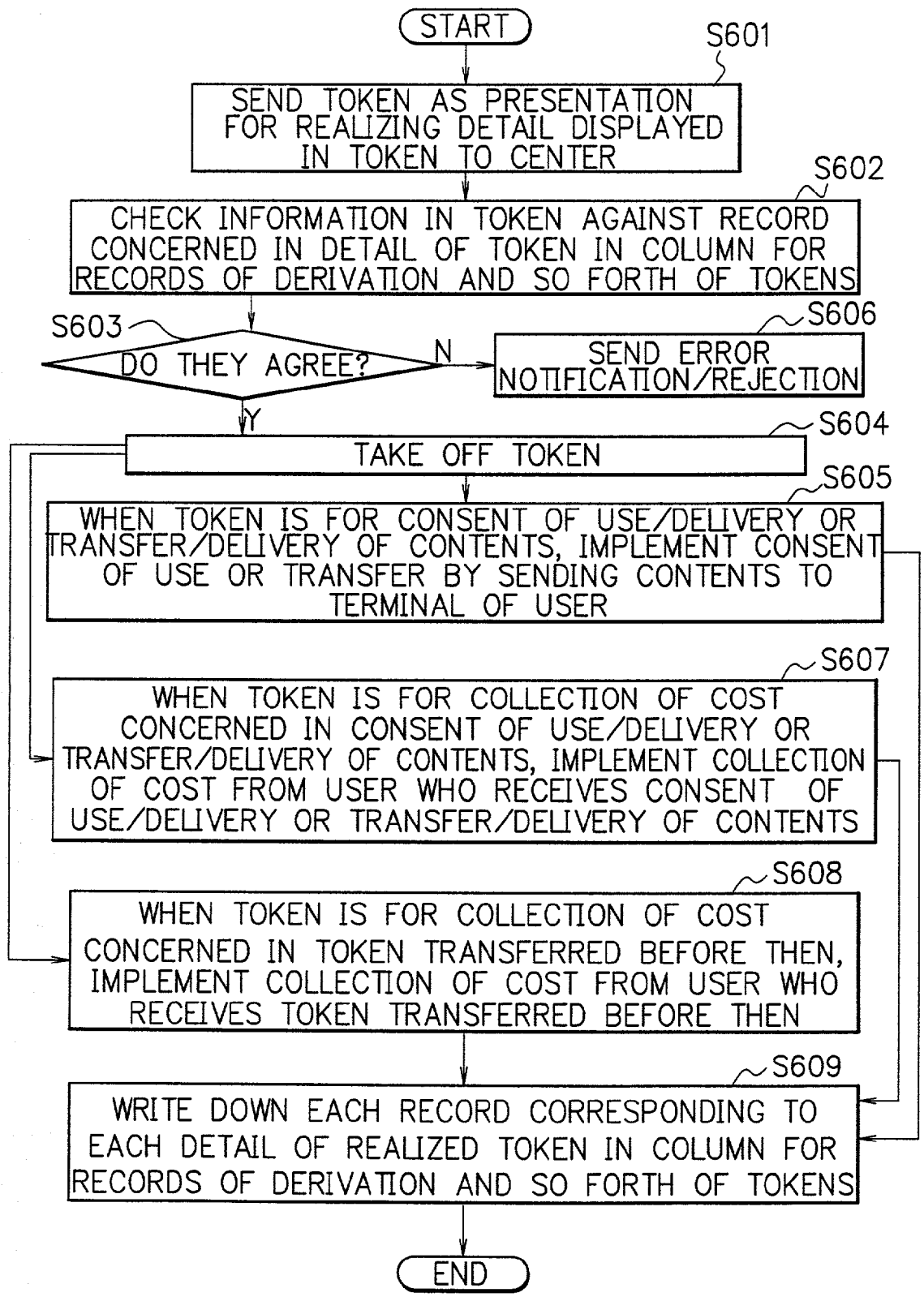
FIG. 6 is a flowchart explaining an example of operation with respect to each case of the method for transaction of contents through a network in the transaction system shown in FIG. 1.

Next is an explanation when detail displayed in a token held by a user is realized by using FIG. 6. The detail displayed in the token can be realized only when presentation is implemented during a "period of presentation" for the token.

The user sends the token held by himself/herself from a terminal of the user to the center 4 through the Internet 5 as presentation in order to realize the detail displayed in the token (Step S601).

At this time, the Web server 4B in the center 4 checks information in the sent token against the record of the token written down in the column 4A-2 in the center 4 (Step S602). When they agree (Step S603), the Web server 4B takes off the token (Step S604). When the token is for the consent of use/delivery or the transfer/delivery of the contents, the Web server 4B implements the consent of use or the transfer of the contents by sending (i.e., delivery of) the contents to the user terminal through the Internet 5 (Step S605). When they disagree (Step S603), the Web server 4B sends an error notification to the,user and rejects the consent of use or the transfer (Step S606).

When the token is used for the collection of the cost concerning the consent of use/delivery or the transfer/delivery of the contents, the Web server 4B implements the collection of the cost from a user who is to receive the consent of use/delivery or the transfer/delivery of the contents (Step S607). Also when another token for collection of cost concerned in preceding contents remains, the Web server 4B implements the collection of the cost from a user (Step S608).

At the same time, the Web server 4B in the center 4 writes down each record that detail displayed in each token was realized in the column 4A-2 in the data base 4A (Step S609).

Incidentally, in sending contents and tokens here, it is possible to apply an off-network medium such as a memory card.

(5) Rejection Of Realizing Displayed Detail Or Transfer Of A Token By Discrepancy In Checking During A "Period Of Presentation"

Figure 7:
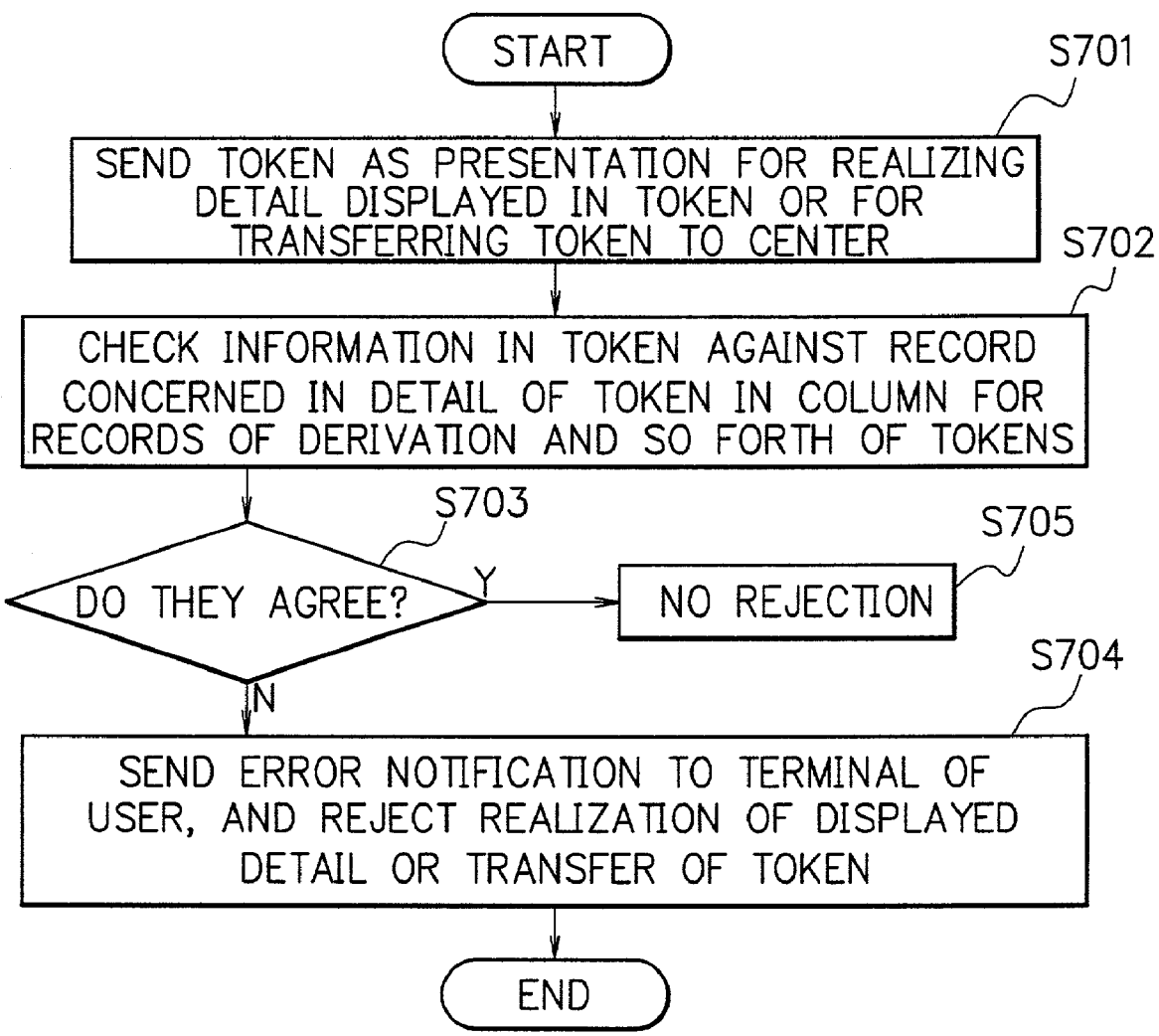
FIG. 7 is a flowchart explaining an example of operation with respect to each case of the method for transaction of contents through a network in the transaction system shown in FIG. 1.

Next is an explanation by using FIG. 7 when realization of displayed detail or transfer of a token is rejected by discrepancy in checking during a "period of presentation" for the token.

A user sends a token held by himself/herself from his/her terminal to the center 4 through the Internet 5 as presentation for realizing the displayed detail or the transfer of the token (Step S701).

At this time, the Web server 4B in the center 4 checks information in the token against the record of the token written down in the column 4A-2 in the center 4 (Step S702). When they disagree (Step S703), the Web server 4B sends an error notification about the disagreement to a terminal of the user through the Internet 5, and rejects the realization of the displayed detail or the transfer of the token (Step S704). On the other hand, when they agree (Step S703), the Web server 4B considers that there is no rejection (Step S705).

Incidentally, in sending a token here, it is possible to apply an off-network medium such as a memory card.

Figure 8:
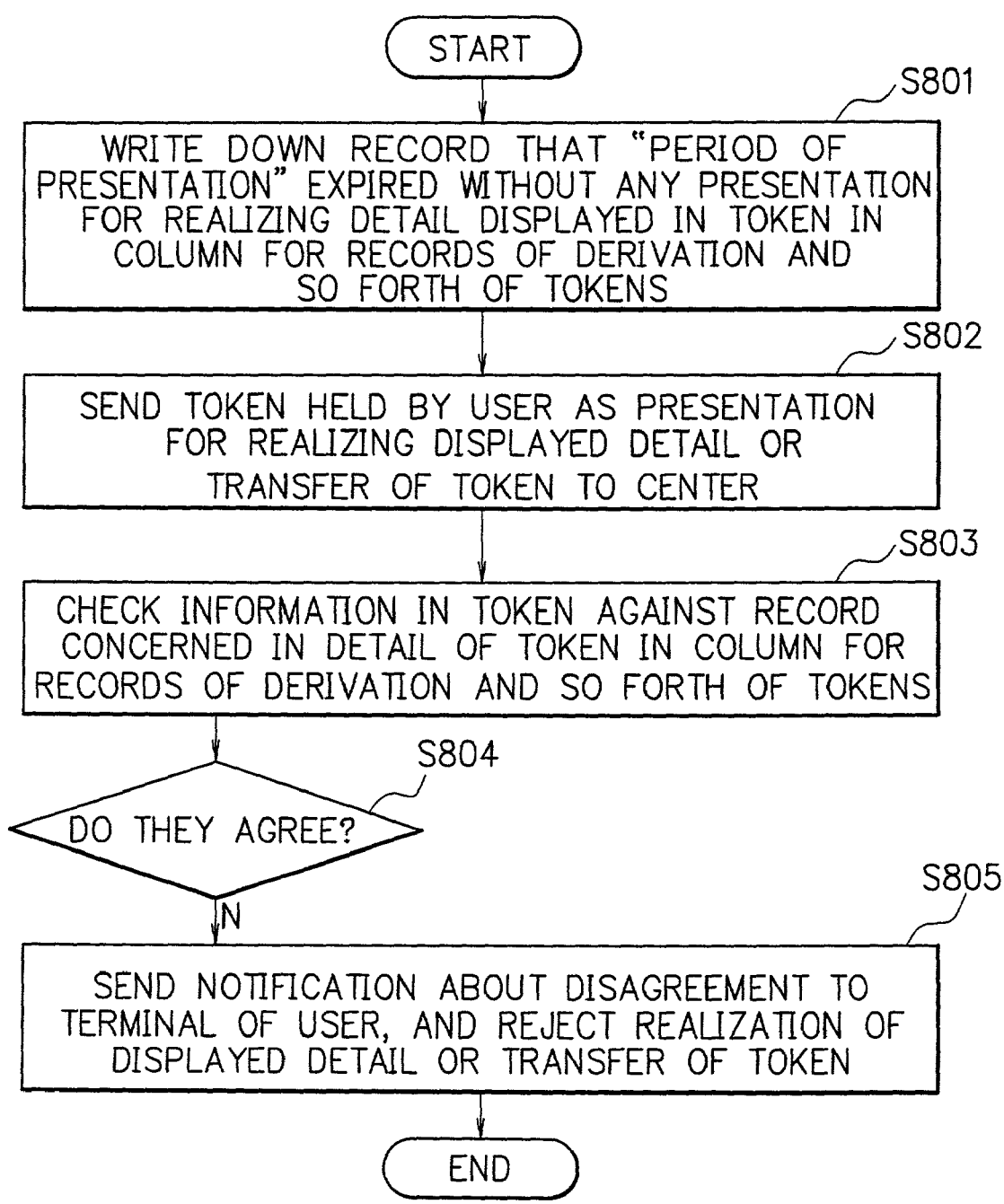
FIG. 8 is a flowchart explaining an example of operation with respect to each case of the method for transaction of contents through a network in the transaction system shown in FIG. 1.
Figure 9:
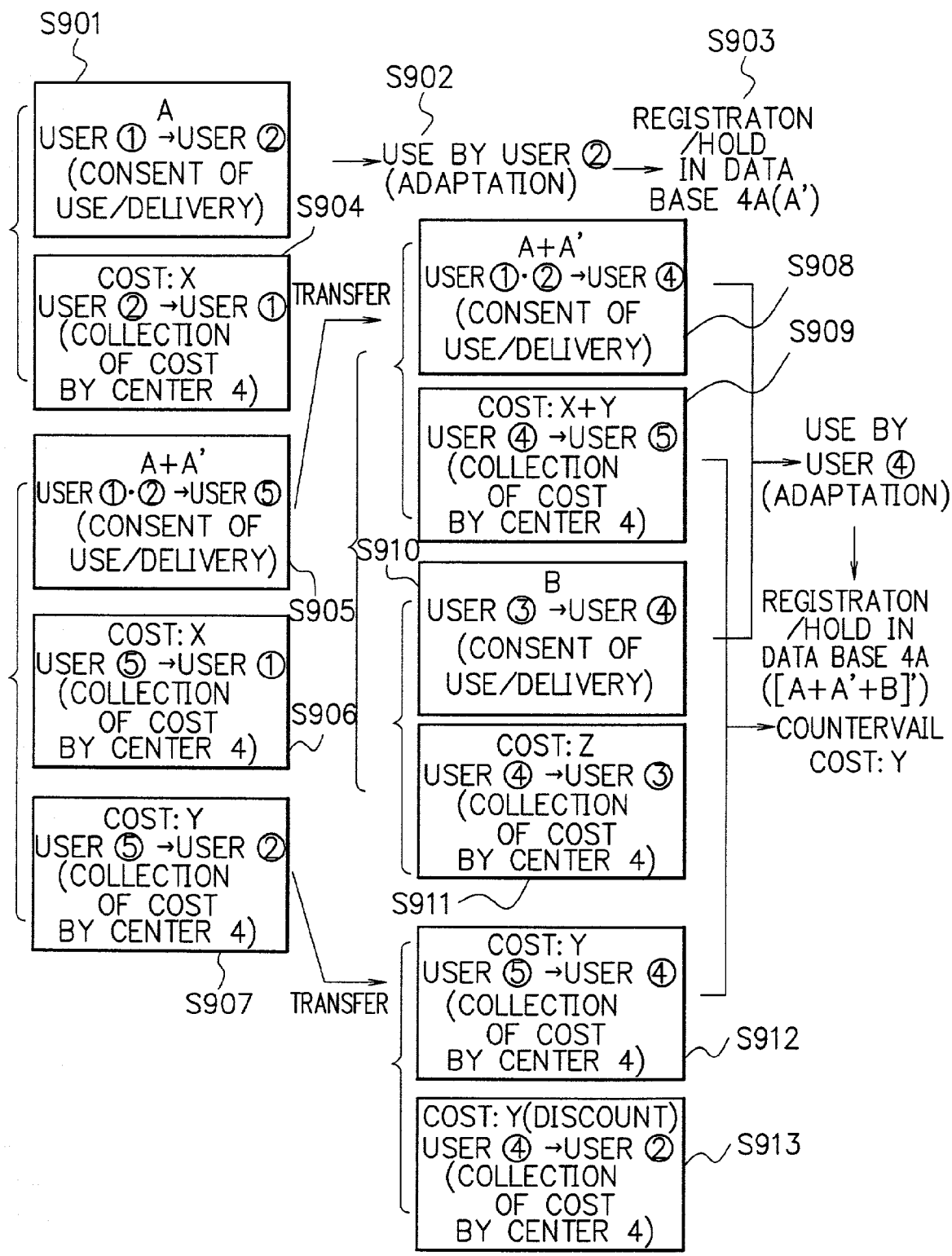
FIG. 9 is a flowchart explaining a concrete example of the method for transaction of contents through a network in the transaction system shown in FIG. 1 by showing tokens.

(6) Rejection Of Realizing Displayed Detail Or Transfer Of A Token After A "Period Of Presentation" Expires Next is an explanation by using FIG. 8 when realization of displayed detail or transfer of a token is rejected after a "period of presentation" expires without any presentation for realizing the detail displayed in the token.

The Web server 4B in the center 4 writes down a record that the "period of presentation" expired without any presentation for realizing the detail displayed in the token in the column 4A-2 in the data base 4A (Step S801).

The user sends the token held by himself/herself from his/her terminal to the center 4 through the Internet 5 as presentation in order to realize the displayed detail or in order to transfer the token (Step S802).

At this time, the Web server 4B in the center 4 checks information in the sent token against the record of the token written down in the column 4A-2 in the data base 4A, sends a notification that the information disagrees with the record to a terminal of the user through the Internet 5, and rejects realizing the displayed detail or the transfer of the token (Steps S803 to S805).

Incidentally, in sending a token here, it is possible to apply an off-network medium such as a memory card.

Next is an example of the transaction system and method by taking actual possible transaction for instance by using FIG. 9. In the following explanation, a flow in the case of transfer/delivery of contents is fundamentally same as a flow in that of consent of use/delivery of contents except that incrementing a rightful claimant is implemented in the column 4A-1 in the data base 4A in the former case.

In this example of transaction, processes according to the flowchart shown in FIG. 3 (the above-described processes (1)) are implemented. Besides, A (an original piece) held by the first user and B (an original piece) held by the third user are registered/held in the data base 4A in the center 4 previously.

In reference to Steps S901 to S904 as shown in FIG. 9, first of all, here is an explanation when the first user delivers A (an original piece) to the second user by promising consent of use.

In this case, the processes according to the flowchart shown in FIG. 4 (the above-described processes (2)) are implemented. The Web server 4B (in the center 4) derives a token used for consent of use/delivery between the first user and the second user. Here, Step S901 shows the token for the consent of use/transfer derived by this means. The detail information written down in the token is, for example, shown in FIG. 10A.

At this time, the Web server 4B in the center 4 writes down a record corresponding to the detail information of the token accompanied by the consent of use/delivery of A (an original piece) between the first and second users in the column 4A-2 in the data base 4A.

Besides, the Web server 4B in the center 4 derives a token for collecting the cost X from the second user and passing the collected cost to the first user (Step S904). This token is derived accompanied by the consent of use/delivery of A (an original piece) between the first user and the second user. Here, Step S904 shows the token derived according to the transaction of collecting the cost from the second user to the first user. The detail information in the token is, for example, shown in FIG. 10B. Then the first user receives the collection of the cost X by the processes according to the flowchart shown in FIG. 6 (the above-described processes (4)).

At this time, the Web server 4B (in the center 4) writes down a record corresponding to the detail information of the token in the column 4A-2 in the data base 4A.

Besides, the second user receives the consent of use/delivery of A (an original piece) by the processes according to the flowchart shown in FIG. 6 (the above-described processes in (4)). Thereby, the second user adapts A (an original piece) for A' (an adaptation) (Step S902). Then the second user can register/hold A' in the data base 4A (in the center 4) (Step S903) by the processes according to the flowchart shown in FIG. 3 (the above-described processes (1)).

Next, in reference to Steps S905 to S907, here is an explanation when the fifth user hopes or demands to adapt A (an original piece) of the first user and A' (an adaptation) of the second user by promising consent of use between the first/second users and the fifth user.

In this case, the processes according to the flowchart shown in FIG. 4 (the above-described processes (2)) are implemented. The Web server 4B (in the center 4) derives a token for the consent of use/delivery of A+A' between the first/second users and the fifth user. Here, Step S905 shows the token derived according to the transaction when the fifth user receives the consent of use/delivery of A+A' from the first/second users. The detail information written down in the token is, for example, shown in FIG. 11A.

At this time, the Web server 4B in the center 4 writes down a record corresponding to the detail information in the token derived accompanied by the consent of use/delivery of A (an original piece) and A' (an adaptation) between the first/second users and the fifth user in the column 4A-2 in the data base 4A.

Besides the Web server 4B in the center 4 derives a token for collecting the cost X from the fifth user and passing the collected cost to the first user (Step S906). This token is derived accompanied by the consent of use/delivery of A (an original piece) between the first user and the fifth user. Also the Web server 4B (in the center 4) derives a token for collecting the cost Y from the fifth user and passing the collected cost to the second user (Step S907). This token is derived accompanied by the consent of use/delivery of A' (an adaptation) between the second user and the fifth user. Here, Step S906 and Step S907 show the tokens for the collection of the cost from the fifth user to the first/second users respectively. Each detail information written down in the tokens is, for example, shown in FIG. 11B and FIG. 11C. Then the first and second users receive the collection of the cost X and Y respectively by the processes according to the flowchart shown in FIG. 6 (the above-described processes (4)).

At this time, the Web server 4B in the center 4 writes down records corresponding to the detail information in these tokens in the data base 4A.

Next, in reference to Steps S908 and S909, here is an explanation when the token shown in Step S905 is transferred from the fifth user to the fourth user.

In this case, the processes according to the flowchart shown in FIG. 5 (the above-described processes (3)) are implemented. The fifth user sends a notification that he/she hopes to transfer the token during the "period of presentation" for the token, and sends the token to the center 4. Thereby, the Web server 4B (in the center 4) checks the detail information in the token against the record of the token written down in the column 4A-2. After it is recognized that they agree, the Web server 4B puts up an official notice about the hope of the transfer in the column 4A-3 in the data base 4A. After the fourth user agrees the detail put up in the column 4A-3 and sends a reply to the center 4, the Web server 4B takes off the official notice, and increments the token shown in Step S905 to the one shown in Step S908. That is, the detail information written down in the token is incremented from the one shown in FIG. 11A to the one shown in FIG. 12A. To be concrete, "Identification/Specification No.: ③ (a record of the derivation to the fifth user)" is incremented to "Identification/Specification No.: ③-1 (a record of the derivation to the fifth user and the transfer to the fourth user)", and "Confidential for: fifth user" is incremented to "Confidential for: fourth user", and "Party of Consent of Use/Delivery: first and second users→ fifth user" is incremented to "Party of Consent of Use/Delivery: first and second users→fourth user". Then the Web server 4B sends the incremented token to the fourth user and implements the transfer of the token.

At this time, the Web server 4B in the center 4 writes down a record corresponding to the detail information of Step S908 that the token shown in Step S905 was transferred from the fifth user to the fourth user in the column 4A-2 in the data base 4A.

Besides, the Web server 4B in the center 4 derives a token for collecting the cost X+Y from the fourth user and passing the cost to the fifth user (Step S909). This token is derived accompanied by Step S908 between the fourth user and the fifth user. Here, Step S909 shows the token derived according to the transaction of the collection of the cost concerning Step S908. The detail information in the token is, for example, shown in FIG. 12B.

At this time, the Web server 4B (in the center 4) writes down a record corresponding to the detail information of the token in the column 4A-2 in the data base 4A.

Incidentally, in the case of transferring the token at this stage, the "period of presentation" is applied to a user who receives the transfer. Thereby, the fourth user can take possession of the contents A+A' ahead of the case of that from the center 4 directly. This is because when the fourth user takes possession of the contents directly from the center 4, a new token is derived and a new "period of presentation" is decided. Besides, a new token for collection of cost is derived accompanied by the transfer. Concerning the token for the collection of the cost derived accompanied by the transfer, the period for the collection of the cost is also applied to the user who receives the transfer. That is, the fourth user pays the cost according to the original schedule set up in the token. Thereby, the collection of the cost from the fourth user to the fifth user is implemented ahead of the case where the fourth user takes possession of the contents A+A' directly from the center 4. For example, the fifth user has to pay costs Y and X to the second user (or to the fourth user, due to transfer of a token from the second user to the fourth user as described below) and to the first user (Steps S907 or S912 or S906) during three days respectively (this is original schedule). However, the token is transferred from the fifth user to the fourth user. As described above, the period is applied to the user who receives the transfer. Therefore, the fourth user has to pay the cost X+Y to the fifth user (Step S909) during three days. That is, the transfer is implemented without delaying the period for the collection of the cost. Thereby, it may be possible to reduce accidents concerning synchronization in collection of costs.

Next, in reference to Steps S910 and S911, here is an explanation when the third user and the fourth user promise to implement consent of use, and when the fourth user adapts B (an original piece) held by the third user.

In this case, the processes according to the flowchart shown in FIG. 4 (the above-described processes (2)) are implemented. In other words, the Web server 4B in the center 4 derives the token shown in Step S910. The detail information written down in the token is, for example, shown in FIG. 13A.

At this time, the Web server 4B in the center 4 writes down a record corresponding to the detail information of the token derived accompanied by the consent of use/delivery of B (an original piece) between the third user and the fourth user in the column 4A-2 in the data base 4A.

The fourth user receives the consent of use/delivery of A (an original piece), A' (an adaptation), and B (an original piece) as shown in Step S908 and Step S910 shown in FIG. 9 by the processes according to the flowchart shown in FIG. 6 (the above-described processes (4)). Thereby, the fourth user adapts A (an original piece), A' (an adaptation), and B (an original piece) for [A+A'+B]' (an adaptation). Then the fourth user can register/hold the [A+A'+B]' (an adaptation) in the data base 4A in the center 4 by the processes according to the flowchart shown in FIG. 3 (the above-described processes (1)).

Also by presenting each token in Step S908 and Step S910 to the center 4 during the "period of presentation", the fourth user can realize the detail displayed in the tokens. In this case, the center 4 checks the detail information in each of the tokens against the records of the tokens written down in the column 4A-2 in the data base 4A. After it is recognized that they agree, the center 4 takes off the token, and writes down a record corresponding to "Identification/Specification No.: ③-2 (a record of the derivation to the fifth user, the transfer to the fourth user, and the realization on the basis of the presentation from the fourth user)" concerned in the token in Step S908 and "Identification/Specification No.: ⑦-1 (a record of the derivation to the fourth user and the realization on the basis of the presentation from the fourth user)" concerned in the token in Step S910 in the column 4A-2 in the data base 4A.

Besides, the Web server 4B in the center 4 derives a token for collecting the cost Z from the fourth user and passing the cost to the third user (Step S911). This token is derived accompanied by the consent of use/delivery of B (an original piece) from the third user to the fourth user. The detail information in the token is, for example, shown in FIG. 13B. Then the third user receives the cost Z by the processes according to the flowchart shown in FIG. 6 (the above-described processes (4)).

At this time, the Web server 4B in the center 4 writes down a record corresponding to the detail information of the token in the column 4A-2 in the data base 4A.

Next, in reference to Steps S912 and S913, here is an explanation when the token in Step S907 is transferred from the second user to the fourth user.

In this case, the processes according to the flowchart shown in FIG. 5 (the above-described processes (3)) are implemented. In other words, the Web server 4B in the center 4 increments the token in Step S907 to the one in Step S912 in order to collect the cost Y written therein from the fifth user and pass the cost to the fourth user. The Web server 4B executes the transfer of the token by sending the incremented token to the fourth user. The detail information in the token is, for example, shown in FIG. 14A.

At this time, the Web server 4B in the center 4 writes down a record corresponding to the detail of Step S912 that the token in Step S907 is transferred from the second user to the fourth user in the column 4A-2 in the data base 4A.

Besides, concerning Step S913, when the Web server 4B in the center 4 collects the cost Y derived accompanied by Step S912 between the fourth user and the second user and passes the cost to the second user, it is also possible to discount the cost from the fourth user to the second user according to terms of payment. The token in Step S913 shows the one derived according to the transaction of the collection of the cost concerning Step S912. The detail information written down in the token is, for example, shown in FIG. 14B.

At this time, the Web server 4B in the center 4 writes down a record corresponding to the detail information in the token in the column 4A-2 in the data base 4A.

Incidentally, in the case of transferring the token at this stage, the collection of the cost is executed according to the original schedule or ahead of the schedule as described hereinbefore. Concerning the token for the collection of the cost from the fourth user to the second user shown in Step S913, the "period of presentation" may be set up so that the collection of the cost is implemented ahead of that in the original schedule by second user's wishes (in this case, the second user has to endure the discount price which meets early collection of cost).

Besides, by the processes according to the flowchart shown in FIG. 6 (the above-described processes (4)), the fourth and fifth users receive the cost Y written down in the token in Step S912 and the cost X+Y written down in the token in Step S909 respectively. Also, in paying the cost shown in Steps S912 and S909, it is possible to offset the cost Y, which is to be collected from the fourth user and passed to the fifth user.

Figure 40:
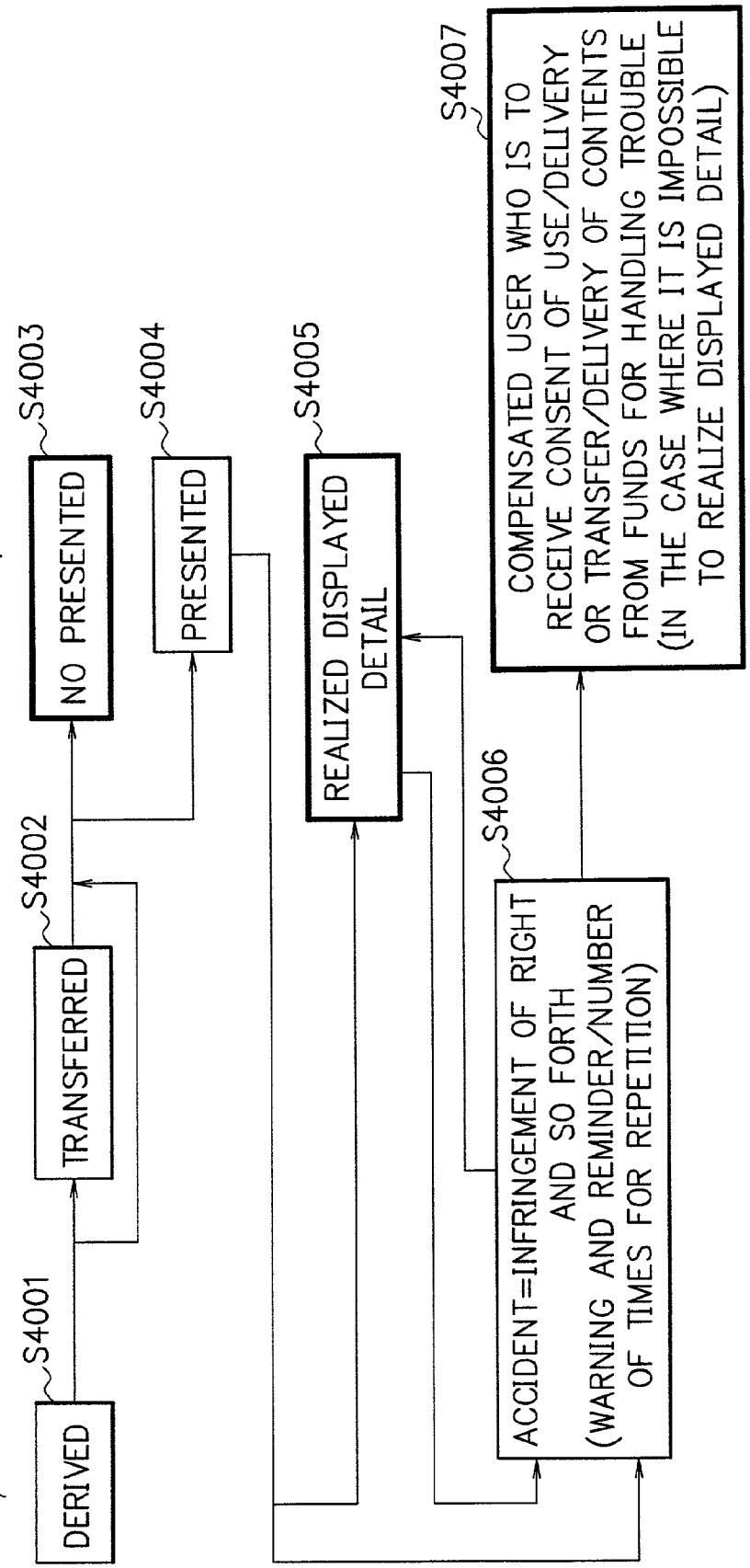
FIG. 40 is a diagram explaining a record of a token in the transaction system shown in FIG. 1.

FIGS. 15 to 25 are flowcharts explaining an example of operation with respect to each case of the method for transaction of contents through a network in the transaction system shown in FIG. 1. FIGS. 26A to 39D are diagrams explaining detail of tokens, warnings/reminders, and notifications in concrete examples of the method for transaction of contents through a network in the transaction system shown in FIG. 1. FIGS. 40 and 41 are diagrams explaining records of tokens.

The following are explanations of an example of operation with respect to each of the method for transaction of contents through a network in the transaction system having the construction shown in FIG. 1 by using FIGS. 15 to 25.

(7) Warning Concerning A Presentation For Realizing Detail Displayed In A Token

First of all, here is an explanation by using FIG. 15 when there is no presentation for realizing detail displayed in a token by a prescribed deadline during a "period of presentation" for the token.

The center 4 judges whether or not it is during the "period of presentation" for the token (Step S1501). When the center 4 judges that the "period of presentation" expired (Step S1501/N), the center 4 finishes the process.

On the other hand, when the center 4 judges that it is during the "period of presentation" (Step S1501/Y), the center 4 judges whether or not the presentation for realizing the detail displayed in the token was implemented by the prescribed deadline during the "period of presentation" (Step S1502). When the center 4 judges that the presentation was implemented by the prescribed deadline (Step S1502/Y), the center 4 finishes the process.

The prescribed deadline as described above is set up before a prescribed day from when the "period of presentation" expires. For example, the prescribed deadline may be set up the preceding day of the last day of the "period of presentation". Generally, the prescribed deadline is set up in order to correspond to the final day when the token can be transferred.

When the presentation of the token for realizing displayed detail was not implemented by the prescribed deadline (Step S1502/N), the Web server 4B in the center 4 sends a warning that the presentation for realizing the detail displayed in the token was not implemented by the prescribed deadline. In sending the warning, the Web server 4B makes it possible to display the warning with color, illustration, voice and so forth in addition to characters on a terminal of a user holding the above token (Step S1503). Then the Web server 4B finishes the process.

(8) Collection Of Cost After Accidents Occur Concerning Uncollected Cost In Consent Of Use/Delivery Of Contents, Transfer/Delivery Of Contents, Or Transfer Of A Token Next is an explanation of processes of collecting cost by the center 4 when it is impossible for the center 4 to implement the collection of the cost by user's fault who is to pay the cost after presentation of a token for the collection of the cost by using FIG. 16.

By implementing consent of use/delivery of contents, transfer/delivery of contents, or transfer of a token for value, a token for collection of cost is derived. The center 4 judges whether or not the derived token for the collection of the cost was presented (Step S1601). When the center 4 judges that the token for the collection of the cost was not presented (Step S1601/N), the center 4 finishes the process.

On the other hand, when the center 4 judges that the token for the collection of the cost was presented (Step S1601/Y), the center 4 judges whether or not the cost was collected from the user who is to pay the cost by a deadline for the collection of the cost (Step S1602). When the center 4 judges that the cost was collected from the user who is to pay the cost by the deadline of the collection of the cost (Step S1602/Y), the center 4 finishes the process.

When the center 4 judges that it is impossible to collect the cost from the user who is to pay the cost by the deadline for the collection of the cost by the user's fault and so forth (Step S1602/N), the center 4 writes down a record that an accident concerning the collection of the cost occurred in the column 4A-2 in the center 4 as a record of the token (Step S1603).

The center 4 adds prescribed interest arrears to the original cost to be paid, sets up the so-added cost as a new cost, and writes down the new cost in the column 4A-2 in the center 4. Besides, the center 4 sets up a new deadline for collection of the new cost, and writes down the new deadline in the column 4A-2 in the center 4 (Step S1604).

After the effect that the accident concerning collection of cost such that it is impossible to collect the cost by the deadline as described above occurred, the new cost, and the new deadline for collection of cost are written down in the column 4A-2, the Web server 4B in the center 4 sends a warning that the accident occurred concerning the collection of the cost by the user's fault who is to pay the cost, and a reminder that the user should pay the new cost by the new deadline set up by Step S1604 to a user terminal of the user, displaying the warning and the reminder with color, illustration, voice and so forth in addition to characters on the user terminal (Step S1605).

Besides, the Web server 4B in the center 4 sends copies of the warning and the reminder to a user terminal of a user who is to receive the cost, displaying the copies with color, illustration, voice and so forth in addition to the characters on the user terminal (Step S1606).

The center 4 writes down records that the center 4 sends the warning, reminder, and copies thereof, and makes it possible to display the notifications and the copies thereof with characters, color, illustration, voice and so forth on the user terminal in the column 4A-2 in the data base 4A as a record of the token (Step S1607).

After that, the center 4 judges whether or not the new cost was collected from the user who is to pay the new cost by the new deadline (Step S1608). When the center 4 judges that the cost was collected by the new deadline (Step S1608/Y), the center 4 finishes the process.

On the other hand, when the center 4 judges that the new cost was not collected by the new deadline (Step S1608/N), the center 4 decides whether or not the center 4 sends the warning and the reminder concerning the collection of the cost repeatedly (Step S1609). When the center 4 decides not to send the warning and the reminder repeatedly (Step S1609/N), the center 4 finishes the process.

When the center 4 decides to send the warning and the reminder concerning the collection of the cost repeatedly (Step S1609/Y), the center 4 repeats the processes of Steps S1603 to S1608.

The number of times for sending the warning and the reminder in the case of accidents concerning collection of cost is set up by the center 4 beforehand. The number of times in the above case may be set up as zero so as not to sending the warning and the reminder repeatedly.

(9) Writing Off Contents And A Position Concerning A User Who Did Not Pay Cost

Next is an explanation by using FIG. 17 when contents and a position concerning a user who did not pay cost are written off eventually.

When an accident concerning collection of cost occurred, the center 4 writes down a record that the accident occurred in the column 4A-2 in the data base 4A. Besides, the Web server 4B in the center 4 sends a warning that the accident occurred and a reminder that the user should pay the new cost by the new deadline to the user terminal of the user who is to pay the cost, displaying the warning and the reminder with color, illustration, voice and so forth in addition to characters on the user terminal (Step S1701).

After sending the warning and the reminder concerning the collection of the cost in the case of the accident, the center 4 judges whether or not the cost was collected (Step S1702). When the center 4 judges that the cost was collected (Step S1702/Y), the center 4 finishes the process.

When the center 4 judges that the cost was not collected (Step S1702/N), the center 4 judges whether or not the warning and the reminder were repeated prescribed number of times set up by the Web server 4B in the center 4 beforehand (Step S1703). When the center 4 judges that the warning and the reminder were not repeated the prescribed number of times (Step S1703/N), the processes of Step S1701 and Step 51702 are repeated.

When the cost was not collected and the warning and the reminder were repeated the prescribed number of times (Step S1703/Y), the center 4 appropriates money earmarked for a user who is to receive the cost from after-described funds for handling trouble (Step S1704). Besides, the center 4 writes down a record that the appropriation concerning the collection of the cost was implemented in the data base 4A (Step S1705). Incidentally, the effect of the appropriation is also recorded in the column 4A-2 as a record of the token.

Here is an explanation of the funds for handling trouble. The funds for handling trouble are used for implementing appropriation or compensation to a user who suffers a loss of benefit. The funds are used when it is impossible to collect cost concerning consent of use/delivery or transfer/delivery of contents, and when an accident such as infringement of right concerning contents occurred. Original funds which form the funds for handling trouble are collected from each of the users in a prescribed way by the center 4, and pooled in the center 4. As often as collection, appropriation, and compensation are implemented, each effect of the implementation is written down in the data base 4A in the center 4. The effect of the implementation may be recorded in an arbitrary part other than the columns 4A-1 to 4A-3 in the data base 4A. Besides, another data base(s) may be set up in and outside the center 4, in which the effect of the implementation may be recorded.

After the center 4 implements the appropriation for the accident concerning the collection of the cost and writes down the records, the center 4 writes off the position of the user who did not pay the cost, and bans the user from using all kinds of service such as registration, consent of use/delivery, transfer/delivery and collection of cost concerning the contents, and transfer of tokens in the transaction system (Step S1706). Further, the center 4 writes off the contents of the user who did not pay the cost from the data base 4A (Step S1707).

The center 4 writes down the effect that the position and the contents of the user who did not pay the cost were written off in the data base 4A in the center 4 (Step S1708). Further, the Web server 4B in the center 4 sends a notification that the position and the contents were written off to the user terminal of the user who did not pay the cost. In sending the notification, the Web server 4B makes it possible to display the notification with color, illustration, voice and so forth in addition to characters on the user terminal of the user (Step S1709).

The center 4 checks the data base 4A and judges whether or not a loss of benefit occurred to another user(s) by the process of writing off the position and the contents of the user who did not pay the cost (Step S1710).

For example, a user who received the consent of use/delivery of the written-off contents can not receive the consent of use/delivery in future because the contents were written off from the column 4A-1. When the loss of benefit occurred by writing off the contents and the position as described above (Step S1710/Y), the center 4 compensates a prescribed amount of cost from the funds for handling trouble to a user who suffers the loss of benefit and writes down the effect of the compensation in the data base 4A. The effect of the compensation may be recorded in an arbitrary part other than the columns 4A-1 to 4A-3 in the data base 4A. Besides, another data base(s) may be set up in and outside the center 4, in which the effect of the compensation may be recorded (Step S1711). Incidentally, the effect of the compensation is also written down in the column 4A-2 as a record of the token. When the center 4 judges that there is no loss of benefit to another user(s) (Step S1710/N), the center 4 finishes the process.

Incidentally, the center 4 is not barred from claiming damages and so forth to a person who used to be a user of the service in order to implement collection of cost concerning contents and a token(s) and collection of original funds (including interest arrears) forming the funds for handling trouble even if the position of the ex-user was written off.

(10) A Demand For Avoiding An Accident Such As Infringement Of Right

Figure 18:
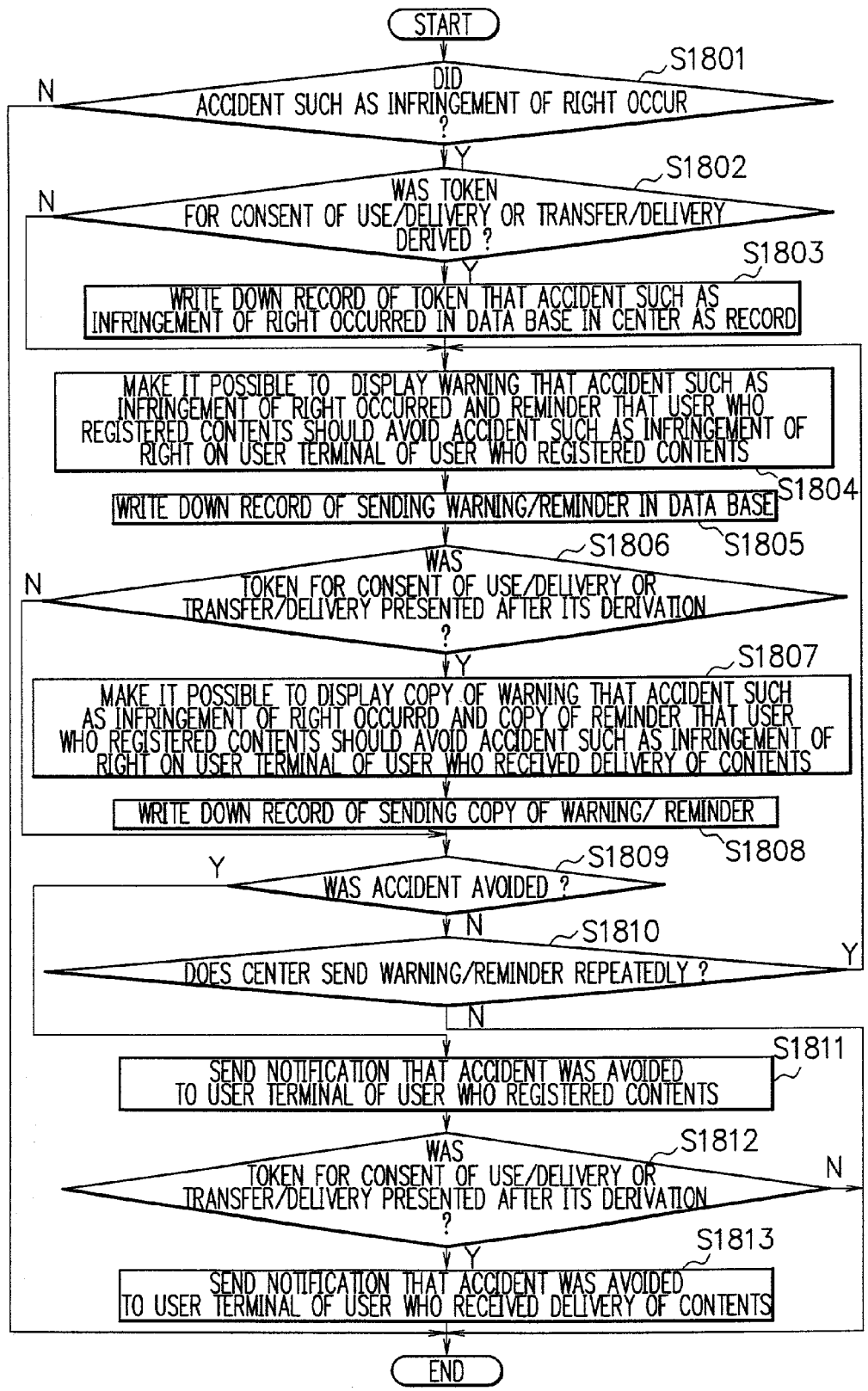
FIG. 18 is a flowchart explaining an example of operation with respect to each case of the method for transaction of contents through a network in the transaction system shown in FIG. 1.

Next is an explanation by using FIG. 18 when a failuer occurs in use of contents by an error of a user who registers contents.

The center 4 judges whether or not an accident such as infringement of right occurs to the contents and thereby the failuer occurs in use of the contents by the error of the user (Step S1801). When the center 4 judges that the accident did not occur (Step S1801/N), the center 4 finishes the process.

On the other hand, when the center 4 judges that the accident occurred (Step S1801/Y), the center 4 judges whether or not a token for the consent of use/delivery or the transfer/delivery of the contents was derived (Step S1802). When it is judged that the token was derived (Step S1802/Y), a record of the token that the accident occurred is written down in the column 4A-2 in the center 4 (Step S1803).

On the other hand, when it is judged that the token was not derived (Step S1802/N) or after the record that the accident occurred was written down in the column 4A-2 (Step S1803), the Web server 4B in the center 4 sends a warning that the accident occurred by the error of the user who registered the contents, and a reminder to the effects that the user should avoid the accident to a user terminal of the user who registered the contents, displaying the warning and the reminder with color, illustration, voice and so forth in addition to characters on the user terminal (Step S1804). The effects of sending the warning and the reminder and displaying them with color, illustration, voice and/or characters are written down in the data base 4A in the center 4. When the token was derived, a record of the derivation of the token is also written down in the column 4A-2 (Step S1805).

Next, the center 4 judges whether or not the token for the consent of use/delivery or the transfer/delivery of the contents was presented after the consent of use/delivery or the transfer/delivery of the contents was required by a user and after the token for the consent of use/delivery or the transfer/delivery was derived (Step S1806). When it is judged that the token for the consent of use/delivery or the transfer/delivery was not presented after its derivation(Step S1806/N), the center 4 judges whether or not an accident such as infringement of right was avoided by sending the warning and the reminder to the user terminal of the user who registered the contents (Step S1809).

When it is judged that the token for the consent of use/delivery or the transfer/delivery of the contents was presented after its derivation (Step S1806/Y), the Web server 4B in the center 4 sends copies of the warning that the accident occurred and the reminder that the user (who registered the contents) should avoid the accident to a user terminal of a user who presented the token for the consent of use/delivery or the transfer/delivery of the contents (who is to receive the delivery). In sending the copies, the Web server 4B makes it possible to display the copies with color, illustration, voice and so forth in addition to characters on the user terminal of the user (who is to receive the delivery) (Step S1807). The effects of sending the copies and making it possible to display them are written down in the data base 4A in the center 4. Also the effects are written down in the column 4A-2 as records of the token (Step S1808).

After prescribed period of time from the implementation of sending the warning and the reminder, the center 4 judges whether or not the accident by the error of the user who registered the contents was avoided (Step S1809). After receiving a notification that the accident was avoided from the user terminal of the user who registered the contents, and it is judged that the accident was avoided (Step S1809/Y), the Web server 4B in the center 4 sends a confirmative notification that the accident was avoided to the user terminal of the user who registered the contents (Step S1811).

After sending the confirmative notification that the accident was avoided to the user terminal of the user who registered the contents, the center 4 judges whether or not the token for the consent of use/delivery or the transfer/delivery of the contents which are a target of the accident was presented after its derivation (Step S1812). When it is judged that the token was not presented after its derivation (Step S1812/N), the center 4 finishes the process.

When the token was presented after its derivation (Step S1812/Y), the Web server 4B in the center 4 sends a notification that the accidents was avoided to the user terminal of the user who receives the delivery of the target contents (Step S1813). After sending the notification, the center 4 finishes the process.

When it is judged that the accident by the error of the user who gives the delivery of the contents was not avoided regardless of the warning and the reminder sent from the Web server 4B in the center 4 (Step S1809/N), the center 4 decides whether or not the warning and the reminder concerning the accident avoidance should be repeated (Step S1810). When it is decided that the warning and the reminder are not repeated (Step S1810/N), the center 4 finishes the process.

The center 4 sets up the number of times for sending the above-described warning and the reminder beforehand. After the warning and the reminder was repeated the number of times, the center 4 chooses N in Step S1810 as described above. The number of times may be set up as zero so as not to sending the warning and the reminder repeatedly.

When it is decided that the warning and the reminder are sent repeatedly (Step S1810/Y), the center 4 repeats the processes of Steps S1804 to S1809.

Incidentally, the accident may be avoided by registering a substitute for the contents concerned in the accident in the column 4A-1 by the user who gives the delivery of the contents. The substitute is sent to the user terminal of the user who was to receive the consent of use/delivery or the transfer/delivery of the contents.

Figure 19:
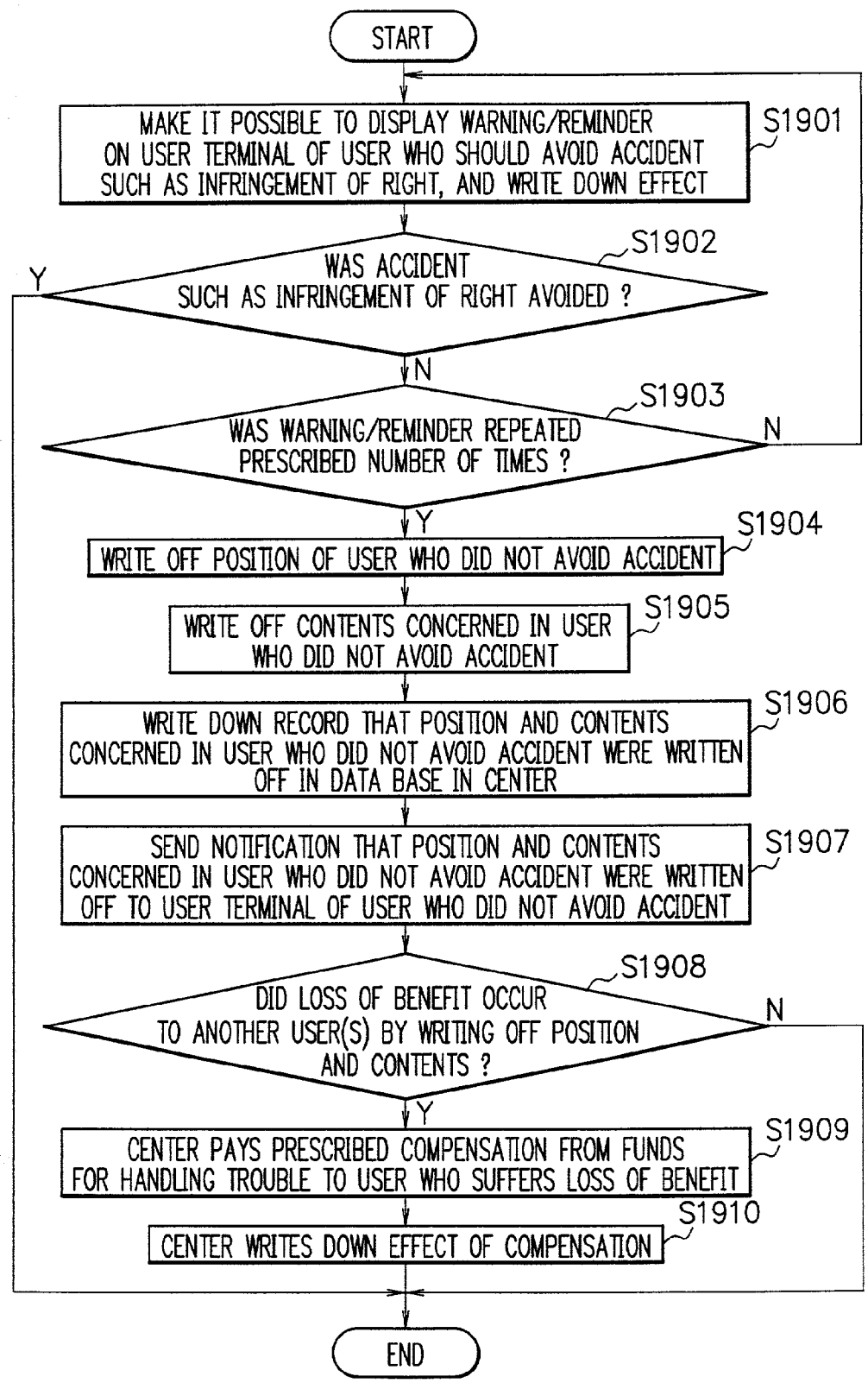
FIG. 19 is a flowchart explaining an example of operation with respect to each case of the method for transaction of contents through a network in the transaction system shown in FIG. 1.

(11) Writing Off A Position And Contents Concerning A User When Accident Avoidance Was Not Implemented Next is an explanation of processes of writing off a position and contents concerning a user who gives delivery of contents when an accident such as infringement of right by user's fault and so forth are unavoidable by using FIG. 19.

When the accident occurred by the error of the user who gives the delivery of the contents, the Web server 4B in the center 4 sends a warning that the accident occurred and a reminder that the user should avoid the accident, displaying the warning and the reminder with color, illustration, voice and so forth in addition to characters on the user terminal of the user who gives the delivery of the contents. Besides, the center 4 records the effect in the data base 4A. When a token was derived, the center 4 also writes down the effect in the column 4A-2 as a record of the token (Step S1901).

After sending the warning/reminder in the case of the accident, the center 4 judges whether or not the accident was avoided (Step S1902). When it is judged that the accident was avoided (Step S1902/Y), the center 4 finishes the process.

On the other hand, when it is judged that the accident was not avoided (Step S1902/N), the center 4 judges whether or not the warning/reminder was repeated prescribed number of times set up beforehand by the Web server 4B in the center 4 (Step S1903). When the warning/reminder was not repeated the prescribed number of times (Step S1903/N), the processes of Steps S1901 and S1902 are repeated.

When the accident was not avoided and the warning/reminder was repeated the prescribed number of times (Step S1903/Y), the center 4 writes off the position of the user who gave the delivery the contents, and bans the user from using all kinds of service in this transaction system (Step S1904). Further, the center 4 writes off the contents of the user who delivered the contents from the column 4A-1 (Step S1905).

The center 4 writes down a record that the position and the contents of the user who gave the delivery of the contents were written off in the data base 4A (Step S1906). Further, the Web server 4B in the center 4 sends a notification that the position and the contents were written off to the user terminal of the user who gave the delivery of the contents. In sending the notification, the Web server 413 makes it possible to display the notification with color, illustration, voice and so forth in addition to characters on the user terminal (Step S1907).

The center 4 checks the data base 4A and judges whether or not there is any user who suffers a loss of benefit by the process of writing off the position and the contents of the user who gave the delivery of the contents (Step S1908).

For example, it becomes impossible for the user who received the consent of use/delivery of the written-off contents to receive the consent of use/delivery of the contents in future by writing off the contents from the center 4. As described above, when the loss of benefit was occurred to the user by writing off the position and the contents (Step S1908/Y), the center 4 compensates the user who suffers the loss of benefit with a prescribed amount of money set up beforehand from the funds for handling trouble (Step S1909). Then the center 4 writes down a record of the compensation in the data base 4A. The effect of the compensation may be recorded in an arbitrary part other than the columns 4A-1 to 4A-3 in the data base 4A. Besides, another data base(s) may be set up in and outside the center 4, in which the effect of the compensation may be recorded (Step S1910). Incidentally, the effect of the compensation is also written down in the column 4A-2 as a record of a token. On the other hand, when the loss of benefit did not occur (Step S1908/N), the center 4 finishes the process.

Incidentally, among users who hope to receive consent of use/delivery or transfer/delivery of contents which are a target of an accident and hold a derived token(s) for consent of use/delivery or transfer/delivery, concerning a user(s) who is determined not to present the above token(s) during a period of presentation for realizing the displayed detail, the center 4 confirms that the user who is to receive the consent of use/delivery or the transfer/delivery waives the right to receive the consent of use/delivery or the transfer/delivery. Then the center 4 excludes the user from coverage of compensation from the funds for handling trouble.

Incidentally, the center 4 is not barred from claiming damages and so forth in order to implement collection of cost concerning contents and a token(s) and collection of original funds (including interest arrears) forming the funds for handling trouble to a person who used to be a user of the service even if the position of the ex-user was written off.

(12) A Notification Concerning Collection Of Original Funds

Figure 20:
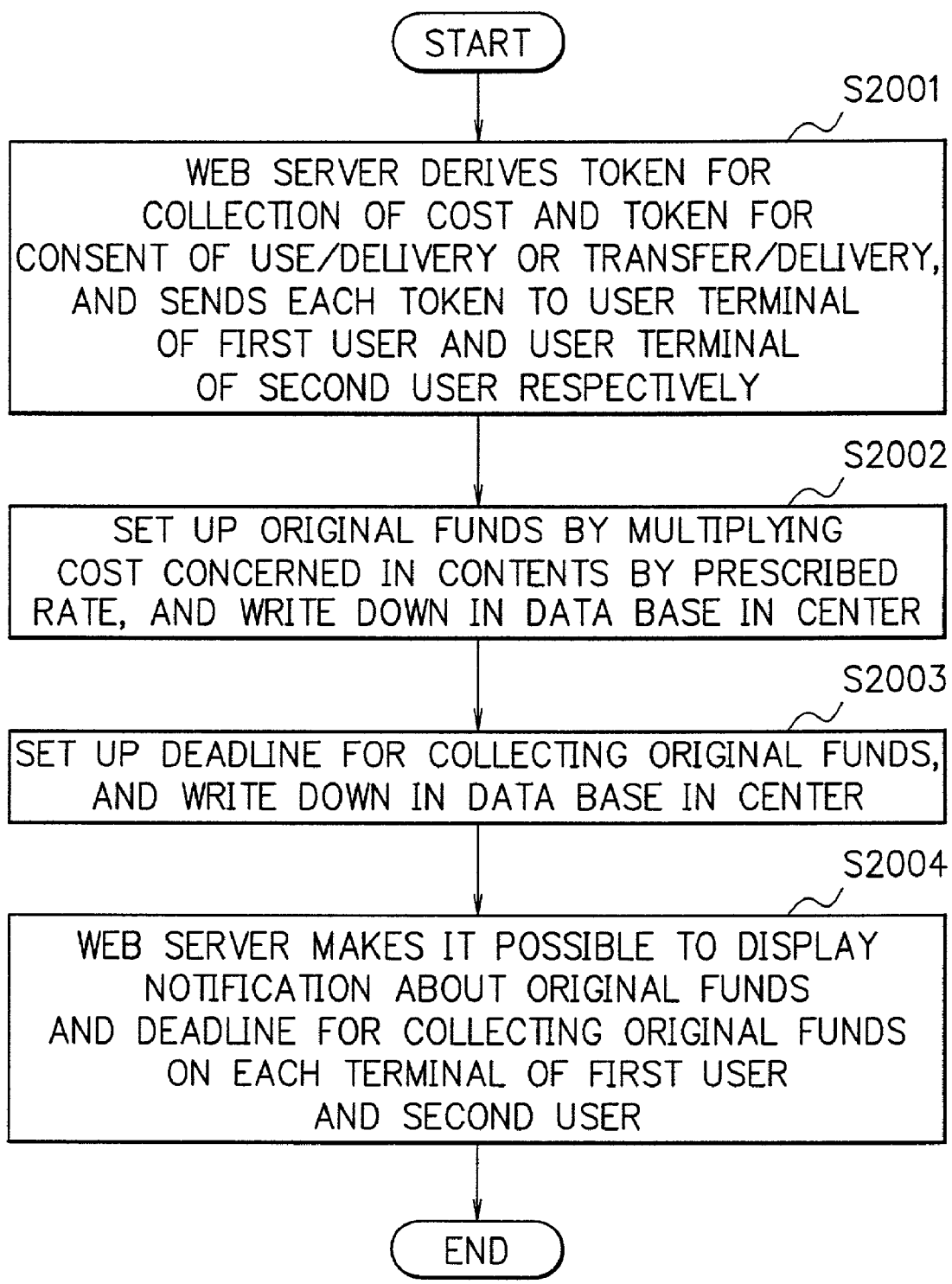
FIG. 20 is a flowchart explaining an example of operation with respect to each case of the method for transaction of contents through a network in the transaction system shown in FIG. 1.

Next is an explanation by using FIG. 20 when the center 4 sends a notification concerning collection of original funds forming the funds for handling trouble to a user at the time of derivation of a token.

By the processes of Step 401 shown in FIG. 4, when the second user decided to receive the consent of use/delivery or the transfer/delivery of the contents of the first user for value, which are registered/held in the column 4A-1, the Web server 4B in the center 4 derives a token for the consent of use/delivery or the transfer/delivery of the contents of the first user and sends the token to the user terminal of the second user. Besides, the Web server 4B derives a token for the collection of the cost concerning the contents of the first user and sends the token to the user terminal of the first user (Step S2001).

The center 4 sets up original funds forming the funds for handling trouble by multiplying the cost concerning the consent of use/delivery or the transfer/delivery of the contents of the first user by a prescribed rate. Then the center 4 records the above original funds in the data base 4A (Step S2002).

Besides, the center 4 sets up a deadline for collecting the original funds described above and records the deadline in the data base 4A (Step S2003).

The Web server 4B in the center 4 sends a notification concerning the original funds and the deadline for collecting the original funds set up in Steps S2002 and S2003 with color, illustration, voice and so forth in addition to characters to the user terminals of the first and second users (Step S2004). Then the Web server 4B finishes the process.

In this embodiment, the original funds, which are set up by multiplying the cost by a prescribed rate, are collected when the token is derived. However, the prescribed amount of money may be collected monthly as the original funds from all users. Besides, when the user(s) registers contents in the data base 4A in the center 4, the prescribed amount of money may be collected as the original funds from a user(s) who registers contents.

Figure 21:
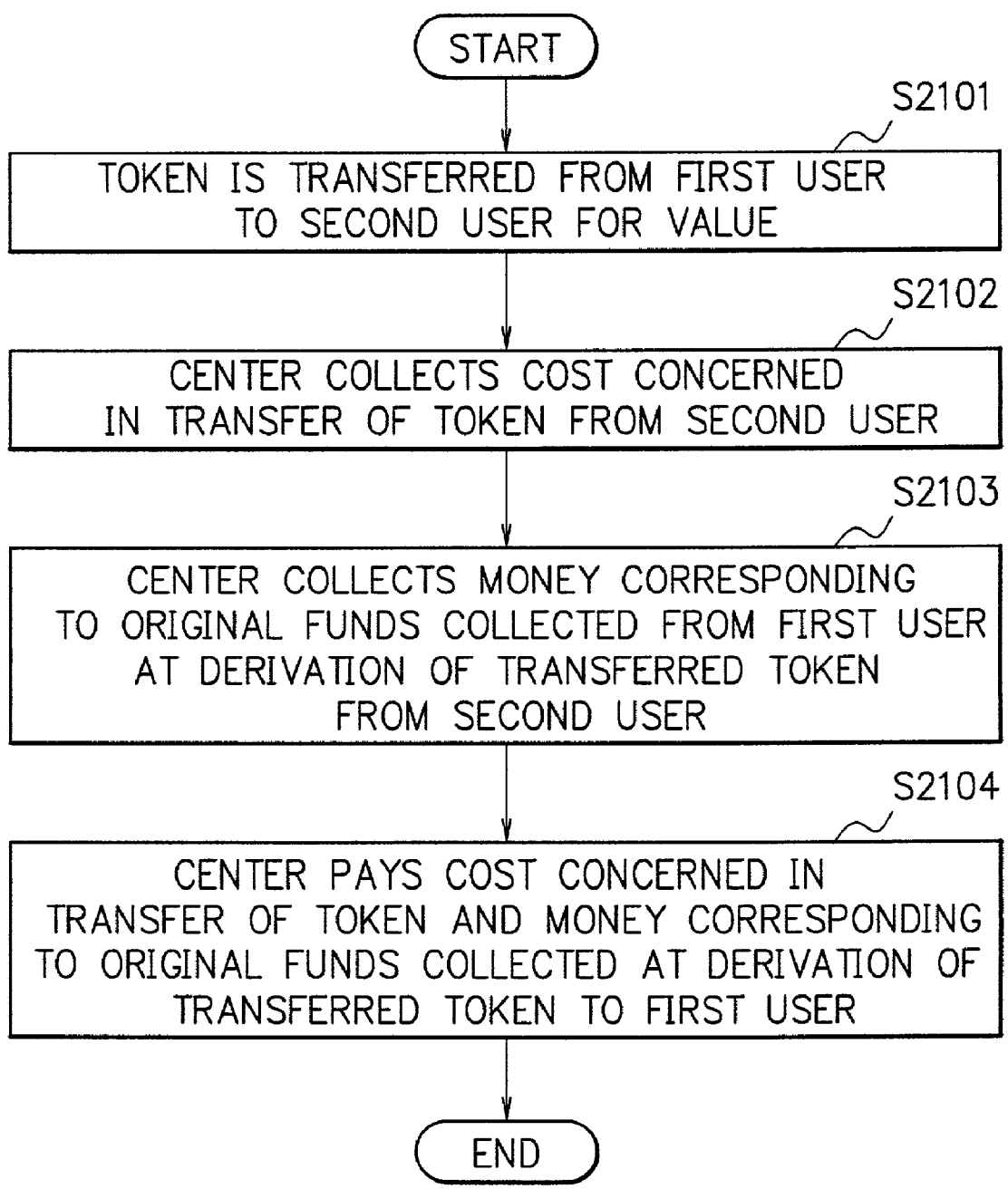
FIG. 21 is a flowchart explaining an example of operation with respect to each case of the method for transaction of contents through a network in the transaction system shown in FIG. 1.

(13) Collecting The Original Funds Forming The Funds For Handling Trouble In Transferring Tokens Next is an explanation of processes of collecting the original funds forming the funds for handling trouble when the token held by the first user is transferred to the second user for value by using FIG. 21.

For a first, by the processes shown in FIG. 5, the token held by the first user is transferred to the second user for value (Step S2101).

The center 4 collects the cost concerned in the transfer of the token from the second user (Step S2102). Besides, the center 4 further collects money corresponding to the original funds, which was collected from the first user when the token was derived, from the second user (Step S2103).

The center 4 pays the cost concerned in the transfer of the token and the money corresponding to the original funds, both of which are collected from the second user in Steps S2102 and S2103, to the first user (Step S2104). Then the center 4 finishes the process.

As well as the processes of Steps S2101 to S2104, when the token transferred to the second user is transferred to the third user, the center 4 collects the cost concerning the transfer of the token and the money corresponding to the original funds collected at the time of the derivation of the token from the third user, and pays to the second user. When the token was transferred as described above, the user who received the transfer of the token pays the cost concerning the transfer of the token and the money corresponding to the original funds collected at the time of the derivation of the token to the user who transferred the token through the center 4.

Figure 22:
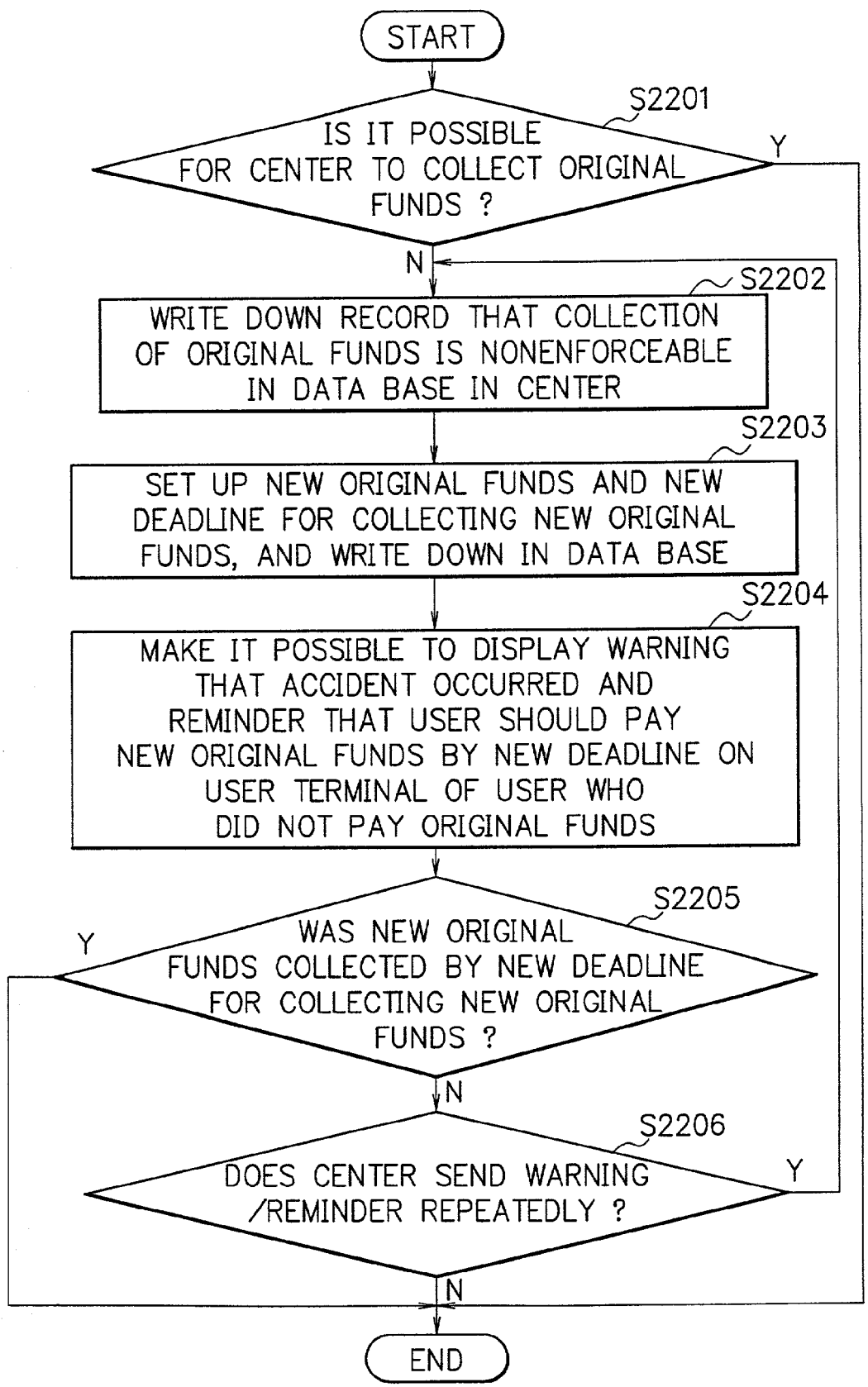
FIG. 22 is a flowchart explaining an example of operation with respect to each case of the method for transaction of contents through a network in the transaction system shown in FIG. 1.

(14) Collecting The Original Funds After Accidents Concerned In The Original Funds Forming Funds For Handling Trouble Occurred Next is an explanation of processes of collecting the original funds by the center 4 when it is impossible for the center 4 to collect the original funds forming the funds for handling trouble at the time of derivation of a token by using FIG. 22.

As shown in FIG. 22, the center 4 judges whether or not it is possible to collect the original funds forming the funds for handling trouble by a deadline for collecting the original funds from a user to whom the token is sent by the Web server 4B in the center 4 at the time of the derivation of the token (Step S2201). When it is judged that it is possible for the center 4 to collect the original funds by the deadline for the collection (Step S2201/Y), the original funds are collected. Then the center 4 finishes the process.

On the other hand, when it is judged that it is impossible for the center 4 to collect the original funds by an error of the user who is to pay the original funds (Step S2201/N), the center 4 writes down a record that the collection of the original funds are nonenforceable in the data base 4A in the center 4 (Step S2202).

After the center 4 judges that the collection of the original funds became nonenforceable by the user's error by the deadline for the collection, the center 4 adds prescribed interest arrears to the original funds forming the funds for handling trouble, which is to be set up as new original funds. Then, the new original funds are recorded in the data base 4A in the center 4. Besides, the center 4 sets up a new deadline for collecting the new original funds, and records the deadline in the data base 4A in the center 4 (Step S2203).

After recording the effect that the accident concerned in the uncollected original funds occurred in the data base 4A, the Web server 4B in the center 4 sends a warning that the accident concerned in the funds for handling trouble occurred and a reminder that the user should pay the new original funds by the deadline for collecting the new original funds to the user terminal of the user who did not pay the original funds. In sending the warning and the reminder, the Web server 4B makes it possible to display the warning and the reminder with color, illustration, voice and so forth in addition to characters on the user terminal (Step S2204).

The center 4 judges whether or not the new original funds, which was calculated by adding the interest arrears to the original funds, were paid by the new deadline by the user who received the warning and reminder (Step S2205). When it is judged that the original funds were paid by the user, the center 4 finishes the process (Step S2205/Y).

When it is judged that the new original funds were not paid by the user (Step S2205/N), the center 4 decides whether or not to send the warning and the reminder repeatedly (Step S2206). When the center 4 decides to send the warning and the reminder repeatedly (Step S2206/Y), the processes of Steps S2202 to S2205 are repeated. On the other hand, when the center 4 decides not to send the warning and the reminder repeatedly (Step S2206/N), the center 4 finishes the process.

The center 4 sets up the number of times for sending the above-described warning and the reminder in the case of the accident concerning the uncollected original funds beforehand. The number of times described above may be set up as zero so as not to send the warning and the reminder repeatedly.

Figure 23:
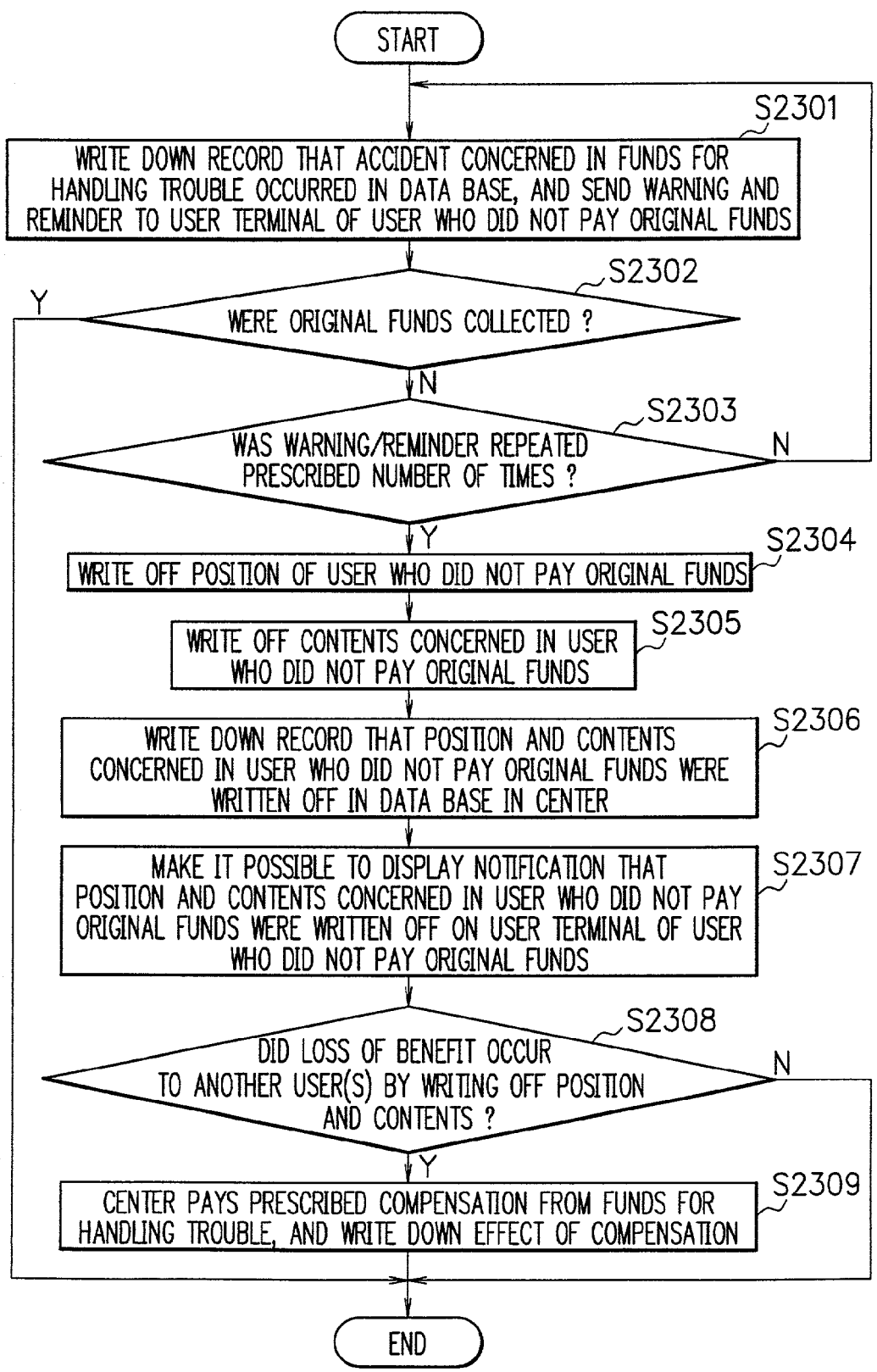
FIG. 23 is a flowchart explaining an example of operation with respect to each case of the method for transaction of contents through a network in the transaction system shown in FIG. 1.

(15) Writing Off A Position And Contents Concerning A User Who Did Not Pay Original Funds Next is an explanation by using FIG. 23 when a position and contents concerning a user who did not pay original funds forming the funds for handling trouble are written off.

When an accident concerning the uncollected original funds occurred, the center 4 writes down a record that the accidents occurred in the data base 4A in the center 4. Besides, the Web server 4B in the center 4 sends a warning that the accident occurred and a reminder that the user who did not pay the original funds should pay a new original funds by a new deadline to the user terminal of the user, displaying the warning and the reminder with characters, color, illustration, voice and so forth on the user terminal (Step S2301).

After sending the warning and the reminder to the user terminal, the center 4 judges whether or not the user paid the new original funds (Step S2302). When the center 4 judges that the user paid the new original funds (Step S2302/Y), the center 4 finishes the process.

On the other hand, when the center 4 judges that the user did not pay the original funds (Step S2302/N), the center 4 judges whether or not the warning and the reminder were sent repeatedly prescribed number of times set up beforehand by the Web server 4B in the center 4 (Step S2303). When it is judged that the warning and the reminder were not repeated the prescribed number of times (Step S2303/N), the processes of Steps S2301 and S2302 are repeated.

When the user did not pay the new original funds and the warning and the reminder were repeated the prescribed number of times (Step S2303/Y), the center 4 writes off the position of the user who did not pay the new original funds and bans the user from using all kinds of service such as registration, consent of use/delivery, transfer/delivery, collection of cost concerning the contents and transfer of tokens in the transaction system (Step S2304). Further, the center 4 writes off the contents of the user who did not pay the new original funds from the column 4A-1 as shown in FIG. 1 (Step S2305).

The center 4 writes down a record that the position and the contents of the user who did not pay the new original funds were written off in the data base 4A in the center 4,(Step S2306). Further, the Web server 4B in the center 4 sends a notification that the position and the contents were written off to the user terminal of the user who did not pay the new original funds. In sending the notification, the Web server 4B makes it possible to display the notification with color, illustration, voice and so forth in addition to characters on the user terminal (Step S2307).

The center 4 checks the data base 4A and judges whether or not there is any user who suffers a loss of benefit by the process of writing off the position and the contents of the user who did not pay the new original funds (Step S2308).

For example, it becomes impossible for a user who received the consent of use/delivery of the written-off contents to receive the consent of use/delivery in future by writing off the contents from the center 4. As described above, when the loss of benefit occurred to the user by writing off the position and the contents (Step S2308/Y), the center 4 compensates the user who suffers the loss of benefit with a prescribed amount of money set up beforehand from the funds for handling trouble. Then the center 4 writes down a record of the compensation in the data base 4A. The effect of the compensation may be recorded in an arbitrary part other than the columns 4A-1 to 4A-3 in the data base 4A. Besides, another data base(s) may be set up in and outside the center 4, in which the effect of the compensation may be recorded (Step S2309). Incidentally, the effect of the compensation is also written down in the column 4A-2 as a record of a token. When the loss of benefit did not occur (Step S2308/N), the center 4 finishes the process.

Incidentally, the center 4 is not barred from claiming damages and so forth in order to implement collection of cost concerning contents and a token(s) and collection of original funds (including interest arrears) forming the funds for handling trouble to a person who used to be a user of the service even if the position of the ex-user was written off.

Figure 24:
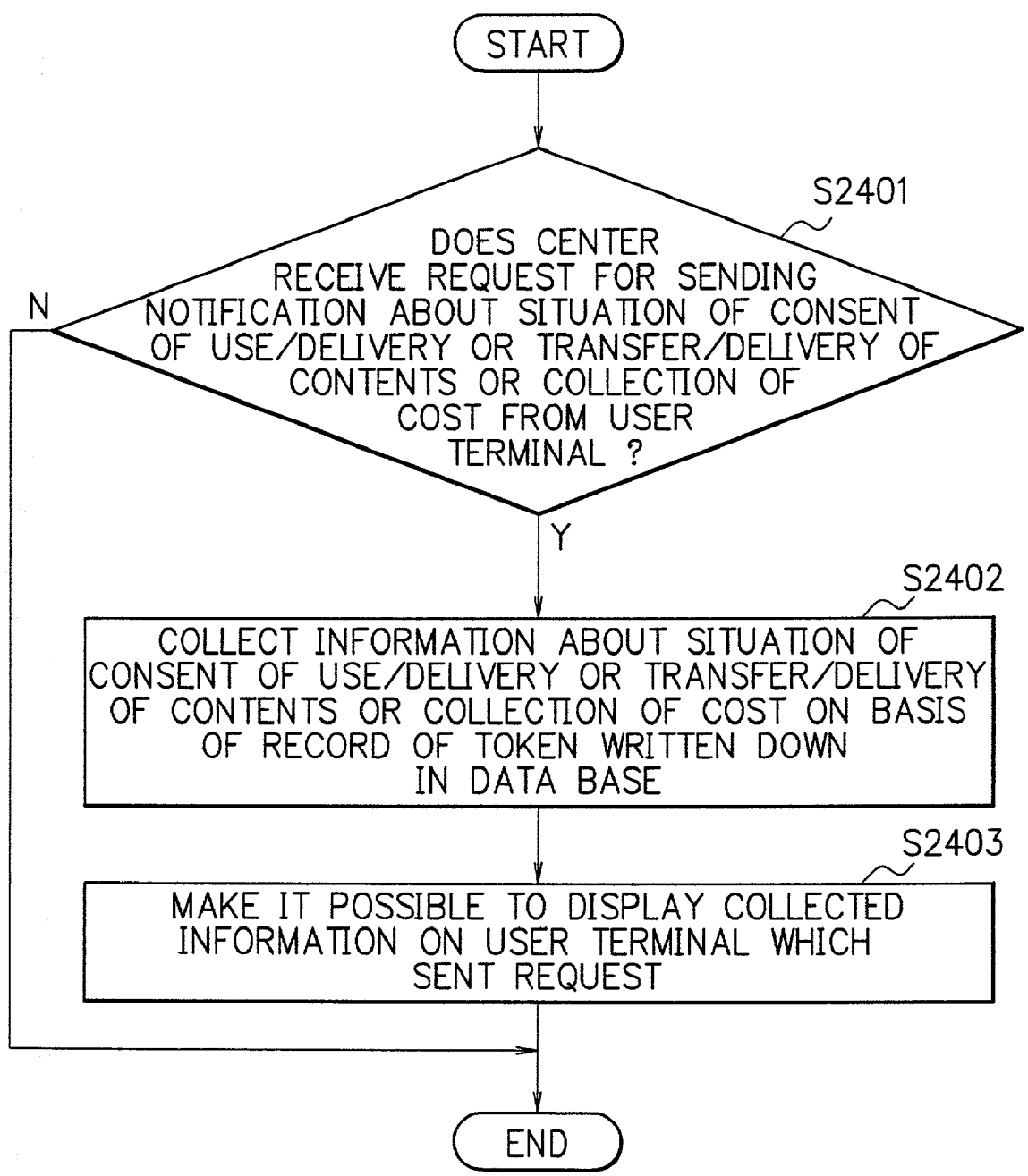
FIG. 24 is a flowchart explaining an example of operation with respect to each case of the method for transaction of contents through a network in the transaction system shown in FIG. 1.

(16) A Notification About Situations Of Consent Of Use/Delivery Or Transfer/Delivery, And Collection Of Cost Next is an explanation by using FIG. 24 when a user requests the center 4 to send a notification about situations of consent of use/delivery or transfer/delivery and collection of cost concerning contents concerned in a user himself/herself.

The center 4 judges whether or not a user requested a notification about situations of consent of use/delivery or transfer/delivery and collection of cost concerning contents concerned in the user himself/herself (Step S2401). When the center 4 judged that the user did not request the notification (Step S2401/N), the center finishes the process.

On the other hand, when the center 4 judged that the user requested the notification through the user terminal (Step S2401/Y), the center 4 retrieves a record of a token concerning the user who requested the notification from the data base 4A. On the basis of the retrieved record of the token, the center 4 collects information about the situations of the consent of use/delivery or the transfer/delivery and the collection of the cost concerning the contents concerned in the user who requested the notification (Step S2402).

The center 4 sends the collected information about the situations to the user terminal of the user who requested the notification so as to display the notification with color, illustration, voice and so forth in addition to characters on the user terminal (Step S2403).

(17) A Notification About A Situation Of The Funds For Handling Trouble

Figure 25:
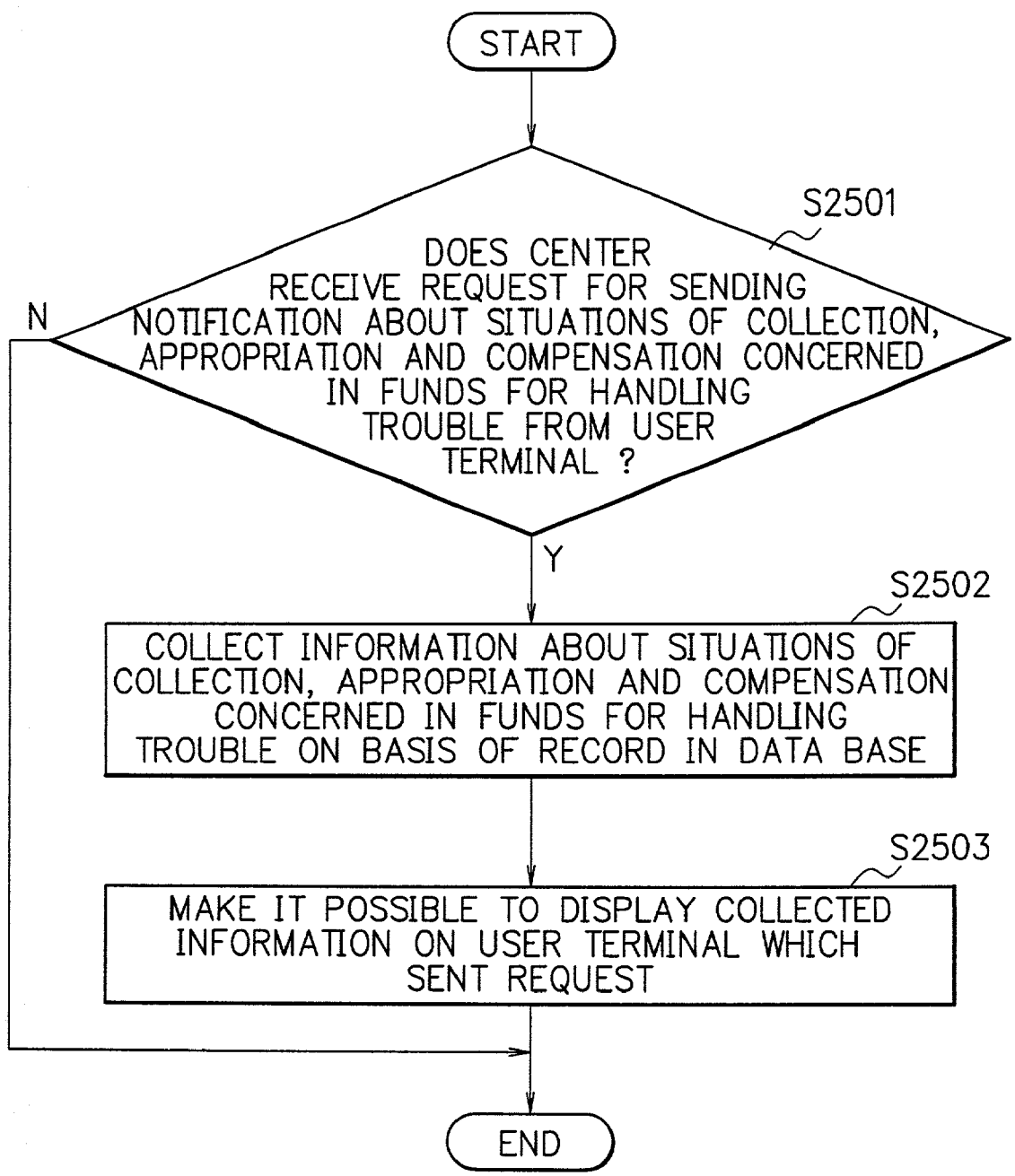
FIG. 25 is a flowchart explaining an example of operation with respect to each case of the method for transaction of contents through a network in the transaction system shown in FIG. 1.

Next is an explanation by using FIG. 25 when a user requested the center 4 to send a notification about a situation of the funds for handling trouble concerning the user himself/herself.

The center 4 judges whether or not a user requested a notification about situations of collection of original funds, and appropriation and compensation from the funds for handling trouble concerning the user himself/herself (Step S2501). When it is judged that the user did not request the notification (Step S2501/N), the center 4 finishes the process.

On the other hand, when it is judged that the user requested the notification (Step S2501/Y), the center 4 retrieves a record of a token concerning the user who requested the notification and information about the funds for handling trouble from the data base 4A. On the basis of the retrieved record and information, the center 4 collects information about the situations of the collection of the original funds, and the appropriation and the compensation from the funds for handling trouble concerning the user who requested the notification (Step S2502).

The center 4 sends the collected information of the situations to the user terminal of the user who requested the notification so as to display the notification with color, illustration, voice and so forth in addition to characters on the user terminal (Step S2503).

Next is an explanation of the transaction system and method with the above-described structure and the general operation using an example of possible transaction shown in FIG. 9.

The following is an explanation by using FIGS. 26A and 26B when the fourth user and the second user did not present the tokens by the prescribed deadline during the "period of presentation".

The fourth user holds the token (Step S910) for the consent of use/delivery of the contents B concerned in the third user. However, when the prescribed deadline passed without the presentation of the token for realizing the detail displayed in the token in Step S910 during the "period of presentation", the Web server 4B in the center 4 makes it possible to display the warning in the list shown in FIG. 26A on the fourth user terminal 3a.

On the list shown in FIG. 26A, the following are shown: "Identification/Specification No."; "P (a record concerning the consent of use/delivery or the transfer/delivery of the contents, which shows a situation at the present moment only)"; "Period of Presentation"; and "Warning" that the presentation has not been implemented. Besides, by displaying/informing the underlined section ("Period of Presentation" and "Warning") with color, illustration, voice and so forth in addition to characters, it becomes possible to impress the fourth user with the warning that the presentation was not implemented more effectively.

Further, after the list shown in FIG. 26A was displayed on an arbitrary display means, the detail of the token shown in FIG. 13A, which is a record in the data base 4A in the center 4, is displayed by choosing the "Identification/Specification No.: ⑦" in a prescribed way.

On the other hand, the second user holds the token (Step S913) derived accompanied by the transfer of the token for the collection of the cost of the contents (A+A'). However, when the prescribed deadline passed without the presentation of the token for realizing the detail displayed in the token in Step S913 during the "period of presentation", the center 4 makes it possible to display the warning in the list shown in FIG. 26B on the second user terminal 2.

On the list shown in FIG. 26B, the following are displayed: "Identification/Specification No."; "P (a record concerning the collection of the cost, which shows a situation at the present moment only)"; "Period of Presentation"; and "Warning" that the presentation has not been implemented". Besides, by displaying/informing the underlined section ("Period of Presentation" and "Warning") with color, illustration, voice and so forth in addition to characters, it becomes possible to impress the second user with the warning that the presentation was snot implemented more effectively.

Further, after the list shown in FIG. 26B was displayed on an arbitrary display means, the detail of the token shown in FIG. 14A, which is a record in the data base 4A in the center 4, is displayed by choosing the "Identification/Specification No.: ⑨" in a prescribed way.

Next is an explanation by using FIGS. 27A and 27B when the center 4 was not able to collect the cost from the fifth user during the period for the collection of the cost.

The fourth user presented the token in Step S912. However, when the center 4 was not able to collect the cost concerning the consent of use/delivery of the contents (A+A') from the fifth user during the period for the collection of the cost, the center 4 makes it possible to display the warning/reminder in the list shown in FIG. 27A on the fifth user terminal 3b.

On the list shown in FIG. 27A, the following are displayed; "Identification/Specification No."; "P (a record concerning the collection of the cost, which shows a situation at the present moment only): Accidents=Collection Delay etc. (Warning and Reminder/Number of Times for Repetition=0) "; "Warning" about failuer to collect the cost; and "Reminder" after setting up new cost, which is calculated by adding prescribed interest arrears set up beforehand to the original cost of the contents, and a deadline for the collection of the new cost. Besides, by displaying/informing the underlined section ("Warning" and "Reminder") with color, illustration, voice and so forth in addition to characters, it becomes possible to impress the fifth user with the warning/reminder more effectively.

Besides, the center 4 makes it possible to display the copy of the warning/reminder in the list shown in FIG. 27A on the fourth user terminal 3a.

Further, after displaying the warning/reminder in the list shown in FIG. 27A or the copy thereof on an arbitrary display means, the list shown in FIG. 27B, which is a record in the column 4A-2 in the center 4, is displayed by choosing the "Identification/Specification No.: ⑤-3" shown in FIG. 27A in a prescribed way. In the list shown in FIG. 27B, there is shown the detail record of the token concerning the warning/reminder in the list shown in FIG. 27A, which shows the record leading up to the time when the center 4 makes it possible to display the above warning/reminder in the list shown in FIG. 27A on the fifth user terminal 3b.

Next is an explanation by using FIGS. 28A and 28B when the center 4 was not able to collect the new cost from the fifth user by the new deadline for the collection of the cost.

The center 4 made it possible to display the warning/reminder in the list shown in FIG. 27A on the fifth user terminal 3b. However, when the fifth user did not pay the new cost (Y+YY1) by the new deadline XXX for the collection of the new cost, the center 4 sets up new cost (Y+YY1+YY2), which is calculated by further adding prescribed interest arrears YY2 to the cost (Y+YY1), and a deadline XXX' for the collection of the above new cost. The Web server 4B in the center 4 makes it possible to display the warning/reminder in the list shown in FIG. 28A including the above-described new cost (Y+YY1+YY2) and the new deadline XXX' on the fifth user terminal 3b. Incidentally, FIG. 28A shows a list on the first repetition of sending the warning/reminder concerning the collection of the cost.

In the list shown in FIG. 28A, the following are displayed; "Identification/Specification No."; "P (a record concerning the collection of the cost, which shows a situation at the present moment only): Accidents=Collection Delay etc. (Warning and Reminder/Number of Times for Repetition)"; "Warning" about failuer to collect the cost; and "Reminder" after setting up the new cost, which is calculated by adding prescribed interest arrears set up beforehand to the preceding cost, and the deadline for collecting the new cost. Besides, by displaying/informing the underlined section ("Warning" and "Reminder") with color, illustration, voice and so forth in addition to characters, it becomes possible to impress the fifth user with the warning/reminder more effectively.

Moreover, the center 4 makes it possible to display the copy of the warning/reminder in the list shown in FIG. 28A on the fourth user terminal 3a.

Further, after displaying the warning/reminder in the list shown in FIG. 28A or the copy thereof on an arbitrary display means, the list shown in FIG. 28B, which is a record in the column 4A-2 in the center 4, can be displayed by choosing the "Identification/Specification No.: ⑤-3" shown in FIG. 28A in a prescribed way. In the list shown in FIG. 28B, there is shown the detail record of the token concerning the warning/reminder in the list shown in FIG. 28A, which shows the record leading up to the time when the center 4 makes it possible to display the above warning/reminder in the list shown in FIG. 28A on the fifth user terminal 3b.

In the "P: Accidents=Collection Delay etc. (Warning and Reminder/Number of Times for Repetition)", the number of times repeated by the center 4 in sending the warning/reminder is displayed. The number of times for repeating the warning/reminder is set up by the center 4 beforehand. The center 4 sends the warning/reminder in the list shown in FIG. 28A repeatedly the set-up number of times as described above until the cost is collected. Incidentally, the number of times for repetition in the "P: Accidents=Collection Delay etc. (Warning and Reminder/Number of Times for Repetition)" is incremented as often as the warning/reminder is repeated. Besides, in the same way, the cost and the deadline shown in the "Reminder" are incremented as often as the warning/reminder is repeated.

When the number of times for repetition is set up as zero, the Web server 4B in the center 4 displays only the warning/reminder in the list shown in FIG. 27A without the repetition. In the same way, the Web server 4B does not send the copies of the list to the fourth user terminal 3a repeatedly.

Next is an explanation by using FIGS. 29A to 29D when an accident such as infringement of right occurs to the contents A.

The detail displayed in the token in Step S901 was realized by the presentation of the token by the second user. Besides, the detail displayed in the token in Step S908 was realized by the presentation of the token by the fourth user. Then, when the accident concerning the contents A owned by the first user occurs, the center 4 makes it possible to display the warning/reminder in the list shown in FIGS. 29 A and 29B on the first user terminal 1.

In the list shown in FIG. 29A or 29B, the following are displayed; "Identification/Specification No."; "P (a record concerning the consent of use/delivery or the transfer/delivery of the contents, which shows a situation at the present moment only): Accidents=Infringement of Right etc. (Warning and Reminder/Number of Times for Repetition=0) "; "Warning" that infringement of right etc. occurred; and "Reminder" that the first user should avoid the accident by the prescribed deadline (XXX) set up beforehand. Besides, by displaying/informing the underlined section ("Warning" and "Reminder") with color, illustration, voice and so forth in addition to characters, it becomes possible to impress the first user with the warning/reminder more effectively.

The center 4 makes it possible to display the copy of the warning/reminder in the list shown in FIG. 29A on the second user terminal 2. Besides, the center 4 makes it possible to display the copy of the warning/reminder in the list shown in FIG. 29B on the fourth user terminal 3a.

Further, after displaying the warning/reminder in the list shown in FIG. 29A or the copy thereof on an arbitrary display means, the list shown in FIG. 29C, which is a record in the data base 4A in the center 4, can be displayed by choosing the "Identification/Specification No.: ①-3" shown in FIG. 29A in a prescribed way. In the list shown in FIG. 29C, there is shown the detail record concerning the warning/reminder in the list shown in FIG. 29A, which shows the record leading up to the time when the center 4 makes it possible to display the above warning/reminder in the list shown in FIG. 29A on the first user terminal 1.

In the same way, after displaying the warning/reminder in the list shown in FIG. 29B or the copy thereof on an arbitrary display means, the list shown in FIG. 29D, which is a record in the data base 4A in the center 4, can be displayed by choosing the "Identification/Specification No.: ③-4" shown in FIG. 29B in a prescribed way. In the list shown in FIG. 29D, there is shown the detail record concerning the warning/reminder in the list shown in FIG. 29B, which shows the record leading up to the time when the center 4 makes it possible to display the above warning/reminder in the list shown in FIG. 29B on the first user terminal 1.

Next is an explanation by using FIGS. 30A to 30D when an accident such as infringement of right concerning the contents A was avoided.

The accident such as infringement of right concerning the contents A occurred after the detail displayed in the tokens in Step S901 and Step S908 was realized. After that, when the accident was avoided by sending the warnings/reminders in the lists shown in FIGS. 29A and 29B, which were made possible to display by the center 4, the first user terminal 1 sends a notification that the accident was avoided to the Web server 4B in the center 4.

After the Web server 4B in the center 4 received the notification that the accident such as infringement of right was avoided, a record that the accident was avoided is written down in the column 4A-2 in the center 4. Incidentally, when the accident was avoided by replacing the contents A with its substitute, the first user terminal 1 registers the substitute in the Web server 4B in the center 4 along with sending the notification. The center 4 receives the substitute from the Web server 4B along with the notification, and holds the substitute in the column 4A-1.

In response to the notification concerning the accident, the center 4 makes it possible to display the notifications in the list shown in FIG. 30A on the second user terminal 2 and in the list shown in FIG. 30B on the fourth user terminal 3a. Incidentally, when the accidents was avoided by replacing the contents A with its substitute, the center 4 sends the substitute to each of the second user terminal 2 and fourth user terminal 3a respectively along with the notifications. In the list shown in FIG. 30A or FIG. 30B, the following are displayed; "Identification/Specification No."; "P (a record concerning the consent of use/delivery or the transfer/delivery of the contents, which shows a situation at the present moment only): Realized Displayed Detail"; and "Notification" that the accident was avoided.

Further, after displaying the notification in the list shown in FIG. 30A on an arbitrary display means, the list shown in FIG. 30C can be displayed by choosing the "Identification/Specification No.: ①-4" shown in FIG. 30A. In the list shown in FIG. 30C, there is shown the detail record of the token concerning the notification shown in FIG. 30A, which shows the record leading up to the time when the center 4 makes it possible to display the above notification shown in FIG. 30A on the second user terminal 2.

In the same way, after displaying the notification in the list shown in FIG. 30B on an arbitrary display means, the list shown in FIG. 30D can be displayed by choosing the "Identification/Specification No.: ③-5" shown in FIG. 30B. In the list shown in FIG. 30D, there is shown the detail record of the token concerning the notification shown in FIG. 30B, which shows the record leading up to the time when the center 4 makes it possible to display the above notification shown in FIG. 30B on the fourth user terminal 3a.

Incidentally, in the above embodiment, there is shown the case after the second and fourth users presented the tokens. Also when the second and fourth users held the derived tokens, and they did not present the tokens during the "period of presentation", the center 4 makes it possible to display the copies of the warning/reminder in the lists shown in FIGS. 29A and 29B on the second user terminal 2 and the fourth user terminal 3a respectively. However, when there is no presentation of tokens during the "period of presentation", the center 4 does not compensate the second and fourth users concerning the accident.

Next is an explanation by using FIG. 33A when an accident such as infringement of right occurs to contents, there is no derived token concerning the contents or it becomes definite that there is no presentation after the derivation of the token concerning the contents.

When the accident occurs to the contents [A+A'+B]' whose rightful claimant is fourth user, and a token concerning the contents [A+A'+B]' was not derived or it becomes definite that the token will not be presented after its derivation, the center 4 makes it possible to display the warning/reminder in the list shown in FIG. 33A on the fourth user terminal 3a.

In the warning/reminder in the list shown in FIG. 33A, the following are displayed; "Contents"; "Warning" that the accident such as infringement of right occurred; and "Reminder" that the fourth user should avoid the accident during the prescribed period set up beforehand. Besides, by displaying/informing the underlined section ("Warning" and "Reminder") with color, illustration, voice and so forth in addition to characters, it becomes possible to impress the fourth user with the warning/reminder more effectively.

It is assumed that the accident concerning the contents [A+A'+B]' was avoided. When the fourth user terminal 3a sends a notification that the accident concerning the contents [A+A'+B]' was avoided during the above prescribed period to the Web server 4B in the center 4, the center 4 receives the notification from the Web server 4B and writes down a record that the accident was avoided in the data base 4A.

Incidentally, when the accidents was avoided by replacing the contents [A+A'+B]' with its substitute, the fourth user terminal 3a sends the substitute to the Web server 4B in the center 4 along with the notification. The sent substitute is registered and held in the column 4A-1.

Next is an explanation by using FIGS. 31A to 31D when an accident such as infringement of right concerning the contents A was not avoided.

The accident occurred to the contents A after the detail displayed in the tokens in Step S901 and Step S908 was realized. When the accident was not avoided during the set-up prescribed period (XXX) after the center 4 sent the warnings/reminders in the lists shown in FIGS. 29A and 29B, the Web server 4B in the center 4 makes it possible to display the warnings/reminders in the lists shown in FIGS. 31A and 31B on the first user terminal 1.

In the list shown in FIG. 31A or FIG. 31B, the following are displayed; "Identification/Specification No."; "P (a record concerning the consent of use/delivery or the transfer/delivery of the contents, which shows a situation at the present moment only): Accidents=Infringement of Right etc.

(Warning and Reminder/Number of times for Repetition)"; "Warning" that the accident was not avoided; and "Reminder" that the first user should avoid the accident by the new period (XXX'). Besides, by displaying/informing the underlined section ("Warning" and "Reminder") with color, illustration, voice and so forth in addition to the characters, it becomes possible to impress the first user with the warning/reminder more effectively.

The center 4 makes it possible to display the copy of the warning/reminder in the list shown in FIG. 31A on the second user terminal 2. Besides, the center 4 makes it possible to display the copy of the warning/reminder in the list shown in FIG. 31B on the fourth user terminal 3a.

Further, after displaying the warning/reminder in the list shown in FIG. 31A and the copy thereof on an arbitrary display means, the list shown in FIG. 31C, which is a record of a token in the column 4A-2 in the center 4, can be displayed by choosing the "Identification/Specification No.: ①-3" shown in FIG. 31A in a prescribed way. In the list shown in FIG. 31C, there is shown the detail record of the token concerning the list shown in FIG. 31A, which shows the record leading up to the time when the center 4 makes it possible to display the above warning/reminder in the list shown in FIG. 31A on the first user terminal 1.

In the same way, after displaying the warning/reminder in the list shown in FIG. 31B and the copy thereof on an arbitrary display means, the list shown in FIG. 31D, which is a record of a token in the column 4A-2 in the center 4, can be displayed by choosing the "Identification/Specification No.: ③-4" shown in FIG. 31B in a prescribed way. In the list shown in FIG. 31D, there is shown the detail record of the token concerning the list shown in FIG. 31B, which shows the record leading up to the time when the center 4 makes it possible to display the above warning/reminder shown by the list in FIG. 31B on the first user terminal 1.

In the "P: Accidents=Infringement of Right etc. (Warning and Reminder/Number of Times for Repetition)", there is displayed the number of times repeated by the center 4 in sending the warnings/reminders. The number of times for repeating the warnings/reminders is set up by the center 4 beforehand. The center 4 sends the warnings/reminders in the lists shown in FIGS. 31A and 31B the set-up number of times as described above repeatedly until the accident is avoided. Incidentally, the number of times for repetition in the "P: Accidents=Infringement of Right etc. (Warning and Reminder/Number of Times for Repetition)" is incremented as often as the warnings/reminders are repeated. Besides, in the same way, the deadline shown in the "Reminder" is incremented as often as the warning/reminder is repeated.

When the number of times for repetition is set up as zero, the center 4 displays only the warnings/reminders in the lists shown in FIGS. 29A and 29B without the repetition. In the same way, the center 4 does not send the copies of the lists to the second user terminals 2 and the fourth user terminal 3a repeatedly.

Next is an explanation by using FIGS. 32A to 32D when an accident such as infringement of right concerning the contents A was avoided after the first repetition of sending a warning/reminder concerning the accident from the center 4.

The accident such as infringement of right concerning the contents A occurred after the detail displayed in the tokens in Step S901 and Step S908 was realized. However, the accident was not avoided though the center 4 sent the warnings/reminders in the lists shown in FIGS. 29A and 29B. After that, when the accident was avoided after the first repetition of sending the warnings/reminders in the lists shown in FIGS. 31A and 31B from the center 4 (Number of Times for Repetition=1), the first user sends a notification that the accident was avoided to the Web server 4B in the center 4.

After the Web server 4B in the center 4 receives the notification, a record that the accident was avoided is written down in the column 4A-2 in the center 4. Incidentally, when the accident was avoided by replacing the contents A with its substitute, the first user terminal 1 sends the substitute to the Web server 4B in the center 4 along with the notification. After receiving the substitute along with the notification, the center 4 registers and holds the substitute in the data base 4A.

In response to the notification, the center 4 makes it possible to display the notification in the list shown in FIG. 32A on the second user terminal 2. Besides, the center 4 makes it possible to display the notification in the list shown in FIG. 32B on the fourth user terminal 3a. Incidentally, when the accident was avoided by replacing the contents A with the substitute, the Web server 4B in the center 4 sends the substitute and the notification to the second user terminal 2 and the fourth user terminal 3a respectively.

In the list shown in FIG. 32A or 32B, the following are displayed: "Identification/Specification No."; "P (a record concerning the consent of user/delivery or the transfer/delivery of the contents, which shows a situation at the present moment only): Realized Displayed Detail"; and "Notification" that infringement of right etc. was avoided.

Further, after displaying the notification in the list shown in FIG. 32A on an arbitrary display means, the list shown in FIG. 32C, which is a record of the token in the column 4A-2 in the center 4, can be displayed by choosing the "Identification/Specification No.: ①-4" shown in FIG. 32A. In the list shown in FIG. 32C, there is shown a detail record of the token concerning the notification shown by the list in FIG. 32A, which shows the record leading up to the time when the center 4 makes it possible to display the above notification in the list shown in FIG. 32A on the second user terminal 2.

In the same way, after displaying the notification in the list shown in FIG. 32B on an arbitrary display means, the list shown in FIG. 32D, which is a record of the token in the column 4A-2 in the center 4, can be displayed by choosing the "Identification/Specification No.: ③-5" shown in FIG. 32B. In the list shown in FIG. 32D, there is shown a detail record of the token concerning the notification in the list shown in FIG. 32B, which shows the record leading up to the time when the center 4 makes it possible to display the above notification in the list shown in FIG. 32B on the fourth user terminal 3a.

Next is an explanation by using FIG. 33B when an accident such as infringement of right occurs to contents, and there is no derived token concerning contents or it becomes definite that there is no presentation after the derivation of the token concerning the contents. And then, the accident was not avoided after the center 4 sent the warning/reminder (FIG. 33A).

The center 4 makes it possible to display the warning/reminder in the list shown in FIG. 33A on the fourth user terminal 3a. After that, when the accident concerning the contents [A+A'+B]' was not avoided during the prescribed period (XXX), the center 4 makes it possible to display the warning/reminder in the list shown in FIG. 33B on the fourth user terminal 3a.

In the list shown in FIG. 33B, the following are displayed: "Contents"; "Warning" that the accident such as infringement of right was not avoided; "Reminder" that the fourth user should avoid the accident during the new period (XXX'); and "Number of Times for Repetition" of the warning/reminder at the present moment. Besides, by displaying/informing the underlined section ("Warning" and "Reminder") with color, illustration, voice and so forth in addition to characters, it becomes possible to impress the fourth user with the warning/reminder more effectively.

In the "Number of Times for Repetition", the number of times repeated by the center 4 in sending the warning/reminder is displayed. The number of times for repetition is set up by the center 4 beforehand. The center 4 repeats the warning/reminder in the list shown in FIG. 33B the above set-up number of times until the accident is avoided. Incidentally, the "Number of Times for Repetition" is incremented as often as the warning/reminder is repeated. In the same way, the period shown in the "Reminder" is incremented as often as the warning/reminder is repeated.

When the "Number of Times for Repetition" is set up as zero, the Web server 4B in the center 4 displays only the warning/reminder in the list shown in FIG. 33A without the repetition.

When the accident concerning the contents [A+A'+B]' was avoided during the new period (XXX'), and when the fourth user terminal 3a sends a notification that the accident was avoided to the Web server 4B in the center 4, the center 4 receives the notification and writes down a record that the accident was avoided in the column 4A-2 in the data base 4A.

Incidentally, when the accident was avoided by replacing the contents [A+A'+B]' with its substitute, the fourth user terminal 3a sends the substitute to the Web server 4B in the center 4 along with the notification. The sent substitute is registered and held in the column 4A-1.

FIG. 40 is a diagram showing a record of a token for consent of use/delivery or transfer/delivery of contents. The following is an explanation by using FIG. 40 concerning the flow of the record of the token for the consent of use/delivery or the transfer/delivery of the contents in the data base 4A in the center 4. Besides, the record of the token ends up arriving at one of the stages in the heavy-line frames: "No presented (Step S4003)"; "Realized the displayed detail (Step S4005)"; and "Compensated the user who is to receive the consent of use/delivery or the transfer/delivery of the contents with an amount of money from the funds for handling trouble (Step S4007)".

When a user hopes to receive consent of use/delivery or transfer/delivery of contents, a token for the consent of use/delivery or the transfer/delivery is derived. The center 4 writes down a record as "Derived" in the column 4A-2 (Step S4001).

When the token is transferred, the center 4 writes down a record as "Transferred" in the column 4A-2 (Step S4002). Incidentally, the token has to be transferred before the period of presentation for the token expires (hereinafter referred to as by the transferable final date). The transferable final date may be the preceding day when the period of presentation expires or earlier day during the period of presentation. When the user, who received the token and holds it, does not present the token during the period of presentation in order to realize the displayed detail, the center 4 writes down a record as "No presented" in the column 4A-2 (Step S4003).

When the token is presented during the period of presentation, the center 4 writes down a record as "Presented" in the column 4A-2 (Step S4004). When an accident such as infringement of right does not occur after the token was presented, the processes of realizing displayed detail is implemented. Then the center 4 writes down a record as "Realized the displayed detail" in the column 4A-2 (Step S4005).

When the accident occurred after the token was presented or the displayed detail was realized, the center 4 writes down a record as "Accident=Infringement of Right etc." in the column 4A-2 (Step S4006). Incidentally, in the case of the accident, the center 4 sends a warning/reminder number of times set up beforehand to a user who should avoid the accident. The repeated number of times (number of times for repetition) described above is written down in the column 4A-2 along with the record of "Accident=Infringement of Right etc.".

When the accident was avoided, the detail displayed in the token is realized. On the other hand, when the accident was not avoided and thereby it became impossible to realize the detail displayed in the token, the center 4 compensates the user who is to receive the consent of use/delivery or the transfer/delivery of the contents with an amount of money from the funds for handling trouble. In the above case, the center 4 writes down a record as "Compensated the user who is to receive the consent of use/delivery or the transfer/delivery of the contents with an amount of money from the funds for handling trouble" in the column 4A-2 (Step S4007).

FIG. 41 is a diagram showing a record of a token for collection of cost concerning consent of use/delivery, transfer/delivery of contents, or transfer of a token. The following is an explanation concerning a flow of the record of the token for the collection of the cost in the data base 4A in the center 4 by using FIG. 41. Besides, the record of the token ends up arriving one of the stages in the heavy-line frames: "No presented (Step S4103)"; "Realized the displayed detail (Step S4105)"; and "Appropriated an amount of money from the funds for handling trouble to the user who is to receive the cost (concerning consent of use/delivery or transfer/delivery of a token, or transfer of a token) (Step S4107)".

When a user hopes to receive consent of use/delivery or transfer/delivery of contents, or transfer of a token, a token for the collection of the cost concerning the consent of use/delivery or the transfer/delivery, or the transfer of the token is derived. The center 4 writes down a record as "Derived" in the column 4A-2 (Step S4101).

For example, when the token is transferred, the center 4 writes down a record as "Transferred" in the column 4A-2 (Step S4102). Incidentally, the token has to be transferred by a transferable final date. When a user, who received the token for the collection of the cost and holds it, does not present the token during the period of presentation in order to realize the detail displayed in the token, the center 4 writes down a record as "No presented" in the column 4A-2 (Step S4103).

On the other hand, when the token was presented during the period of presentation, the center 4 writes down a record as "Presented" in the column 4A-2 (Step S4104). When an accident such as collection delay concerning cost did not occur after the token was presented, the processes of realizing detail displayed in the token is executed. Then the center 4 writes down a record as "Realized the displayed detail" in the column 4A-2 (Step S4105).

When the accident such as collection delay concerning cost occurred after the token was presented, the center 4 writes down a record as "Accident=Collection Delay etc." in the column 4A-2 (Step S4106). Incidentally, after the accident such as collection delay concerning cost occurred, the center 4 sends a warning/reminder to the user who should pay the cost number of times set up beforehand. The repeated number of times (number of times for repetition) described above is written down in the column 4A-2 along with the record of "Accident=Collection Delay etc.".

When the cost was paid from the user, the displayed detail is realized. On the other hand, when the cost was not paid and thereby it became impossible to realize the detail displayed in the token, the center 4 appropriates an amount of money from the funds for handling trouble to the user who is to receive the cost. In the above case, the center 4 writes down a record as "Appropriated an amount of money from the funds for handling trouble to the user who is to receive the cost (concerning the consent of use/delivery or the transfer/delivery of the token, or the transfer of the token)" in the column 4A-2 (Step S4107).

Next is explanation by using FIGS. 9 and 34 to 39D when each user requests a notification about a situation in each step of (i) to (iv) described below.

Incidentally, the explanation of the notification about a situation is based on FIG. 34. Further in FIG. 34, "α" shows a case of giving consent of use/delivery or transfer/delivery of contents, "β" shows a case of receiving consent of use/delivery or transfer/delivery of contents, "γ" shows a case of paying cost, and "θ" shows a case of receiving cost, respectively.

In FIG. 34, when a user chooses one selected from "a" to "d", the following list is displayed on the user terminal, which including: "Identification/Specification No.", "P (a record concerning consent of use/delivery or transfer/delivery, and collection of cost, which shows a situation at the present moment only)"; and "Period of Presentation (in the case where the present moment is during a period of presentation and the presentation has not been implemented)".

Further, in the case where the list is displayed on the user terminal after the user chooses one selected from "a" to "d" shown in FIG. 34, there is displayed a detail record leading up to the present moment by choosing "Identification/Specification No." on the list. Incidentally, the above detail is the same as a record of a token for consent of use/delivery or transfer/delivery of contents, and collection of cost written down in the column 4A-2 in the center 4.

In FIG. 34, when a user chooses one selected from "e" to "h", the following list is displayed on the user terminal, which including: "Identification/Specification No."; "W (a record concerning consent of use/delivery or transfer/delivery and collection of cost, which shows all stages leading up to the present moment)"; and "Period of Presentation (in the case where the present moment is during the period of presentation and the presentation has not been implemented)".

Incidentally, each stage of the record in "W (a record concerning consent of use/delivery or transfer/delivery and collection of cost, which shows all stages leading up to the present moment)" is displayed in order of achievement of the stage.

Further, in the case where the list is displayed on the user terminal after the user chooses one selected from "e" to "h" shown in FIG. 34, by choosing "Identification/Specification No." and "a stage at an arbitrary moment in W", there is displayed a detail record leading up to the chosen "stage at the arbitrary moment in W". Incidentally, the above detail record is same as a record of a token for consent of use/delivery or transfer/delivery of contents, and collection of cost written down in the column 4A-2 in the center 4.

After a user chooses one selected from "b", "d", "f", and "h", in the case where a token held by the above user has not been presented though it is during the period of presentation of the token, by displaying/informing the period of presentation (underlined section) with color, illustration, voice and so forth in addition to characters, it becomes possible to impress the above user with the effect that the token has not been presented during the "Period of Presentation" more effectively.

The following is an explanation when the first user chooses "a" or "e" shown in FIG. 34 in "(i) a stage where the present moment is during the period of presentation of the token in Step S908, and the token in Step S908 has not been presented".

When the first user as the user who gives the consent of use/delivery or the transfer/delivery of the contents A concerned in himself/herself chooses "a" shown in FIG. 34, that is, when the first user requests the center 4 to send a notification about a situation at the present moment only (P), the center 4 makes it possible to display information about the situations shown in FIGS. 35A and 35B on the first user terminal 1.

In FIG. 35A, there is shown an effect that the consent of use/delivery or the transfer/delivery of the contents A concerned in the first user was implemented after the processes of realizing detail displayed in the token in Step S901 was implemented on the basis of the presentation of the token in Step S901 by the second user. Besides, in FIG. 35B, there is shown an effect that the token for the consent of use/delivery including that of the contents A concerned in the first user is transferred to the fourth user at the present moment (Step S908), and the period of presentation for the token.

Further, by choosing "Identification/Specification No.: ③-1" in the list shown in FIG. 35B by the first user, the record shown in FIG. 12A is displayed on the first user terminal 1.

Besides, when the first user as the user who gives the consent of use/delivery or the transfer/delivery of the contents A concerned in himself/herself chooses "e" shown in FIG. 34, that is, when the first user requests the center 4 to send a notification which shows all stages leading up to the present moment (W), the center 4 makes it possible to display information about the situations shown in FIGS. 37A and 37B on the first user terminal 1.

In FIG. 37A, there are displayed effects that a token for the consent of use/delivery of the contents A was derived to the second user, that the above token was presented by the second user, and that the processes of realizing detail displayed in the above token was implemented. Besides, in FIG. 37B, there are displayed effects that a token for the consent of use/delivery including that of the contents A was derived to the fifth user (Step S905) and that the token for the consent of use/delivery including that of the contents A was transferred to the fourth user (Step S908), and the period of presentation for the token.

Further, by choosing "Identification/Specification No.: ③-1" in the list shown in FIG. 37B and "Transfer to the fourth user" in W by the first user, the record of the token shown in FIG. 12A is displayed on the first user terminal 1.

Next, the following is an explanation when the fourth user chooses "b" or "f" shown in FIG. 34 in "(ii) a stage where the present moment is during the period of presentation of the tokens in Step S908 and Step S910, and the above tokens have not been presented".

When the fourth user chooses "b" shown in FIG. 34, that is, when the fourth user as the user who receives the consent of use/delivery or the transfer/delivery of the contents A, A' and B requests the center 4 to send a notification about a situation at the present moment only (P), the center 4 makes it possible to display the information of the situations shown in FIGS. 35C and 35D on the fourth user terminal 3a.

In FIG. 35C, there are displayed an effect that the token for the consent of use/delivery of the contents (A+A') is transferred to the fourth user (Step S908), and the period of presentation for the token. Besides, in FIG. 35D, there are displayed an effect that the token for the consent of use/delivery of the contents B was derived to the fourth user (Step S910), and the period of presentation for the token.

Further, by choosing "Identification/Specification No.: ⑦" shown in FIG. 35D by the fourth user, the record shown in FIG. 13A is displayed on the fourth user terminal 3a.

Besides, when the fourth user chooses "f" shown in FIG. 34, that is, when the fourth user as the user who receives the consent of use/delivery or the transfer/delivery of the contents A, A' and B requests the center 4 to send a notification about a record which shows all stages leading up to the present moment (W), the center 4 makes it possible to display the information of the situations shown in FIGS. 37C and 37D on the fourth user terminal 3a.

In FIG. 37C, there are shown effects that the token for the consent of use/delivery of the contents (A+A') was derived to the fifth user (Step S905) and that the token for the consent of use/transfer of the contents (A+A') was transferred to the fourth user (Step S908), and the period of presentation for the token. In FIG. 37D, there are shown an effect that the token for the consent of use/delivery of the contents B (Step S910) was derived to the fourth user, and the period of presentation for the token.

Further, by choosing "Identification/Specification No.: ⑦" in the list shown in FIG. 37D and "Derivation to the fourth user" in W by the fourth user, the record of the token shown in FIG. 13A is displayed on the fourth user terminal 3a.

The following is an explanation when the fifth user chooses "c" or "g" shown in FIG. 34 in "(iii) a stage where the present moment is during the period of presentation of the tokens in Step S906 and Step S912, and the above tokens have not been presented".

When the fifth user chooses "c" shown in FIG. 34, that is, when the fifth user as the user who is to pay the cost concerning the consent of use/delivery or the transfer/delivery of the contents A and A' requests the center 4 to send a notification about a situation at the present moment only (P), the center 4 makes it possible to display the information of the situations shown in FIGS. 36A and 36B on the fifth user terminal 3b.

In the list shown in FIG. 36A, there are displayed an effect that the token for the collection of the cost of the contents A (Step S906) is derived to the first user at the present moment, and the period of presentation for the token. Besides, in the list shown in FIG. 36B, there are displayed an effect that the token for the collection of the cost of the contents A' was transferred to the fourth user (Step S912), and the period of the presentation for the token.

Further, by choosing "Identification/Specification No.: ⑤-1" in the list shown in FIG. 36B by the fifth user, the record of the token shown in FIG. 14A is displayed on the fifth user terminal 3b.

When the fifth user chooses "g" shown in FIG. 34, that is, when the fifth user as the user who is to pay the cost concerning the consent of use/delivery or the transfer/delivery of the contents A and A' requests the center 4 to send a notification about a record which shows all stage leading up to the present moment (W), the center 4 makes it possible to display the information of the situations shown in FIGS. 38A and 38B on the fifth user terminal 3b.

In FIG. 38A, there are shown an effect that the token for the collection of the cost of the contents A was derived to the first user (Step S906), and the period of presentation for the token. Besides, in FIG. 38B, there are show effects that the token for the collection of the cost of the contents A' was derived to the second user (Step S907) and that the above token was transferred from the second user to the fourth user (Step S912), and the period of presentation for the token.

Further, by choosing "Identification/Specification No.: ⑤-1" in the list shown in FIG. 38B and "Transfer to the fourth user" in W by the fifth user, the record of the token shown in FIG. 14A is displayed on the fifth user terminal 3b.

The following is an explanation when the second user chooses "d" or "h" shown in FIG. 34 in "(iv) a stage where the present moment is just after the transfer of the token in Step S907, and is during the period of presentation for the token in Step S913, and the token in Step S913 has not been presented".

When the second user chooses "d" shown in FIG. 34, that is, when the second user as the user who receives the cost concerning the consent of use/delivery or the transfer/delivery of the contents A' requests the center 4 to send a notification about a situation at the present moment only (P), the center 4 makes it possible to display the information of the situations shown in FIGS. 36C and 36D on the second user terminal 2.

In FIG. 36C, there are shown an effect that the token for the collection of the cost of the contents A' (Step S907) was transferred to the fourth user, and the period of presentation for the token. Besides, in FIG. 36D, there are shown an effect that the token for the collection of the cost concerning the transfer of the token in Step S907 was derived to the second user (Step S913), and the period of presentation for the token in (Step S913).

Further, by choosing "Identification/Specification No.: ⑨" in the list shown in FIG. 36D by the second user, the record of the token shown in FIG. 14B is displayed on the second user terminal 2.

When the second user chooses "h" shown in FIG. 34, that is, when the second user as the user who is to receive the cost concerning the consent of use/delivery or the transfer/delivery of the contents A' requests the center 4 to send a notification about a record which shows all stages leading up to the present moment (W), the center 4 makes it possible to display the information of the situations shown in FIGS. 38C and 38D on the second user terminal 2.

In FIG. 38C, there are displayed effects that the token for the collection of the cost of the contents A' was derived to the second user (Step S907) and that the above token was transferred from the second user to the fourth user (Step S912), and the period of presentation for the token. Besides, in FIG. 38D, there are displayed an effect that the token in Step S913 for the collection of the cost concerning the transfer of the token in Step S907 was derived to the second user, and the period of presentation for the token in Step S913.

Further, by choosing "Identification/Specification No.: ⑨" in the list shown in FIG. 38D and "Derivation to the second user" in W by the second user, the record of the token shown in FIG. 14B is displayed on the second user terminal 2.

Next is an explanation by using FIG. 39A when the center 4 is requested to display situations about a collection of the funds for handling trouble and appropriation/compensation concerning a user himself/herself from the user terminal of the user.

When the third user requests the Web server 4B in the center 4 to display situations about the original funds collected from the third user, original funds which is to be paid by the third user, and appropriation/compensation, the center 4 receives the request, collects information concerning the funds for handling trouble concerned in the third user written down in the data base 4A, and makes it possible to display the list shown in FIG. 39A on the third user terminal 3.

In the list shown in FIG. 39A, the following are displayed: "Funds (a deadline for collecting the original funds): Situation of Collection"; and "A Situation About Appropriation/Compensation From Funds: Target Identification/Specification No.". Incidentally, in "Funds (a deadline for collecting the original funds): Situation of Collection" of the list shown in FIG. 39A, there is displayed that the original funds ZZZ, which should be paid by the deadline XX1 for the collection of the original funds, were collected from the third user, and that the original funds ZZZ, which should be paid by the deadline XX2 for the collection of the original funds, have not been collected. Besides, when the original funds ZZZ were not collected by the deadline XX2, the "Warning/Reminder" that the original funds were uncollected is displayed as shown in FIG. 39A.

Further, by choosing "Identification/Specification No.: ⑧, . . . )" in the list shown in FIG. 39A by the third user, a record leading up to the stage when the notification shown in FIG. 39A concerning the token of the chosen "Identification/Specification No." is displayed on the third user terminal 3.

Next is an explanation about a warning/reminder when a user did not pay original funds by a deadline set up beforehand by using FIG. 39B.

When "the deadline XX2 for collecting the original funds" set up beforehand passed without payment of the original funds ZZZ from the third user, that is, when the third user could not pay the original funds ZZZ by "the deadline XX2 for collecting the original funds" set up beforehand, the center 4 makes it possible to display the warning/reminder shown in FIG. 39B on the third user terminal 3.

In the list of the warning/reminder shown in FIG. 39B, the following are displayed: "Funds (a deadline for collecting the original funds)"; "Warning" about failuer to collect; and "Reminder" after setting up new original funds, which are calculated by adding interest arrears set up beforehand to the original funds, and a new deadline for collecting the new original funds.

In FIG. 39B, there are displayed a warning that the third user did not pay the original funds ZZZ by the deadline XX2 for the collection of the original funds, and a reminder that the third user should pay the new original funds, which are calculated by adding interest arrears ZZ1 to the original funds ZZZ, by a new deadline XX2' for collecting the new original funds. Besides, by displaying/informing the underlined section ("Warning" and "Reminder") with color, illustration, voice and so forth in addition to characters, it becomes possible to impress the third user with the warning/reminder more effectively.

Next is an explanation by using FIG. 39C when the center 4 was not able to collect the new original funds by the new deadline for collecting the new original funds.

When the third user did not pay the new original funds by the new deadline after the Web server 4B in the center 4 made it possible to display the warning/reminder shown in FIG. 39B on the third user terminal 3, the center 4 sets up new original funds again, which are calculated by adding prescribed interest arrears, and a new deadline. The Web server 4B in the center 4 makes it possible to display the warning/reminder in the list shown in FIG. 39C on the third user terminal 3. Incidentally, FIG. 39C shows a case of a first repetition of sending the warning/reminder by the Web server 4B.

In the warning/reminder in the list shown in FIG. 39C, the following are displayed: "Funds (a deadline for collecting the original funds)"; "Warning" about failuer to collect; "Reminder" after setting up new original funds, which are calculated by adding interest arrears set up beforehand, and a new deadline for collecting the new original funds; and "Number of Times For Repetition of Warning/Reminder at the Present Moment". Incidentally, "At the Present Moment" means a time when the center 4 makes it possible to display the list shown in FIG. 39C on the user terminal.

In FIG. 39C, there are displayed a warning that the third user did not pay the original funds ZZZ (e.g. yen) (or ZZZ+interest arrears ZZ1) by the deadline XX2 (or XX2') for collecting the original funds, and a reminder that the third user should pay new original funds (ZZZ+ZZ1+ZZ2) which are calculated by adding interest arrears ZZ2 to the original funds ZZZ+interest arrears ZZ1 by a new deadline XX2". Besides, by displaying/informing the underlined section ("Warning" and "Reminder") with color, illustration, voice and so forth in addition to characters, it becomes possible to impress the third user with the warning/reminder more effectively.

In "Number of Times for Repetition of Warning/Reminder at the Present Moment", the repeated number of times of the warning/reminder is displayed. The number of times for repetition of the warning/reminder is set up beforehand by the center 4. The center 4 sends the warning/reminder shown in FIG. 39C the number of times set up as described above until the original funds are collected. Incidentally, as often as the warning/reminder is repeated, "Number of Times for Repetition of Warning/Reminder at the Present Moment" is incremented. In the same way, the funds and the deadline shown in "Reminder" are incremented.

When the number of times for repetition is set up as zero, the Web server 4B in the center 4 sends only the warning/reminder in the list shown in FIG. 39B without the repetition.

Next is an explanation of failuer at last to implement collection of cost concerning consent of use/delivery or transfer/delivery of contents, collection of cost concerning transfer of a token, avoidance of an accident such as infringement of right to contents, or collection of original funds by using FIG. 39D.

When it becomes definite that it is impossible to implement collection of cost from a user concerning consent of use/delivery or transfer/delivery of contents, collection of cost from a user concerning transfer of a token, avoidance by a user of an accident such as infringement of right to contents, or collection of original funds from a user (including repetition in each of the above cases), the center 4 makes it possible to display a list of "Reason" and "Notification that the position and the contents of the user will be written off" on a user terminal of the user.

Incidentally, "the position of the user will be written off" means that the user will be banned from using all kinds of service in this transaction system (always excepting a case of collecting an uncollected cost and uncollected original funds). Besides, "the contents will be written off" described above means that the contents (an original piece) and the adaptation thereof and so forth registered by the user in the data base 4A in the center 4 are written off from the data base 4A in the center 4. Further, the center 4 compensates a user who received the consent of use/delivery or the transfer/delivery of the written-off contents (a user who presented a token for the consent of use/delivery or the transfer/delivery of the written-off contents) with an amount of money from the funds for the handling trouble.

FIG. 39D is a list which the center 4 displays on the third user terminal 3 when it becomes definite that it is impossible for the center 4 to collect the original funds from the third user. In FIG. 39D, there are shown a reason that the third user did not pay the original funds ZZZ by the deadline XX2 for collecting the original funds, and a notification that the position and the contents B of the third user registered by the third user in the data base 4A in the center 4 will be written off.

Incidentally, in the transaction as described above, when a user who received the token holds it, the whole token is covered with copyguard. However, when the user hopes to read the token except for the upper right portion (*) (FIGS. 10A to 14B) on his/her terminal, the user can do so by releasing the copyguard except for the upper right portion. Thereby, the detail of the token is displayed on the screen. Even in the above case, it is impossible to increment the token by using the terminal. Besides, in the case of moving a token from user's terminal to an off-network medium such as a memory card, nothing is left in the user's terminal. This is because the token is kept covered with copyguard. Therefore, the token is just moved to a new place in an off-network medium. In this way, by covering the token with copyguard, it is possible to prevent the duplication of the token. Thereby, it is possible to guarantee that the token serves as one object.

Besides, in constructing the above transaction system, it is possible to apply a system for contract between a center and users (such as a system based on a covenant for membership club or proprietary club) to all of the first to fifth users. Besides, for example, after deriving a token for consent of use/delivery or transfer/delivery of contents and a token for collection of cost thereof, when neither was not transferred during a prescribed "period of presentation", it is possible to apply a provision that when only either of them was presented, it is regarded that neither was presented. Further, it is also possible to adopt a system for dispute settlement such as ADR (alternative dispute resolution).

In this way, according to the embodiment of the present invention, the first user terminal 1, the second user terminal 2, the third user terminal 3, the fourth user terminal 3a and the fifth user terminal 3b are applied between the first to fifth users respectively. After the first to fourth users send a notification that the above users are to register their contents and prescribed items thereof in the data base 4a on the center 4 side through the Internet 5 by using the user terminals, the above users send the contents to the center 4. The Web server 4B in the center 4 registers the contents and the prescribed items thereof from the above users in the data base 4A, and holds the contents. When the consent of use/delivery or the transfer/delivery of the contents occurs, the Web server 4B derives a token for the consent of use/delivery or the transfer/delivery, and a token for the collection of the cost (concerning the consent of use/delivery or the transfer/delivery of the contents) according to the occurrence. Then the Web server 4B sends the former token to the first to fifth users who are to receive the consent of use/delivery or the transfer/delivery of the contents, and the latter token to the first to fourth users who are to give the consent of use/delivery or the transfer/delivery of the contents. When transfer of a token occurs, the Web server 4B sends the token to the first to fifth users who are to receive the transfer of the token (before this process, the token, which is held by the users who are to give the transfer of the tokens, is sent from the users to the center 4 and incremented by the Web server 4B). Then the Web server 4B drives a new token for collection of cost (concerning the transfer of the token) according to the occurrence, and sends the new-derived token to the first to fifth users who are to give the transfer of the token. When realization of the detail displayed in the token (the displayed detail means the consent of use/delivery or the transfer/delivery of the contents, or the collection of the cost) occurs, in the case where the token is for the consent of use/delivery or the transfer/delivery of the contents, the Web server 4B implements the consent of use or the transfer of the contents by sending (i.e., delivery of) the contents to the first to fifth users who are to receive the consent of use/delivery or the transfer/delivery of the contents. On the other hand, in the case where the token is for the collection of the cost concerning the consent of use/delivery or the transfer/delivery of the contents, the Web server 4B collects the cost from the first to fifth users who are to receive the consent of use/delivery or the transfer/delivery of the contents, and pays the collected cost to the first to fourth users who are to give the consent of the use/delivery or the transfer/delivery of the contents. Further, in the case where the token is for collection of cost concerning transfer of a token derived back of the above case, the Web server 4B collects the cost from the first to fifth users who are to receive the transfer of the previous-derived token, and pays the collected cost to the first to fifth users who are to give the transfer of the previous-derived token. Therefore, it becomes possible to conduct transaction of contents easily and securely with transparency/distributability/cashability according to a situation. Besides, it becomes possible to spread around detail of contents extensively. Further, it becomes possible to receive contents which a user hopes to use promptly.

Besides, when a prescribed deadline during a period of presentation passed without presentation of a token held by the first to fifth users, the center 4 sends a warning that the presentation was not implemented to the user terminals 1 to 3, 3a and 3b of the first to fifth users, and displays the warning on the user terminals. Therefore, it becomes possible to lighten the burden imposed on the first to fifth users who get a handle on a token(s) and to prevent the first to fifth users from carelessly not presenting the token(s). It is particularly effective when the first to fifth users hold a plurality of tokens in a plurality of terminals and/or recording mediums. This is because it is difficult to get a handle on the token(s) in terms of a period of presentation.

Besides, when the first to fifth users did not pay cost concerning consent of use/delivery or transfer/delivery of contents or concerning transfer of a token, the center 4 sets up new cost which is calculated by adding interest arrears and a deadline for collection of the above new cost. Then the center 4 sends a warning/reminder to the user terminals 1 to 3, 3a and 3b of the first to fifth users who did not pay the cost, and displays the warning/reminder on the user terminals. Besides, the center 4 sends the warning/reminder prescribed number of times set up beforehand until the cost is collected. Therefore, it becomes possible to enhance certainty that the center 4 can implement collection of cost.

Besides, when an accident such as infringement of right occurs to contents concerned in the first to fifth users, the center 4 sets up a deadline to avoid the accident. Then the center 4 sends a warning/reminder to the user terminals 1 to 3, 3a and 3b of the first to fifth users who should avoid the accident, and displays the warning/reminder on the user terminals. Then the center 4 sends the warning/reminder prescribed number of times set up beforehand until the accident is avoided. Therefore, it is possible to enhance certainty for avoidance of accidents.

Besides, when the first to fifth users did not pay original funds forming the funds for handling trouble during a collection period, the center 4 sets up new original funds, which are calculated by adding interest arrears, and a new collection period for collecting the new original funds. Then the center 4 sends a warning/reminder to the user terminals 1 to 3, 3a and 3b of the first to fifth users, and displays the warning/reminder on the user terminals. Also the center 4 sends the warning/reminder prescribed number of times set up beforehand until the new original funds are collected. Therefore, it becomes possible to enhance certainty that the center 4 can collect original funds.

Besides, the center 4 collects original funds forming the funds for handling trouble from the first to fifth users, and holds the collected original funds. Therefore, in the case of accidents, the center 4 can implement appropriation/compensation to a user(s) who suffers a loss of benefit by the accidents.

Besides, when it becomes definite that the center 4 cannot collect cost from the first to fifth users, the first to fifth users cannot avoid an accident such as infringement of right to contents, or the center 4 cannot collect the original funds from the first to fifth users, the center 4 writes off the position and the contents concerning the first to fifth users. Therefore, it becomes possible to normalize the conduct of the transaction system by excluding a user(s) who disrupts the conduct of the transaction system.

Besides, the first to fifth users request the center 4 to send a notification of situations about the consent of use/delivery or the transfer/delivery of the contents and the collection of the cost concerning the first to fifth users, or situations about the collection of the funds for handling trouble, appropriation and compensation concerning the first to fifth users by using the user terminals 1 to 3, 3a and 3b respectively. The center 4 collects a record(s) of a token(s) and so forth in the data base 4A in the center 4, and sends a notification about the above situation(s) to the user terminals 1 to 3, 3a and 3b of the first to fifth users respectively. Therefore, it becomes possible for the first to fifth users to get hold of/get a handle on the above situations concerning the users themselves easily.

Besides, it is possible to disclose contents extensively through the Internet 5. Thereby, it becomes possible to detect dormant contents and further to make good use of contents. Incidentally, in this embodiment of the present invention, there is shown an open transaction by disclosing contents to the public. However, not applying only to the above embodiment, a closed transaction by not disclosing contents is also available as described above. In this case, transaction is closed by controlling all kinds of transaction with thoroughgoing encryption and so forth on the center 4's side. Also in this embodiment, there is shown a case where contents are sent through the Internet 5. However, not applying only to the above embodiment, it is possible to send contents using an off-network medium such as a memory card as described above.

Besides, consent of use/delivery or transfer/delivery of contents is implemented by applying a token which is controlled in the center 4. Thereby, it is also possible for a user who holds the tokens to transfer a part of or the whole of the tokens to another user extremely easily. Incidentally, in this embodiment of the present invention, there is shown a case of open transfer by making a token known to the public. However, not applying only to the above embodiment, closed transfer is also available by not announcing the token as described above. In this case, transaction is closed by controlling all kinds of transaction with thoroughgoing encryption and so forth on the center 4's side. Also in this embodiment, there is shown a case where a token is sent through the Internet 5 and held. However, not applying only to the above embodiment, it is possible to send and hold a token using an off-network medium such as a memory card as described above.

Further, in this embodiment, contents, for example, may be copyright and so forth as described above. However, not applying only to this case, contents also may be metaphorical data which are regarded and handled among the center and the users as directly corresponding to intangible inventions, rights to emit global warming gases, tangible objects, money, securities and so forth that are regarded as economically valuable. In this case, changes in rights, duties and so forth concerning contents agree with those concerning intangible inventions, rights to emit global warming gases, tangible objects, money, securities and so forth. Besides, in the case where a token displays detail concerning debts and credits, the transfer of the token means the transfer of the real debts and credits. Therefore, it is preferable to meet statutory requirements and so forth.

Further, the center 4 can adopt various methods for collection of cost, for example, a credit card, a debit card, electronic money, funds transfer, account transfer and so forth. Also by transferring tokens, it is possible practically to countervail and to trade by a barter system.

As set forth hereinabove, according to the method, device, system and program for transaction of contents through a network, user terminals are applied between users. The users send a notification that the users hope to register contents and prescribed items thereof in the data base in the center through a network. The users send the contents through a network or by an off-network medium. The Web server in the center registers the contents and prescribed items and holds the contents. When the consent of use/delivery or the transfer/delivery of the contents occurs, the Web server derives a token for the consent of use/delivery or the transfer/delivery of the contents and a token for the collection of the cost (concerning the consent of use/delivery or the transfer/delivery of the contents) according to the occurrence. Then the Web server sends, through a network or by an off-network medium, the former token to users who are to receive the consent of use/delivery or the transfer/delivery of the contents, and the latter token to users who are, to give the consent of use/delivery or the transfer/delivery of the contents. When transfer of a token occurs, the Web server sends the token to users who are to receive the transfer through a network or by an off-network medium. Then the Web server derives a new token for the collection of the cost (concerning the transfer of the token) according to the occurrence. Then the Web server sends the new derived token to users who are to give the token through a network or by an off-network medium. When the presentation of the detail displayed in the token (displayed detail means the consent of use/delivery or the transfer/delivery of the contents, or the collection of the cost) occurs, in the case where the token is for the consent of use/delivery or the transfer/ delivery of the contents, the Web server implements the consent of use or the transfer of the contents by sending (i.e., delivery of),through a network or by an off-network medium, the contents to users who are to receive the consent of use/delivery or the transfer/delivery of the contents. On the other hand, in the case where the token is for the collection of the cost concerning the consent of use/delivery or the transfer/delivery of the contents, the Web server collects the cost from users who are to receive the consent of use/delivery or the transfer/delivery of the contents, and pays the collected cost to users who are to give the consent of use/delivery or the transfer/delivery of the contents. Further, in the case where the token is for collection of cost concerning transfer of a token derived back of the above case, the Web server collects the cost from users who are to receive the transfer of the previous-derived token, and pays the collected cost to users who are to give the transfer of the previous-derived token. Therefore, it becomes possible to conduct all kinds of transaction of contents easily and securely with transparency/distributability/cashability according to a situation. Besides, it becomes possible to spread around detail of contents extensively. Further, it becomes possible to receive contents which users hope to use promptly.

Besides, according to the method, device, system and program for transaction of contents through a network, the center collects original funds forming funds for handling trouble from each user, and holds the original funds. When accidents such as delay of collecting cost, infringement of right to contents, and delay of collecting the original funds occur, the center sends a warning/reminder to a user who should avoid the accidents. After sending the warning/reminder, when the accident was not avoided, the center writes off the position and the contents concerning the user who did not avoid the accident. Besides, the center 4 implements appropriation/compensation from the funds for handling trouble to a user(s) who suffers a loss of benefit by the accidents. Therefore, it becomes possible to conduct transaction of contents and tokens with high security and credibility.

Further, according to the method, device, system and program for transaction of contents through a network, when a prescribed deadline during a period of presentation passed without presentation of a token(s), the center sends a warning that a token was not presented to a user(s) who holds the token. When a user(s) required the center to send a notification about situations concerning consent of use/delivery or transfer/delivery and collection of cost of contents connected with the user or concerning the funds for handling trouble connected with the user, the center sends a notification about situations concerning the above consent of use/delivery or transfer/delivery and the collection of the cost connected with the user or concerning the funds for handling trouble connected with the user to a user terminal of the user. Therefore, it becomes possible to get hold of/get a handle on the above situations connected to user themselves easily.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method in a system, said system including a center and a plurality of terminals connected to the center by a network, said method comprising:
    sending, from a first terminal of said plurality of terminals to said center through said network, first contents;
    storing, by said center, said first contents;
    sending, from a second terminal of said plurality of terminals to said center through said network, a request for consent to use or transfer said first contents;
    deriving, by said center, a first token for consent to use or transfer the first contents;
    sending the first token from the center to the second terminal through the network or by an off-network storage medium storing the first token;
    sending, from said second terminal to said center through said network, said first token and a notification of a desire to transfer said first token;
    sending, from a third terminal of said plurality of terminals to said center through said network, a request for said first token; and
    sending the first token from the center to the third terminal through the network or by a second off-network storage medium storing the first token.

2. The method as claimed in claim 1, further comprising:
    deriving, by said center, a second token for collection of a particular cost for a transfer of the first token; and
    sending the second token from the center to the second terminal through the network or by a third off-network storage medium storing the second token.

3. The methed as claimed in claim 2, further comprising:
    presenting, by said second terminal to said center through said network, said second token;
    collecting, by the center, a particular payment of the particular cost from the third terminal through the network in response to said presentation of the second token; and
    sending, from the center to the second terminal, the particular payment.

4. A method in a system, said system including a center and a plurality of terminals connected to the center by a network, said method comprising:
    sending, from a first terminal of said plurality of terminals to said center through said network, first contents;
    storing, by said center, said first contents;
    sending, from a second terminal of said plurality of terminals to said center through said network, a request for consent to use or transfer said first contents;
    deriving, by said center, a first token for consent to use or transfer the first contents;
    sending the first token from the center to the second terminal through the network or by an off-network storage medium storing the first token;
    deriving, by said center, a second token for collection of a cost for the consent to use or transfer the first contents;
    sending the second token from the center to the first terminal through the network or by a second off-network storage medium storing the second token;
    presenting, by said first terminal to said center through said network, said second token;
    sending, from said center to said second terminal through said network, or a request for a payment of said cost in response to said presentation of said second token;
    determining, by said center, whether said second terminal makes said payment to said center by a deadline; and
    sending, from said center to said second terminal through said network, a request for a particular payment of a new cost that is greater than said cost if it is determined by said center that said second terminal did not make said payment to said center by said deadline.

5. The method of claim 4, further comprising:
repeatedly sending, from said center to said second terminal through said network, a warning a specified number of times or until said second terminal makes said particular payment of said new cost to said center.

6. The method of claim 4, further comprising:

determining, by said center, whether said second terminal makes said particular payment to said center by a new deadline; and sending, from said center to said first terminal through said network, a specific payment of said new cost out of a fund for handling trouble if it is determined by said center that said second terminal did not make said particular payment to said center by said new deadline.

7. A method in a system, said system including a center and a plurality of terminals connected to the center by a network, said method comprising:

sending, from a first terminal of said plurality of terminals to said center through said network, first contents;

storing, by said center, said first contents;

sending, from a second terminal of said plurality of terminals to said center through said network, a request for consent to use or transfer said first contents;

deriving, by said center, a first token for consent to use or transfer the first contents and including a time period for presentation;

sending the first token from the center to the second terminal through the network or by an off-network storage medium storing the first token;

sending, from said second terminal to said center through said network, said first token and a notification of a desire to transfer said first token;

determining, by said center, whether said time period for presentation included in said first token has expired; and rejecting, by said center, the attempt of said second terminal to transfer said first token if it is determined by said center that said time period for presentation included in said first token has expired.

8. A method in a system, said system including a center and a plurality of terminals connected to the center by a network, said method comprising:

sending, from a first terminal of said plurality of terminals to said center through said network, first contents;

storing, by said center, said first contents;

sending, from a second terminal of said plurality of terminals to said center through said network, a request for consent to use or transfer said first contents;

deriving, by said center, a first token for consent to use or transfer the first contents and including time period for presentation;

sending the first token from the center to the second terminal through the network or by an off-network storage medium storing the first token;

presenting, by said second terminal to said center through said network, said first token to request said first contents from said center;

determining, by said center, whether said time period for presentation included in said first token has expired; and rejecting, by said center, said request for said first contents from said second terminal if it is determined by said center that said time period for presentation included in said first token has expired.

9. The method of claim 8, further comprising:

sending, from said center to said second terminal through said network, said first contents if it is determined by said center that said time period for presentation included in said first token has not expired.

\* \* \* \* \*